(12) United States Patent
Shibahara

(10) Patent No.: US 7,838,089 B2
(45) Date of Patent: *Nov. 23, 2010

(54) LIQUID CRYSTAL MATERIAL, LIQUID CRYSTAL DISPLAY DEVICE AND LIQUID CRYSTAL DISPLAY

(75) Inventor: Seiji Shibahara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,014

(22) Filed: Dec. 16, 2008

(65) Prior Publication Data

US 2009/0168009 A1  Jul. 2, 2009

(30) Foreign Application Priority Data

Dec. 28, 2007  (JP) .............................. 2007-341181

(51) Int. Cl.
*C09K 19/52* (2006.01)
*C09K 19/54* (2006.01)
*G02F 1/13* (2006.01)

(52) U.S. Cl. ................ 428/1.1; 252/299.01; 252/299.5; 349/167; 349/177; 349/186

(58) Field of Classification Search ................. 428/1.1; 252/299.01, 299.61, 299.5; 349/167, 186, 349/187, 177
See application file for complete search history.

(56) References Cited

U.S. PATENT DOCUMENTS

2004/0033321 A1* 2/2004 Jakli et al. .................... 428/1.3
2009/0073372 A1* 3/2009 Shibahara ................... 349/171

FOREIGN PATENT DOCUMENTS

JP    2002-161277    6/2002
WO   2006/025234   3/2006

OTHER PUBLICATIONS

English translation by computer for JP 2002-161277, http://www4.ipdl.inpit.go.jp/Tokujitu/PAJdetail.ipdl?N0000=60&N0120=01&N2001=2&N3001=2002-161277.*
CAPLUS 2002: 421694.*
Japanese Office Action issued on Oct. 20, 2009 in connection with JP Application No. 2007-341181.

* cited by examiner

*Primary Examiner*—Shean C Wu
(74) *Attorney, Agent, or Firm*—SNR Denton US LLP

(57) ABSTRACT

A liquid crystal display device capable of obtaining good display characteristics and good response characteristics is provided. A liquid crystal material being a paraelectric material, the liquid crystal material includes: a liquid crystal molecule exhibiting a nematic liquid crystal phase at room temperature and including one or more cyclic structures; and a bent-shaped molecule including cyclic structures which are large in number compared to the cyclic structures included in the liquid crystal molecule.

16 Claims, 3 Drawing Sheets ion JP 2007-341181 filed in the
LIQUID CRYSTAL MATERIAL, LIQUID CRYSTAL DISPLAY DEVICE AND LIQUID CRYSTAL DISPLAY

CROSS REFERENCES TO RELATED APPLICATIONS

The present invention contains subject matter related to Japanese Patent Application JP 2007-341181 filed in the Japanese Patent Office on Dec. 28, 2007, the entire contents of which being incorporated herein by reference.

BACKGROUND OF THE INVENTION

1. Field of the Invention

The present invention relates to a liquid crystal material exhibiting paraelectricity, and a liquid crystal display device and a liquid crystal display both using the liquid crystal material.

2. Description of the Related Art

Liquid crystal displays displaying an image by driving a liquid crystal display device have a low profile, a light weight, and low power consumption, so the liquid crystal displays are widely used for not only image displays such as televisions or monitors but also information terminals such as digital cameras or cellular phones.

In such liquid crystal displays, as a liquid crystal display system (display mode) of the liquid crystal display device, a twisted nematic (TN) mode using a liquid crystal material exhibiting a nematic liquid crystal phase, a vertical alignment (VA) mode, an in-plane switching (IPS) mode and a fringe field switching (FFS) mode are known (refer to Japanese Unexamined Patent Application Publication No. H06-160878).

Moreover, in addition to the above-described display modes, a display mode using a ferroelectric liquid crystal or an antiferroelectric liquid crystal is known. In the display mode using the ferroelectric liquid crystal or the antiferroelectric liquid crystal, as a liquid crystal material, a chiral liquid crystal molecule exhibiting a smectic liquid crystal phase is typically used. A technique of using both of an achiral liquid crystal molecule exhibiting a smectic liquid crystal phase and an achiral molecule having a bent structure (refer to Japanese Unexamined Patent Application Publication No. 2002-161277) and a technique of using a banana-shaped liquid crystal molecule having a bent structure (refer to Japanese Unexamined Patent Application Publication No. H10-161145) are also known. However, the display mode using the ferroelectric liquid crystal or the antiferroelectric liquid crystal has such an issue that although the response speed is high, temperature characteristics, shock resistance and switching characteristics are low, thereby it is difficult to obtain sufficient display characteristics.

Therefore, display modes which use a liquid crystal material exhibiting a nematic liquid crystal phase so as to easily obtain high display characteristics are widely used, and among them, the VA mode has received attention, because a wide viewing angle is secured.

In a liquid crystal display device of the VA mode, for example, a liquid crystal molecule in a liquid crystal material has negative dielectric-constant anisotropy, that is, such a property that a dielectric constant in a molecular long axis direction is smaller than that in a molecular short axis direction. The liquid crystal display device of the VA mode has a configuration in which the liquid crystal molecule aligned vertically to a substrate falls down in a direction parallel to the substrate in response to the application of a voltage so that light passes through the liquid crystal display device. However, in the VA mode, the liquid crystal molecule falls down in an arbitrary direction, so the alignment direction of the liquid crystal molecule is not fixed, thereby causing a decline in response characteristics with respect to a voltage. Therefore, to improve the response characteristics, a technique of keeping a liquid crystal molecule slightly tilted from a direction of normal to a substrate when a voltage is not applied (a technique of aligning a liquid crystal molecule at a tilt angle) has been considered.

As the technique of providing a tilt angle to a liquid crystal molecule, for example, as illustrated in FIG. 3, a technique of arranging a linear projection on a substrate surface is known (refer to Japanese Patent No. 2947350). In a liquid crystal display device, a liquid crystal layer 500 including liquid crystal molecules 500A is sandwiched between a drive substrate 200 and a facing substrate 300. Electrodes 202 and 302, projections 410 not facing each other, and alignment films 400 being laid over the electrodes 202 and 302 and the linear projections 410 are arranged on facing surfaces of the drive substrate 200 and the facing substrate 300, respectively. In the liquid crystal layer 500, in a state in which a voltage is not applied, the liquid crystal molecules 500A are aligned substantially vertically to the surfaces of the alignment films 400. Therefore, while the liquid crystal molecules 500A are slightly tilted with respect to the surfaces of the drive substrate 200 and the facing substrate 300 in regions near the linear projections 410 (that is, a tilt angle is provided), the liquid crystal molecules 500A in other regions are aligned substantially vertically to the surfaces of the drive substrate 200 and the facing substrate 300. When a voltage is applied to the liquid crystal layer 500 in this state, the tilt of the liquid crystal molecules 500A near the linear projections 410 successively propagate to other liquid crystal molecules 500A, and these liquid crystal molecules 500A respond so as to be aligned substantially horizontally to the surfaces of the drive substrate 200 and the facing substrate 300.

In addition to the above-described technique, a technique of providing a tilt angle by keeping a liquid crystal molecule slightly tilted from a direction of normal to a substrate by a polymer material in a VA mode liquid crystal display device is also known (refer to Japanese Unexamined Patent Application Publication No. 2002-357830). More specifically, after a liquid crystal layer formed by adding monomers having photopolymerizability is sandwiched between substrates, the liquid crystal layer is exposed to light under the application of a voltage for tilting a liquid crystal molecule, to polymerize the monomers so as to form a polymer, thereby a tilting direction of the liquid crystal molecule under no application of the voltage is predetermined.

Moreover, various studies of liquid crystal materials have been conducted, and, for example, a technique of improving response characteristics by including a compound having nonplanarity such as 4-fluorophenyl phenyl ether in a liquid crystal material is known (refer to P. Kilickiran et al., "Towards Faster LCs at Lower Driving Voltage", Proceedings of The 13th International Display Workshops; IDW'06), p. 23).

SUMMARY OF THE INVENTION

In recent liquid crystal displays, a clearer picture is desired, and the screens of the liquid crystal displays tend to be bigger, thereby improvements in display characteristics and response characteristics are desired accordingly. However, in liquid crystal display devices in related arts, it is difficult to obtain sufficient display characteristics and sufficient response characteristics.

More specifically, for example, in the liquid crystal display device illustrated in FIG. 3, there is a lag between a timing when the liquid crystal molecules 500A aligned vertically to the surfaces of the drive substrate 200 and the facing substrate 300 fall down in response to the application of a voltage and a timing when the liquid crystal molecules 500A near the linear projections 410 fall down in response to the application of a voltage. As a result, there is an issue that the response speed of the liquid crystal molecules 500A as a whole becomes slower. In particular, in a gray-scale change from black to an intermediate color, the change amount of an applied voltage is small, so the response speed becomes further slower. Moreover, when a distance between the linear projections 410 is reduced, the response speed is able to be faster; however, top portions of the linear projections 410 do not contribute to transmittance of the liquid crystal display device, so there is an issue that when the proportion of projections is increased, transmittance declines, and display characteristics are impaired.

Moreover, in a technique described in Japanese Unexamined Patent Application Publication No. 2002-357830, it is not easy to perfectly polymerize monomers, so there is high possibility that some unreacted monomers remain, and in this case, a voltage holding property of the liquid crystal material may be deteriorated, and display characteristics may be impaired.

Further, as in the case of P. Kilickiran et al., "Towards Faster LCs at Lower Driving Voltage", Proceedings of The 13th International Display Workshops; IDW'06), p. 23, even in the case where 4-fluorophenyl phenyl ether is used, depending on properties of the liquid crystal material, good response characteristics may not be obtained.

It is desirable to provide a liquid crystal material capable of obtaining good display characteristics and good response characteristics, and to provide a liquid crystal display device and a liquid crystal display using the liquid crystal material.

According to an embodiment of the invention, there is provided a liquid crystal material being a paraelectric material, the liquid crystal material including: a liquid crystal molecule exhibiting a nematic liquid crystal phase at room temperature and including one or more cyclic structures; and a bent-shaped molecule including cyclic structures which are large in number compared to the cyclic structures included in the liquid crystal molecule.

According to an embodiment of the invention, there is provided a liquid crystal display device including: a pair of substrates facing each other; and an electrode and a liquid crystal layer arranged between the pair of substrates, the liquid crystal layer being formed of a liquid crystal material which is a paraelectric material, wherein the liquid crystal material includes: a liquid crystal molecule exhibiting a nematic liquid crystal phase at room temperature and including one or more cyclic structures; and a bent-shaped molecule including cyclic structures which are large in number compared to the cyclic structures included in the liquid crystal molecule.

According to an embodiment of the invention, there is provided a liquid crystal display including: a liquid crystal display device including a pair of substrates facing each other, and an electrode and a liquid crystal layer arranged between the pair of substrates, the liquid crystal layer being formed of a liquid crystal material which is a paraelectric material, wherein the liquid crystal material includes: a liquid crystal molecule exhibiting a nematic liquid crystal phase at room temperature and including one or more cyclic structures; and a bent-shaped molecule including cyclic structures which are large in number compared to the cyclic structures included in the liquid crystal molecule.

Other and further objects, features and advantages of the invention will appear more fully from the following description.

DETAILED DESCRIPTION OF THE PREFERRED EMBODIMENTS

Figure 1A:
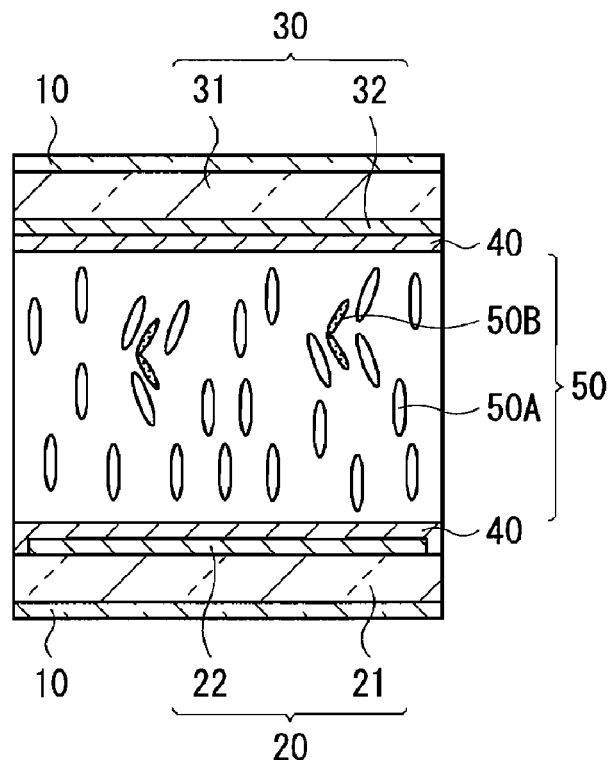
FIG. 1A is a sectional view illustrating a configuration, in a state in which a drive voltage is not applied, of a liquid crystal display device using a liquid crystal material according to an embodiment of the invention.

A preferred embodiment will be described in detail below referring to the accompanying drawings.

A liquid crystal material according to an embodiment of the invention is used in, for example, a liquid crystal display device or a liquid crystal display including the liquid crystal display device. The liquid crystal material includes a liquid crystal molecule exhibiting a nematic liquid crystal phase at room temperature and a bent-shaped molecule. As used herein, "room temperature" means a temperature ranging from 15 degrees Celsius to 40 degrees Celsius both inclusive.

The liquid crystal material is a paraelectric material, that is, a material not having spontaneous polarization (having a spontaneous polarization of substantially zero (0)). As used herein, "a material not having spontaneous polarization" means, for example, in the case where the material is considered as an aggregate of molecules, a material not having macroscopic polarization, because even if the molecules have dipole moments, the molecules are aligned in random directions, thereby the dipole moments are cancelled out (balanced out) as a whole. Alternatively, the material not having spontaneous polarization means, in the case where the material is considered as a solid in which atoms, molecules or the like are aligned, a material not having polarization, because each atom, each molecule, an ion constituting each atom or each molecule, or the like is in a symmetric equilibrium position. An example of such a material not having spontaneous polarization includes a paraelectric material is cited. The paraelectric material is a dielectric material in which dipoles are not aligned in a specific direction, and are aligned randomly (the total dipole moment is zero (0)).

On the other hand, a material having spontaneous polarization means a material having macroscopic polarization, for example, by uniformly aligning the permanent dipole moments of the molecules, or shifting each atom or each ion from a symmetric equilibrium position even in a state in which an electric field is not applied. Examples of a material having spontaneous polarization and exhibiting a liquid crystal phase include a ferroelectric liquid crystal (a ferroelectric material exhibiting a liquid crystal phase) and a ferroelectric liquid crystal (a ferroelectric material exhibiting a liquid crystal phase). The ferroelectric material is a material capable of reversing the direction of polarization by an external electric field among the materials having spontaneous polarization. The ferroelectric material is a material having macroscopic polarization, because the dipoles of molecules configuring the material are aligned in directions opposite to each other (aligned in directions in which their moments are balanced out), but the magnitude of a dipole moment in a forward direction and the magnitude of a dipole moment in a backward direction are different from each other. When the liquid crystal material has such spontaneous polarization, the alignment of the liquid crystal material is easily disturbed, thereby in the case where the liquid crystal material is used in the liquid crystal display device, switching characteristics tend to decline. Therefore, the liquid crystal material is not preferable.

Further, an antiferroelectric material is also a dielectric material in which dipoles of molecules are aligned in directions opposite to each other like the ferroelectric material. In the antiferroelectric material, the magnitude of a dipole moment in a forward reaction and the magnitude of a dipole moment in a backward direction are equal to each other, so the antiferroelectric material does not have spontaneous polarization. However, in the case where a voltage equal to or higher than a predetermined threshold value is applied to generate an electric field, all dipoles are aligned in an electric field direction, so the antiferroelectric material exhibits a ferroelectric phase (phase transition from an antiferroelectric phase to a ferroelectric phase occurs). In the case where such an antiferroelectric material is used as the liquid crystal material, and the phase transition is forced to occur, and the antiferroelectric material is used in the liquid crystal display device, striped domain growth along an in-plane direction of a liquid crystal layer is involved, so degradation in contrast ratio may be caused. Therefore, even though an antiferroelectric liquid crystal (an antiferroelectric material exhibiting a liquid crystal phase) does not have spontaneous polarization, the antiferroelectric liquid crystal is not suitable as the liquid crystal material.

As a method of measuring the spontaneous polarization of the liquid crystal material, a method using pyroelectric properties, a method using D-E hysteresis, a method of observing a polarization reversal current, or the like may be employed.

Moreover, the liquid crystal material includes a plurality of molecules having dielectric anisotropy so as to have dielectric anisotropy as a whole. In other words, the liquid crystal material is configured so that molecules having dielectric anisotropy are aligned in directions different from each other so as not to cancel (balance) dielectric anisotropy out as a whole. Therefore, the liquid crystal material includes a liquid crystal molecule and a bent-shaped molecule both of which will be described later so that the absolute value of the whole dielectric anisotropy becomes larger than zero (0). In addition, dielectric anisotropy ($\Delta\epsilon$) is determined by a difference between a dielectric constant ($\epsilon 1$) in a molecular long axis direction and a dielectric constant ($\epsilon 2$) in a molecular short axis direction, that is, $\Delta\epsilon = \epsilon 1 - \epsilon 2$. The dielectric constant $\epsilon$ is able to be determined by $\epsilon = Cpd/S$ (Cp represents the capacitance of the liquid crystal, d represents the thickness of the liquid crystal layer and S represents the area of a portion where electrodes on two substrates are overlapped each other).

The liquid crystal material preferably exhibits a nematic liquid crystal phase, because in the case where the liquid crystal material is used in the liquid crystal display device, good shock resistance and good temperature characteristics are obtained. Typically, the operating temperature of the liquid crystal display is within a range from 15 degrees C. to 40 degrees C. both inclusive which is room temperature, so the liquid crystal material preferably exhibits a nematic liquid crystal phase at least in the temperature range. However, in a transmissive liquid crystal display, a backlight is arranged on a back surface of a liquid crystal display device mounted in the liquid crystal display, and during its operation, when the backlight illuminates, heat is generated, thereby the temperature of the liquid crystal display device is increased by approximately 10 degrees C. to 20 degrees C. Therefore, a temperature range in which the nematic liquid crystal phase is exhibited is preferably within a range from 15 degrees C. to 60 degrees C. both inclusive which is the room temperature plus 20 degrees C. Moreover, in some cases, the liquid crystal display device may be used in an environment at approximately 0 degrees C. to 60 degrees C., so it is specifically preferable that when heat generation by illumination of the backlight is considered, a nematic liquid crystal phase is exhibited within a range from 0 degrees C. to 80 degrees C. both inclusive.

The average molecular weight of the liquid crystal material is preferably within a range from 200 to 800 both inclusive. When the average molecular weight is smaller than 200, volatility is increased, and in a step of manufacturing the liquid crystal display device, a change in composition as a whole easily occurs, and the composition ratio between the liquid crystal molecule and the bent-shaped molecule becomes imbalanced, and in the case where the liquid crystal material is used in the liquid crystal display device, a decline in transmittance or response characteristics may occur, as will be described later in detail. On the other hand, in the case where the average molecular weight exceeds 800, the phase transition temperature of the liquid crystal material is increased to cause a difficulty in exhibiting the nematic liquid crystal phase, and the viscosity is easily increased, so in the case where the liquid crystal material is used in the liquid crystal display device, it is difficult to obtain sufficient response characteristics. As used herein, "the average molecular weight of the liquid crystal material" is determined by adding the products of the molecular weight of each component included in the liquid crystal material and the weight ratio of each component together, and in the case where the components are, for example, a component 1 (one) to a component "n" (n is an integer), the average molecular weight of the liquid crystal material is determined by:

the average molecular weight of the liquid crystal material=(the molecular weight of the component 1×the weight ratio of the component 1)+(the molecular weight of the component 2×the weight ratio of the component 2)+ . . . +(the molecular weight of the component n×the weight ratio of the component n).

The lower limit of the average molecular weight is preferably 220 or more, and more preferably 300 or more. Moreover, the upper limit of the average molecular weight is more preferably 500 or less, because in the case where the liquid crystal material is used in the liquid crystal display device, high display characteristics and high response characteristics are obtained.

The liquid crystal molecule is a cyclic organic compound having a cyclic structure with a carbon skeleton as a base, and is a so-called rod-like molecule exhibiting a nematic liquid crystal phase at room temperature and having dielectric anisotropy. Only one kind or a mixture of a plurality of kinds of the liquid crystal molecules may be used. The "cyclic structure" means a carbocycle or a heterocycle as described above, and examples of the carbocycle include a cyclohydrocarbon such as cyclopentane ring, a cyclohexane ring and a bicyclodecane ring (a decahydronaphthalene ring), and an aromatic ring such as a cyclopentadiene ring, a benzene ring, a naphthalene ring and an anthracene ring. Examples of the heterocycle include a pyridine ring, a pyrimidine ring, a thiophene ring, a lactone ring, a dioxane ring and the like. The "cyclic organic compound" means a compound formed by introducing a substituent group into the above-described cyclic structure. Examples of the substituent group include a hydrogen group (—H), a halogen group, an alkyl group (—$C_nH_{2n+1}$), an alkylene group (—$C_nH_{2n}$—), an alkoxyl group (—O—$C_nH_{2n+1}$), an alkenyl group (—$C_nH_{2n-1}$), an alkenylene group (—$C_nH_{2n-2}$—), an alkynyl group (—$C_nH_{2n-3}$), and a halogenated group thereof, an alkynylene group (—$C_nH_{2n-4}$-), an oxy group (—O—), a carbonyl group (—CO—), a carboxyl group (—COOH), a nitro group (—$NO_2$), a cyano group (—CN), a group having a carbon-nitrogen double bond (—HC=N—) and the like. The meaning of the above-described "cyclic organic compound" is the same in the bent-shaped molecule which will be described later.

The number of cyclic structures included in the liquid crystal molecule is preferably 2 or more, because a nematic liquid crystal phase is easily exhibited in a wide temperature range. In particular, the number of the cyclic structures is preferably within a range from 2 to 4 both inclusive, and more preferably within a range from 2 to 3 both inclusive.

The liquid crystal molecule is preferably an achiral compound, that is, a compound in which asymmetric carbon is not included in a molecule because of the following reason. In the case where the liquid crystal material is made of a chiral liquid crystal molecule (a compound having asymmetric carbon in a molecule), or in the case where the liquid crystal material includes a chiral liquid crystal molecule, the alignment direction of the molecular axis of the liquid crystal molecule is changed successively in space, and the liquid crystal material has a macroscopic helical structure as a whole. In this case, the liquid crystal material has a property (selective reflection) of reflecting light corresponding to a helical period (a helical pitch), so when the selective reflection wavelength is approximately the wavelength of visible light, a color is given. In other words, when the liquid crystal molecule is a chiral compound, the liquid crystal material may give a color, thereby there is a possibility that the liquid crystal material becomes unsuitable to be used in the liquid crystal display device.

Typically, in the case where a chiral liquid crystal molecule is used in the liquid crystal display device, the helical pitch is adjusted in the whole liquid crystal material so that the selective reflection wavelength is set on a long wavelength side, thereby light use efficiency and color balance in white display are optimized. However, in the case where the bent-shaped molecule which will be described later exhibits a liquid crystal phase in spite of being an achiral compound, some bent-shaped molecules generate anisotropy (chirality) depending on the bent direction of the bent-shaped structure or the tilt direction of the molecules. In the case where the bent-shaped molecule generates chirality, when the liquid crystal molecule is a chiral compound, the twisting power of the helical structure is increased, and the helical pitch is reduced, and the selective reflection wavelength is shifted to a short wavelength side, Moreover, the selective reflection wavelength has temperature dependence. Thereby, in the liquid crystal display device using the chiral compound as the liquid crystal molecule, the liquid crystal material gives a color, and the color may have temperature dependence. Therefore, the liquid crystal molecule is preferably an achiral compound which does not give a color by selective reflection. In addition, in the case where the liquid crystal material is used in the liquid crystal display device, as long as the liquid crystal material does not give a color, the liquid crystal material may include a chiral liquid crystal molecule.

Further, selective reflection is related to the average refractive index of a medium as well as the helical pitch, and light of the selective reflection wavelength is light with a wavelength width $\Delta\lambda=P\Delta n$ ($\Delta n$ represents anisotropy of a refractive index) centered on a wavelength $\lambda=nP$ (n represents an average refractive index, and P represents a helical pitch). The selective reflection wavelength is able to be measured by, for example, a circular dichroism spectrophotometer.

The liquid crystal molecule preferably includes carbon (C) and an element selected from the group consisting of hydrogen (H), oxygen (O) and halogens, because good heat resistance and good light resistance are easily obtained, and specific resistance and a voltage holding ratio are easily increased. In the case where the liquid crystal molecule includes a halogen, at least one of fluorine and chlorine is preferably included, and in particular, fluorine is preferably included, because the voltage holding ratio is further increased.

The molecular weight of the liquid crystal molecule is preferably within a range from 200 to 800 both inclusive. In this range, a nematic liquid crystal phase is easily exhibited at room temperature.

The bent-shaped molecule is a cyclic organic compound, and has one or two or more bent parts so as to have a bent structure as a whole. The number of cyclic structures included in the bent-shaped molecule is larger than the number of cyclic structures included in the liquid crystal molecule, because in the liquid crystal material, the alignment of the liquid crystal molecule is favorably adjusted and stabilized. More specifically, in the bent-shaped molecule, the length from the bent part of the molecule to an end thereof or structural rigidity affects the alignment of the liquid crystal molecule, so when the bent-shaped molecule has more cyclic structures than the liquid crystal molecule, the alignment of the liquid crystal molecule is further stabilized. In particular, since a high effect is obtained, the number of cyclic structures included in the bent-shaped molecule is preferably twice or more times as large as the number of cyclic structures included in the liquid crystal molecule, that is, the number of cyclic structures in the liquid crystal molecule is preferably equal to or smaller than half the number of cyclic structures in the bent-shaped molecule. More specifically, the number of cyclic structures in the bent-shaped molecule is preferably within a range from 4 to 9 both inclusive. Assuming that the number of cyclic structures included in the bent-shaped molecule is 3, and the bent-shaped molecule has one bent part, for example, a compound having one cyclic structure and other two cyclic structures combined with the one cyclic structure at the bent part, or a compound in which the bent part is made of one cyclic structure, and other two cyclic structures are combined with each other at the bent part may be employed. In this case, the length from the bent part of the bent-shaped molecule to a molecular end may be longer than the length in a long axis direction of the liquid crystal molecule, and the alignment of the liquid crystal molecule may be disturbed without adjusting the alignment. On the other hand, when the number of cyclic structures included in the bent-shaped molecule is 10 or more, a decline in compatibility with the liquid crystal molecule, an increase in viscosity, an improvement in crystallinity or the like may occur. In particular, the number of cyclic structures included in the bent-shaped molecule is preferably within a range from 5 to 9 both inclusive, and more preferably within a range from 5 to 7 both inclusive.

As the elements of the bent-shaped molecule, carbon, hydrogen, nitrogen (N), sulfur (S), oxygen, halogens and the like may be employed, and among them, the bent-shaped molecule preferably include carbon and an element selected from the group consisting of hydrogen, oxygen and halogens, because good heat resistance and good light resistance are easily obtained, and specific resistance and the voltage holding ratio are easily increased. Thereby, even if the liquid crystal material is exposed to a high temperature atmosphere or light, the voltage holding ratio is not impaired, and the state in which the alignment of the liquid crystal molecule is adjusted is maintained. Moreover, as a specific example of a bent-shaped molecule exhibiting low light resistance, a bent-shaped molecule having a carbon-nitrogen double bond in the molecule is cited, and in this case, decomposition or isomerization by irradiation of light in a visible and ultraviolet range easily occurs.

Moreover, the bent-shaped molecule may have dielectric anisotropy, and in this case, the sign of the dielectric anisotropy is preferably the same as that of the dielectric anisotropy of the above-described liquid crystal molecule. Thereby, in the case where the bent-shaped molecule is used in the liquid crystal display device, when a drive voltage is applied, the bent-shaped molecule spontaneously shows the same response as that of the liquid crystal molecule. Therefore, good display characteristics are obtained.

The bent-shaped molecule preferably exhibits a liquid crystal phase, and more preferably exhibits a nematic liquid crystal phase or a smectic liquid crystal phase, It is particularly preferable that the bent-shaped molecule a exhibits a nematic liquid crystal phase, because compatibility with the liquid crystal molecule is enhanced.

The bent-shaped molecule preferably includes at least one kind selected from the group consisting of a chlorine group (—Cl), a bromine group (—Br), a fluorine group (—F), a nitro group (—NO$_2$), a cyano group (—CN), a trifluoromethyl group (—CF$_3$), difluoromethoxy group (—O—CHF$_2$) and a trifluoromethoxy group (—O—CF$_3$) as a substituent group. Thereby, the specific resistance is increased, and a high voltage holding ratio is maintained at high temperature. Therefore, in the case where the liquid crystal material is used in the liquid crystal display device, the liquid crystal material is able to contribute to a decline in constant and the prevention of the occurrence of a flicker, and the prevention of burn-in. Among them, the fluorine group or a substituent group including fluorine is preferable, because viscosity is reduced by the fluorine group or the substituent group. The fluorine group or the substituent group including fluorine enhances the polarity of a molecule. Therefore, for example, when the fluorine group or the substituent group is introduced into the bent-shaped molecule in a short axis direction, large negative dielectric anisotropy is able to be provided. Thereby, in the case where the liquid crystal material is used in a VA mode liquid crystal display device, repulsion between the short axis direction of the bent-shaped molecule and an alignment film becomes stronger so that the bent-shaped molecule is substantially vertically aligned.

The bent-shaped molecule may be an achiral compound. However, as described above, even if the bent-shaped molecule is an achiral compound, some bent-shaped molecules generate anisotropy depending on the bent direction of the bent structure or the tilt direction of molecule.

The molecular weight of the bent-shaped molecule is preferably larger than the average molecular weight of the liquid crystal material. When the molecular weight of the bent-shaped molecule is smaller than the average molecular weight of the whole liquid crystal material, the whole viscosity declines, and the alignment of the liquid crystal molecule is easily disturbed, and when the molecular weight of the bent-shaped molecule is larger than the average molecular weight of the whole liquid crystal material, the alignment of the liquid crystal molecule is favorably adjusted, and easily stabilized. In particular, the molecular weight of the bent-shaped molecule is preferably within a range from larger than 300 to 1000, because a high effect is obtained. In other words, when the molecular weight of the bent-shaped molecule is larger than 300, the alignment of the liquid crystal molecule is further stabilized, and the bent-shaped molecule is resistant to evaporation even in a reduced pressure atmosphere, so a sufficient effect is easily obtained. Moreover, when the molecular weight of the bent-shaped molecule is 1000 or less, an increase in viscosity is moderately limited, so a liquid crystal phase is reliably exhibited, and compatibility with the liquid crystal molecule is favorably maintained. It is particularly preferable that the molecular weight of the bent-shaped molecule be within a range from 310 to 800 both inclusive, because a higher effect is obtained.

The content of the bent-shaped molecule in the liquid crystal material is preferably within a range from 0.2 wt % to less than 50 wt %, because when the content is larger than 0.2 wt %, a sufficient effect is easily obtained. Moreover, when the content is less than 50 wt %, good transmittance is obtained, and even in the case where the bent-shaped molecule exhibits a liquid crystal phase, there is little possibility that the liquid crystal material generates spontaneous polarization. In particular, the content is preferably within a range from 0.2 wt % to less than 20 wt %, and particularly preferably within a range from 0.2 wt % to less than 10 wt %, because the liquid crystal material easily exhibits a nematic liquid crystal phase in a wide temperature range.

As the bent-shaped molecule, for example, a bent-shaped molecule represented by Chemical Formula 1 may be employed. In Chemical Formula 1, A is a divalent group, and corresponds to the bent part. Moreover, W1 and W2 each are a univalent group having a cyclic structure, and may be the same as or different from each other. The valence angle of W1-A-W2 is less than 180 degrees.

Chemical Formula 1

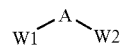

The valence angle of W1-A-W2 represented in Chemical Formula 1 is preferably 90 degrees or over, and more preferably within a range from 115 degrees to less than 160 degrees, and particularly preferably within a range from 120 degrees to less than 155 degrees, because a high effect is obtained.

As "A" in Chemical Formula 1, for example, a group having a cyclic structure or a group having a nonlinear structure may be employed. In addition, "a nonlinear structure" means a structure having a valence angle of W1-A-W2 of less than 180 degrees and not including a cyclic structure. In particular, "A" preferably has a cyclic structure, because the bent part is rigid, so the alignment of the liquid crystal molecule is further stabilized. In the case where "A" has a cyclic structure, "A" is preferably a group having 4 to 14 carbon atoms, both inclusive.

The number of cyclic structures included in each of W1 and W2 in Chemical Formula 1 is preferably 2 or more, because a high effect is obtained. Moreover, the number of the cyclic structures in W1 is preferably equal to the number of the cyclic structures in W2, because a high effect is obtained.

Examples of "A" in Chemical Formula 1 include groups represented by Chemical Formula 2 and the like. "X" in Chemical Formula 2 is a hydrogen group (—H), a chlorine group, a bromine group, a fluorine group, a nitro group, a cyano group, a trifluoromethyl group, a difluoromethoxy group or a trifluoromethoxy group, and may be the same or different. Moreover, "n" in Chemical Formula 2 is an integer of one (1) or more. In the case where "A" is a group represented by Chemical Formula 2(1), the valence angle of W1-A-W2 is approximately 120 degrees, and in the case where "A" is a group represented by Chemical Formula 2(7), the valence angle of W1-A-W2 is approximately 154 degrees.

Chemical Formula 2

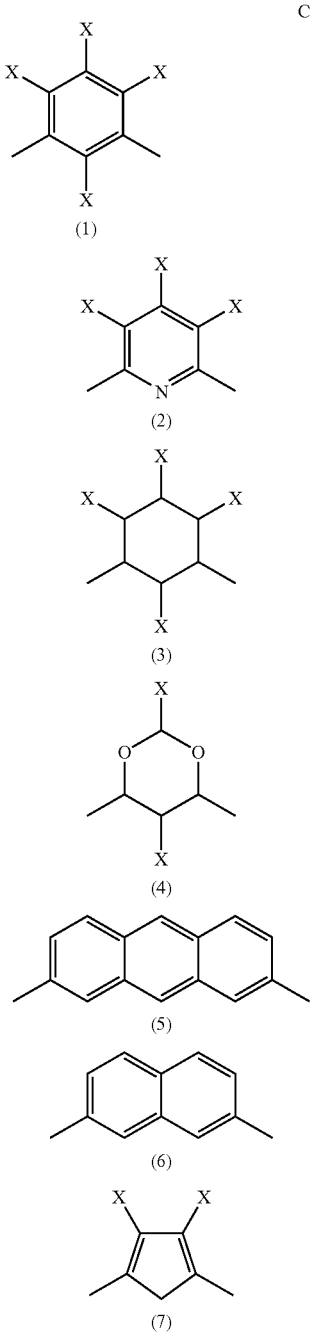

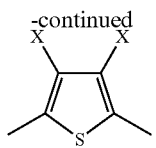

(8)

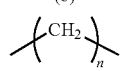

(9)

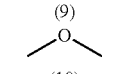

(10)

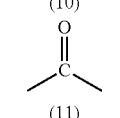

(11)

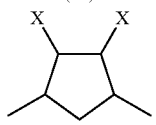

(12)

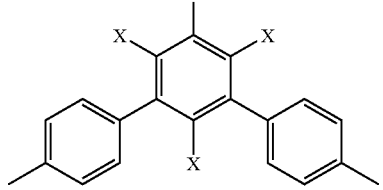

(13)

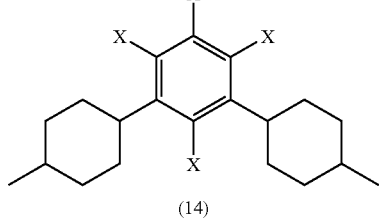

(14)

Moreover, at least one of W1 and W2 in Chemical Formula 1 may be a group represented by Chemical Formula 3. In this case, examples of "B" in Chemical Formula 3 include groups represented by Chemical Formula 4 and like, and examples of R1 in Chemical Formula 3 include groups represented by Chemical Formula 5 and the like. "B" in Chemical Formula 3 is a divalent group having a cyclic structure. "R1" in Chemical Formula 3 is a divalent group including an element selected from the group consisting of carbon, hydrogen, oxygen, nitrogen and halogens. Moreover, "n" in Chemical Formula 3 is an integer of 1 or more. In Chemical Formula 3, in the case where "n" is 2 or more, "B" and "R1" may be the same or different. In particular, "n" in Chemical Formula 3 is preferably within a range from 1 to 5 both inclusive, because a high effect is obtained. More specifically, when "n" in Chemical Formula 3 is 6 or more, an increase in viscosity of the bent-shaped molecule, an improvement in crystallinity, a decline in compatibility with liquid crystal molecule or the like may occur. In particular, "n" in Chemical Formula 3 is preferably 2 or 3. "R2" in Chemical formula 3 is an alkyl group, an alkoxyl group, an alkenyl group or an alkenyloxyl group having 1 to 20 carbon atoms, both inclusive. "X" in Chemical Formula 4 is a hydrogen group, a chlorine group, a bromine group, a fluorine group, a nitro group, a cyano group, a trifluoromethyl group, a difluoromethoxy group, or a trifluoromethoxy group, and may be the same or different.

Examples of the liquid crystal skeleton include a tolan-based skeleton, a naphthalene-based skeleton, a biphenyl-based skeleton, a phenylcyclohexane-based skeleton, a biphenylcyclohexane-based skeleton, a phenylbicyclohexane-based skeleton, a terphenyl-based skeleton, a bicyclohexyl-based skeleton, a cyclohexylcyclohexene-based skeleton, a diphenylcyclohexane-based skeleton, a dicyclohexylbenzene-based skeleton, a dioxane-based skeleton, an indane-based skeleton, cyclohexyl benzoate-based skeleton, a phenyl cyclohexylcarboxylate-based skeleton, a phenyl benzoate-based skeleton, a cyclohexyl cyclohexanecarboxylate-based skeleton, a biphenylyl benzoate-based skeleton, a phenyl biphenylcarboxylate-based skeleton, a bicyclohexyl benzoate-based skeleton, a phenylcyclohexyl benzoate-based skeleton, a phenyl phenylcyclohexanecarboxylate-based skeleton, a cyclohexylstyrene-based skeleton, a dicyclohexylethene-based skeleton, a stilbene-based skeleton, a diphenylethane-based skeleton, a dicyclohexylethane-based skeleton, a phenylcyclohexylethane-based skeleton, a skeleton in which a cyclohexane ring and a biphenyl-based skeleton are linked through an ethylene group, a skeleton in which a phenylcyclohexane-based skeleton and a cyclohexane ring are linked through an ethylene group, a skeleton in which a phenylcyclohexane-based skeleton and a benzene ring are linked through an ethylene group, a skeleton in which a bicyclohexane-based skeleton and a benzene ring are linked through an ethylene group, a skeleton in which a benzene ring and a biphenyl-based skeleton are linked through an ethylene group, a skeleton in which a propenylphenyl ether-based skeleton and a cyclohexane ring are linked, a skeleton in which a propenylphenyl ether-based skeleton and a bicyclohexane-based skeleton are linked, a Schiff base-based skeleton, a biphenyl carboxylate-based skeleton, a cyclohexyl benzoate-based skeleton, a phenylcyclohexane carboxylate-based skeleton, a skeleton having a difluoromethyleneoxy group, and the like. Only one kind or a plurality of kinds selected from them may be included. Among them, at least one kind selected from the group consisting of the tolan-based skeleton, the naphthalene-based skeleton, the biphenyl-based skeleton, the phenylcyclohexane-based skeleton, the biphenylcyclohexane-based skeleton, the phenylbicyclohexane-based skeleton, the terphenyl-based skeleton, the bicyclohexyl-based skeleton, the cyclohexylcyclohexene-based skeleton, the cyclohexyl benzoate-based skeleton, the phenyl benzoate-based skeleton and the Schiff base-based skeleton is preferably included, because high stability is obtained. As examples of the above-described liquid crystal skeleton, skeletons represented by Chemical Formulas 6 to 32 may be employed. The properties of the above-described liquid crystal skeletons will be described below.

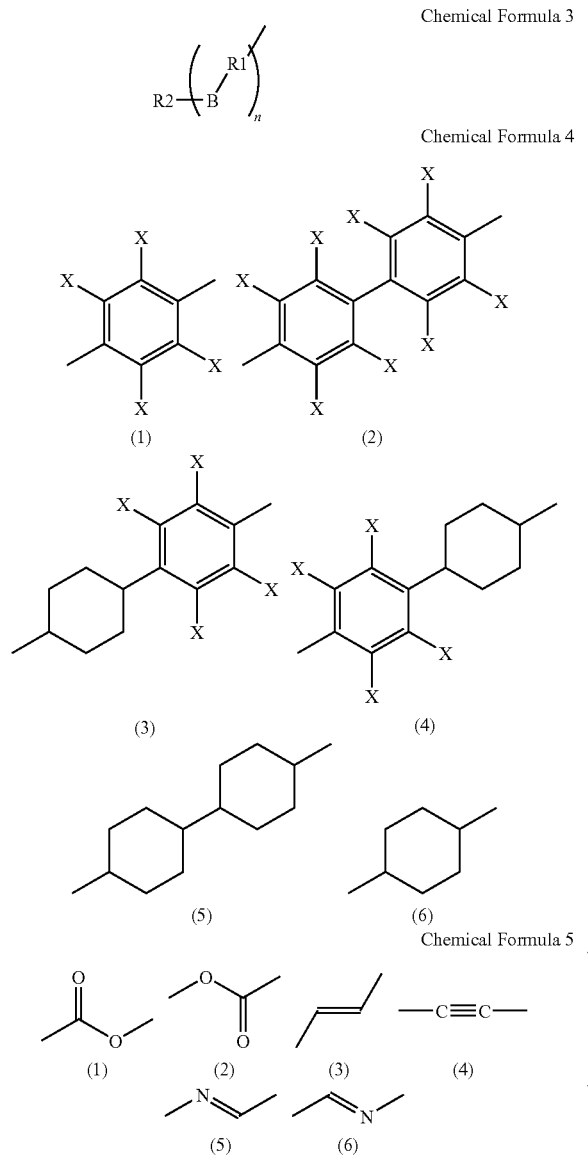

Moreover, in the bent-shaped molecule represented in Chemical Formula 1, at least one of W1 and W2 preferably has a liquid crystal skeleton. The liquid crystal skeleton means a skeleton having a cyclic structure included in a compound exhibiting a liquid crystal phase, and is a skeleton characterizing properties such as phase transition temperature, dielectric constant, chemical stability and viscosity. When at least one of W1 and W2 has the liquid crystal skeleton, the bent-shaped molecule easily exhibits a liquid crystal phase, and easily exhibits good characteristics which will be described later. In particular, W1 and W2 more preferably have the same liquid crystal skeleton, because a higher effect is obtained. Moreover, the liquid crystal skeleton is preferably the same as a liquid crystal skeleton included in the above-described liquid crystal molecule, because compatibility between the bent-shaped molecule and the liquid crystal molecule is improved.

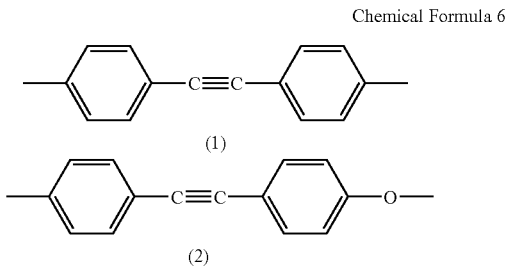

-continued

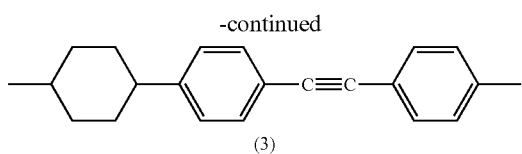
(3)

The skeletons represented in Chemical Formula 6 are examples of the tolan-based skeleton, and in the case where the tolan-based skeleton is included, properties in which the liquid crystal phase-isotropic phase transition temperature is high, and in which viscosity in a low temperature range is low are easily exhibited. Thereby, in the case where the tolan-based skeleton is used in the liquid crystal display device, the upper limit temperature when using the liquid crystal material is increased, and the tolan-based skeleton contributes to an improvement in response characteristics at a low temperature range.

Chemical Formula 7

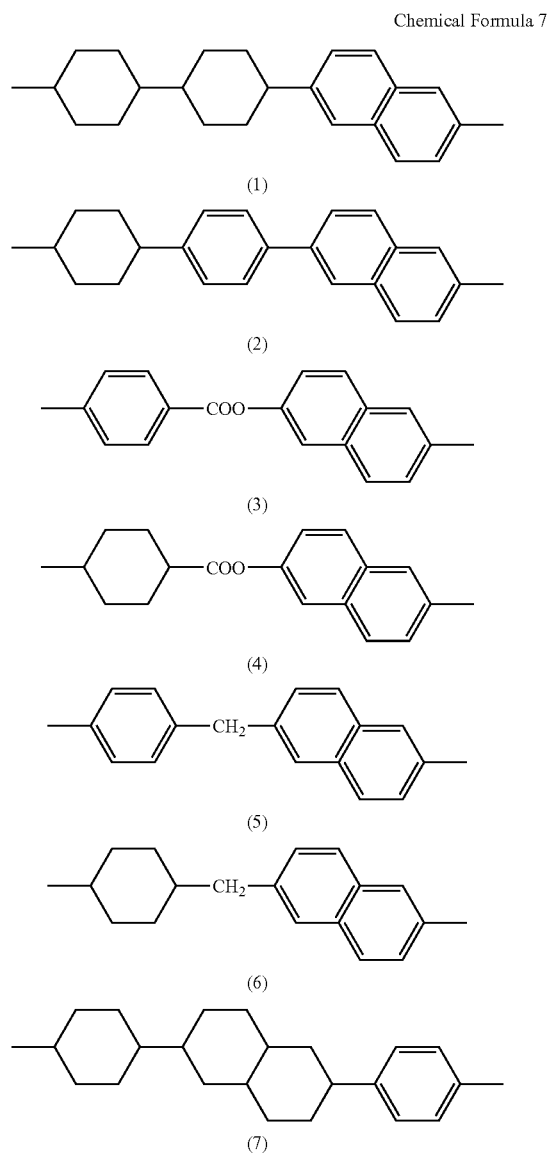

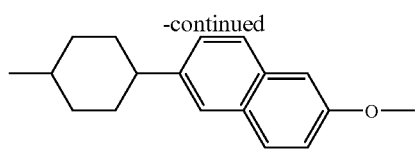
(8)

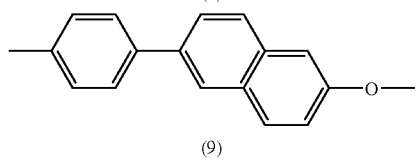
(9)

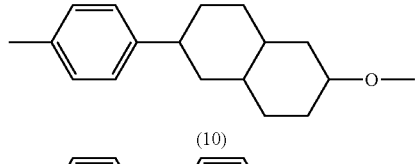
(10)

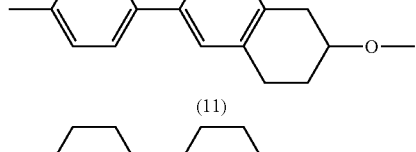
(11)

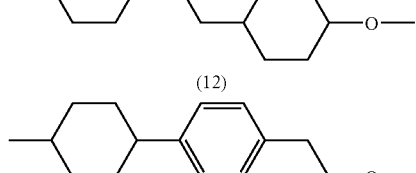
(12)

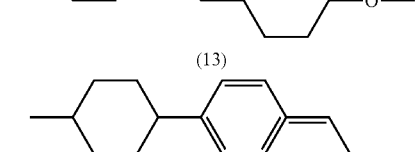
(13)

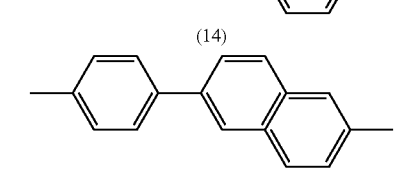
(14)

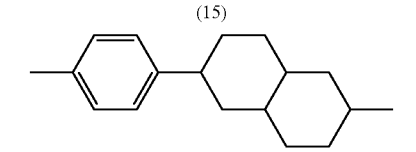
(15)

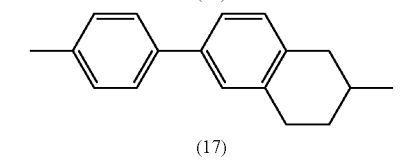
(16)

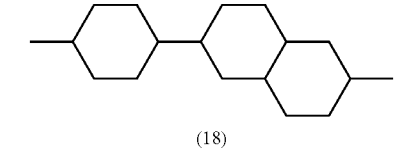
(17)

(18)

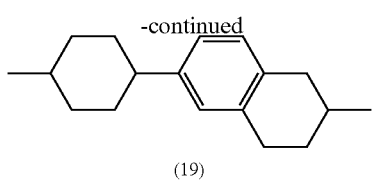

(19)

The skeletons represented in Chemical Formula 7 are examples of the naphthalene-based skeleton, and in the case where the naphthalene-based skeleton is included, properties in which that the viscosity is low, and in which the dielectric constant is high are easily exhibited. Thereby, in the case where the naphthalene-based skeleton is used in the liquid crystal display device, high response characteristics are obtained, and the liquid crystal display device is able to be driven by a low voltage, so power consumption is reduced. As the naphthalene-based skeleton, a skeleton having a naphthalene ring, a skeleton having a tetrahydronaphthalene ring and a skeleton having a decahydronaphthalene ring may be employed.

Chemical Formula 8

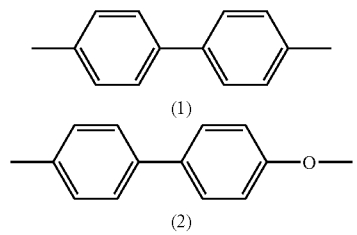

The skeletons represented in Chemical Formula 8 are examples of the biphenyl-based skeleton, and in the case where the biphenyl-based skeleton is included, chemical stability against, moisture, air, heat, irradiation of infrared, visible and ultraviolet regions, or a DC/AC electric field may be high. Thereby, in the case where the biphenyl-based skeleton is used in the liquid crystal display device, the biphenyl-based skeleton contributes to an improvement in durability.

Chemical Formula 9

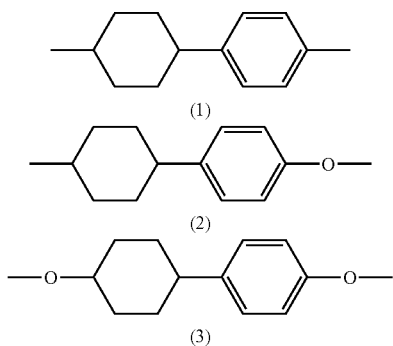

The skeletons represented in Chemical Formula 9 are examples of the phenylcyclohexane-based skeleton, and in the case where the phenylcyclohexane-based skeleton is included, low viscosity is exhibited, and the same properties as those in the case where the biphenyl-based skeleton is included are easily exhibited. Thereby, in the case where the phenylcyclohexane-based skeleton is used in the liquid crystal display device, the phenylcyclohexane-based skeleton contributes an improvement in response characteristics and durability.

Chemical Formula 10

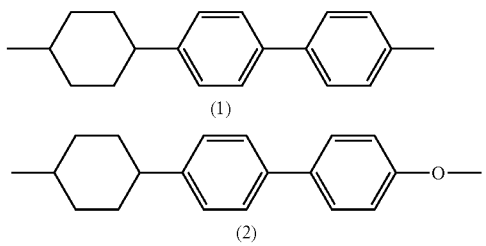

The skeletons represented in Chemical Formula 10 are examples of the biphenylcyclohexane-based skeleton, and in the case where the biphenylcyclohexane-based skeleton is included, the liquid crystal phase-isotropic phase transition temperature is high, and the same properties as those in the case where the biphenyl-based skeleton is included are easily exhibited. Thereby, in the case where the biphenylcyclohexane-based skeleton is used in the liquid crystal display device, the maximum temperature when using the liquid crystal material is increased, and the biphenylcyclohexane-based skeleton contributes an improvement in durability.

Chemical Formula 11

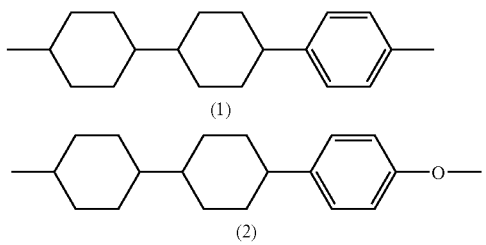

The skeletons represented in Chemical Formula 11 are examples of the phenylbicyclohexane-based skeleton, and in the case where the phenylbicyclohexane-based skeleton is included, the viscosity is low, and the same properties as those in the case where the biphenylcyclohexane-based skeleton is included are easily exhibited. Thereby, in the case where the phenylbicyclohexane-based skeleton is used in the liquid crystal display device, the maximum temperature when using the liquid crystal material is increased, and the phenylbicyclohexane-based skeleton contributes to an improvement in durability and response characteristics.

Chemical Formula 12

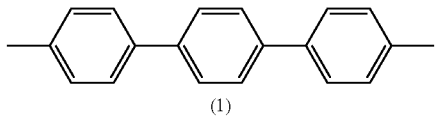

-continued

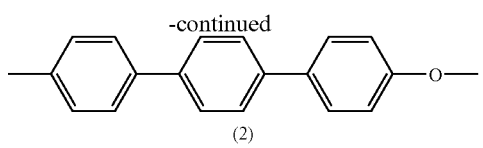

(2)

The skeletons represented in Chemical Formula 12 are examples of the terphenyl-based skeleton, and in the case where the terphenyl-based skeleton is used, the same properties as those in the case where the biphenylcyclohexane-based skeleton is included are easily exhibited.

Chemical Formula 13

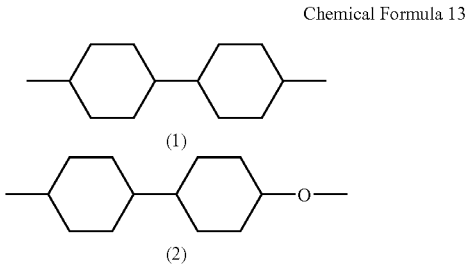

(1)

(2)

The skeletons represented in Chemical Formula 13 are examples of the bicyclohexyl-based skeleton, and in the case where the bicyclohexyl-based skeleton is included, the same properties as those in the case where the biphenyl-based skeleton is included are easily exhibited.

Chemical Formula 14

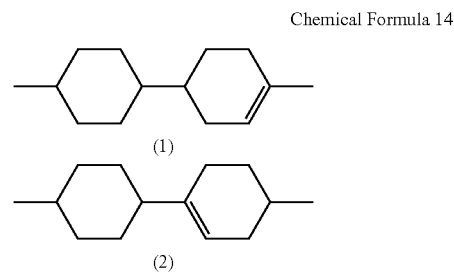

(1)

(2)

The skeletons represented in Chemical Formula 14 are examples of the cyclohexylcyclohexene-based skeleton, and in the case where the cyclohexylcyclohexene-based skeleton is included, a nematic liquid crystal phase is easily exhibited at room temperature, and the same properties as those in the case where the phenylcyclohexane-based skeleton is included are easily exhibited. Thereby, in the case where the cyclohexylcyclohexene-based skeleton is used in the liquid crystal display device, the cyclohexylcyclohexene-based skeleton contributes to an improvement in response characteristics and durability.

Chemical Formula 15

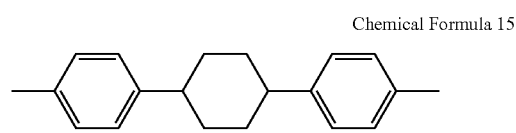

The skeleton represented in Chemical Formula 15 is an example of the diphenylcyclohexane-based skeleton, and in the case where the diphenylcyclohexane-based skeleton is included, the liquid crystal phase-isotropic phase transition temperature may be high. Thereby, in the case where the diphenylcyclohexane-based skeleton is used in the liquid crystal display device, the diphenylcyclohexane-based skeleton contributes to an increase in the upper limit temperature when using the liquid crystal material.

Chemical Formula 16

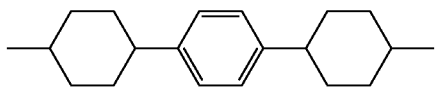

The skeleton represented in Chemical Formula 16 is an example of the dicyclohexylbenzene-based skeleton, and in the case where the dicyclohexylbenzene-based skeleton is included, the same properties as those in the case where the diphenylcyclohexane-based skeleton is included are easily exhibited.

Chemical Formula 17

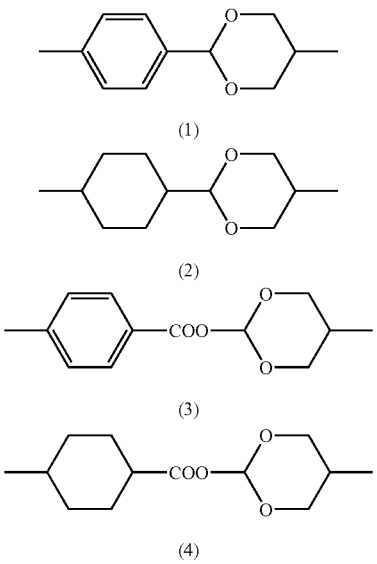

(1)

(2)

(3)

(4)

The skeletons represented in Chemical Formula 17 are examples of the dioxane-based skeleton, and in the case where the dioxane-based skeleton is included, the same properties as those in the case where the biphenyl-based skeleton is included are easily exhibited. In particular, a skeleton in which a cyclohexane ring and a 1,3-dioxane ring are linked, a skeleton in which a cyclohexane ring and a 1,3-dioxane ring are linked through a carboxylate bond, a skeleton in which a benzene ring and a 1,3-dioxane ring are linked, and a skeleton in which a benzene ring and a 1,3-dioxane ring are linked through a carboxylate bond are preferable, because higher stability is exhibited.

Chemical Formula 18

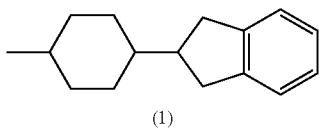

(1)

-continued

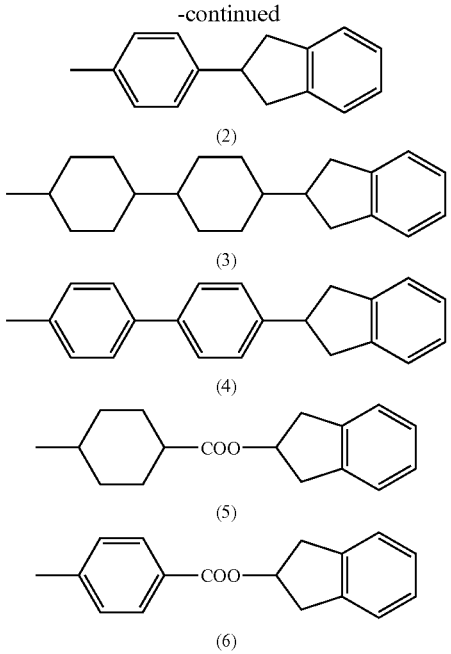

(2)

(3)

(4)

(5)

(6)

The skeletons represented in Chemical Formula 18 are examples of the indane-based skeleton, and in the case where the indane-based skeleton is included, the lower limit temperature of a liquid crystal phase is low, and the same properties as those in the case where the biphenylcyclohexane-based skeleton is included are easily exhibited. Thereby, in the case where the indane-based skeleton is used in the liquid crystal display device, the temperature range when using the liquid crystal material becomes wider, and the indane-based skeleton contributes to an improvement in durability. Therefore, the indane-based skeleton is very useful for a liquid crystal display device adaptable to outdoor use or in-vehicle use.

Chemcal Formula 19

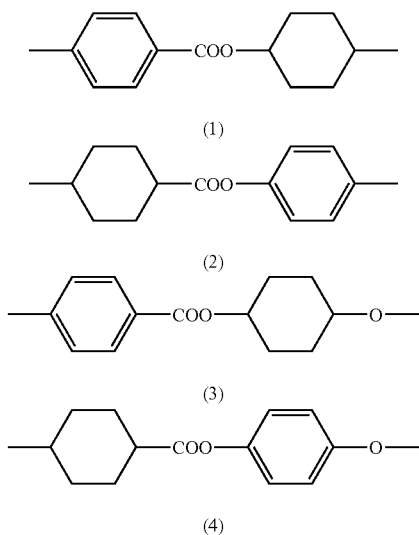

(1)

(2)

(3)

(4)

The skeletons represented in Chemical Formula 19 are examples of the cyclohexyl benzoate-based skeleton or the phenyl cyclohexylcarboxylate-based skeleton, and in the case where the cyclohexyl benzoate-based skeleton or the phenyl cyclohexylcarboxylate-based skeleton is included, the same properties as those in the case where the phenylcyclohexane-based skeleton is included are easily exhibited.

Chemcal Formula 20

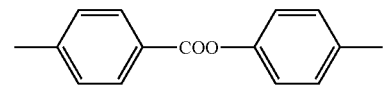

(1)

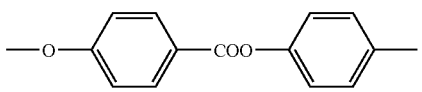

(2)

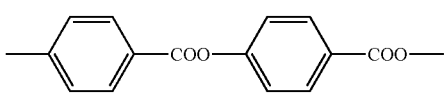

(3)

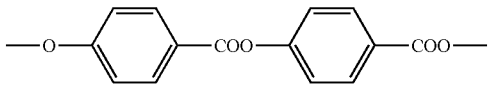

(4)

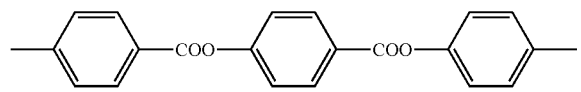

(5)

The skeletons represented in Chemical Formula 20 are examples of the phenyl benzoate-based skeleton, and in the case where the phenyl benzoate-based skeleton is included, the same properties as those in the case where the biphenyl-based skeleton is included are easily exhibited.

Chemical Formula 21

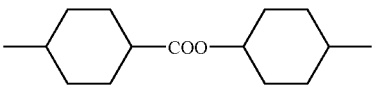

(1)

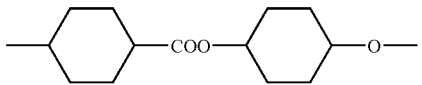

(2)

The skeletons represented in Chemical Formula 21 are examples of the cyclohexyl cyclohexanecarboxylate-based skeleton, and in the case where the cyclohexyl cyclohexanecarboxylate-based skeleton is included, the same properties as those in the case where the biphenyl-based skeleton is included are easily exhibited.

Chemical Formula 22

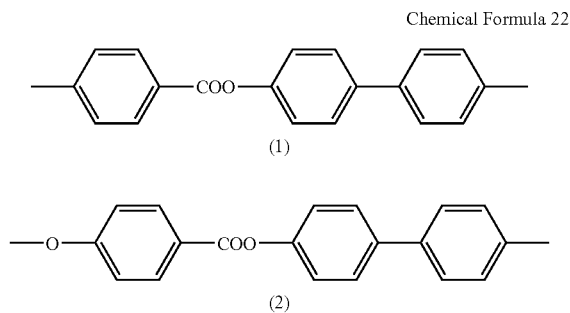

The skeletons represented in Chemical Formula 22 are examples of the biphenylyl benzoate-based skeleton, and in the case where the biphenylyl benzoate-based skeleton is included, the same properties as those in the case where the biphenylcyclohexane-based skeleton is included are easily exhibited.

Chemical Formula 23

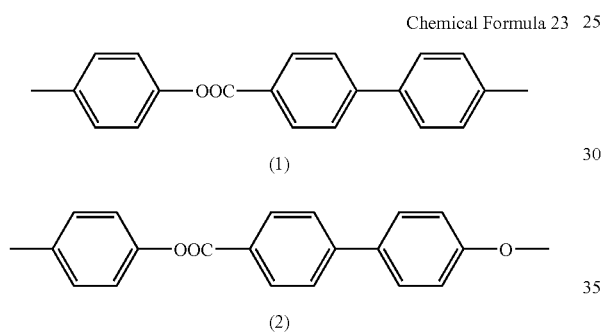

The skeletons represented in Chemical Formula 23 are examples of the phenyl biphenylcarboxylate-based skeleton, and in the case where the phenyl biphenylcarboxylate-based skeleton is included, the same properties as those in the case where biphenylcyclohexane-based skeleton is included are easily exhibited.

Chemical Formula 24

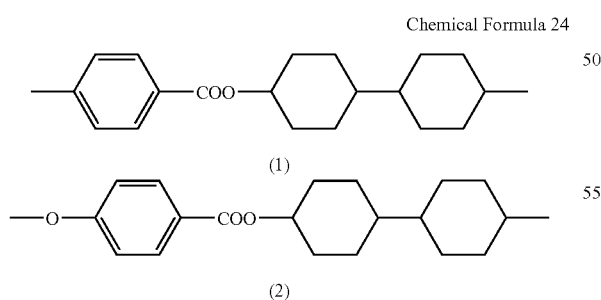

The skeletons represented in Chemical Formula 24 are examples of the bicyclohexyl benzoate-based skeleton, and in the case where the bicyclohexyl benzoate-based skeleton is included, the same properties as those in the case where the biphenylcyclohexane-based skeleton is included are easily exhibited.

Chemical Formula 25

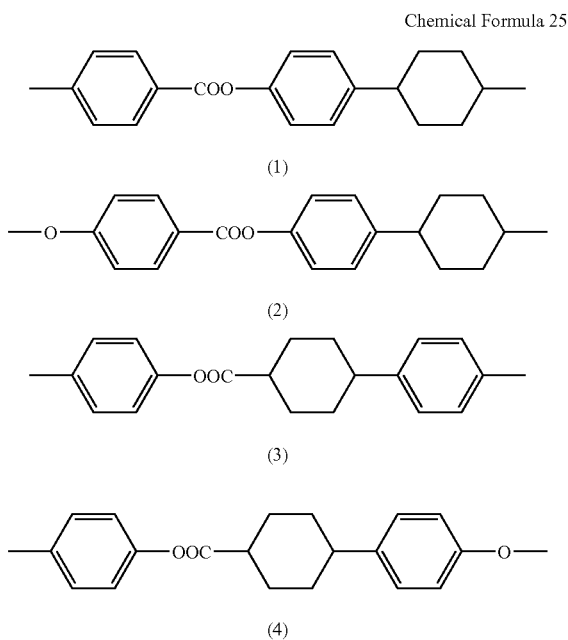

The skeletons represented in Chemical Formula 25 are examples of the phenylcyclohexyl benzoate-based skeleton and the phenyl phenylcyclohexanecarboxylate-based skeleton, and in the case where the phenylcyclohexyl benzoate-based skeleton or the phenyl phenylcyclohexanecarboxylate-based skeleton is included, the same properties as those in the case where the biphenylcyclohexane-based skeleton is included are easily exhibited.

Chemical Formula 26

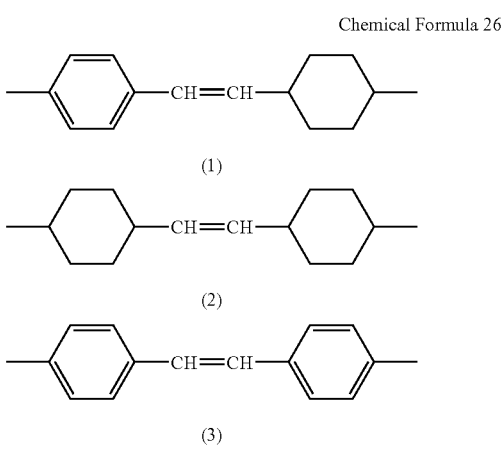

The skeletons represented in Chemical Formula 26 are examples of the cyclohexylstyrene-based skeleton, the dicyclohexylethene-based skeleton and the stilbene-based skeleton, and in the case where the cyclohexylstyrene-based skeleton, the dicyclohexylethene-based skeleton or the stilbene-based skeleton is included, the same properties as those in the case where the biphenyl-based skeleton is included are easily exhibited.

Chemical Formula 27

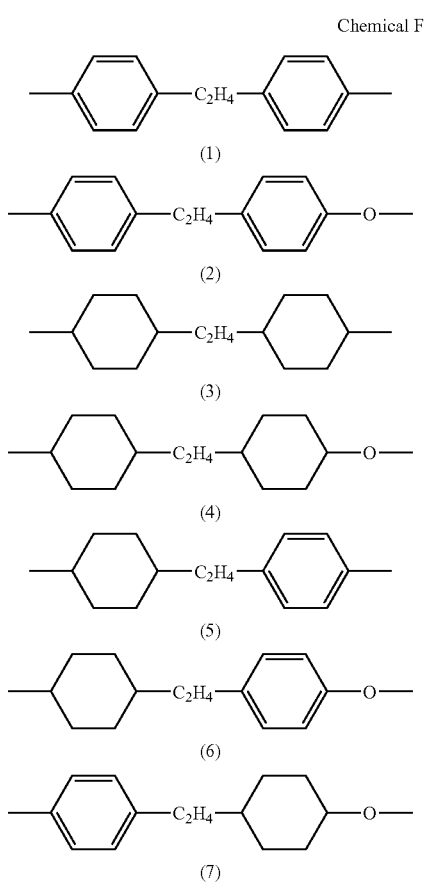

The skeletons represented in Chemical Formula 27 are examples of the diphenylethane-based skeleton, the dicyclohexylethane-based skeleton and the phenylcyclohexylethane-based skeleton, and in the case where the diphenylethane-based skeleton, the dicyclohexylethane-based skeleton or the phenylcyclohexylethane-based skeleton is included, the same properties as those in the case where the biphenyl-based skeleton is included are easily exhibited.

Chemical Formula 28

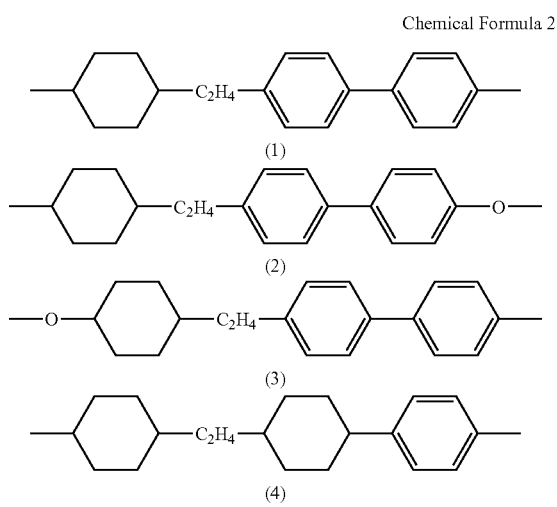

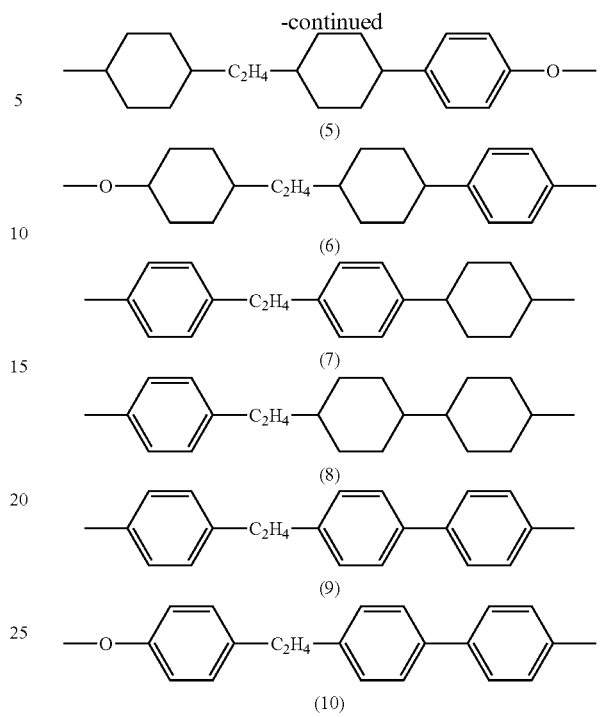

The skeletons represented in Chemical Formula 28 are examples of a skeleton in which a cyclohexane ring and a biphenyl-based skeleton are linked through an ethylene group, a skeleton in which a phenylcyclohexane-based skeleton and a cyclohexane ring are linked through an ethylene group, a skeleton in which a phenylcyclohexane-based skeleton and a benzene ring are linked through an ethylene group, a skeleton in which a bicyclohexane-based skeleton and a benzene ring are linked through an ethylene group, and a skeleton in which a benzene ring and a biphenyl-based skeleton are linked through an ethylene group. In the case where one of the skeletons is included, the same properties as those in the case where the diphenylcyclohexane-based skeleton is included are easily exhibited.

Chemical Formula 29

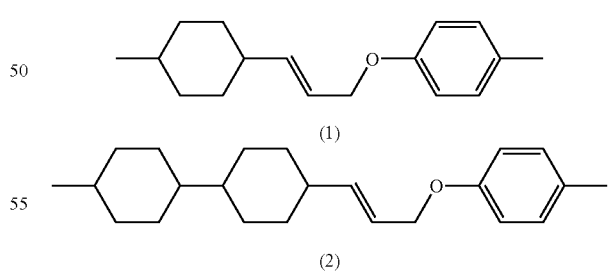

The skeletons represented in Chemical Formula 29 are examples of a skeleton in which a propenylphenyl ether-based skeleton and a cyclohexane ring are linked, and a skeleton in which a propenylphenyl ether-based skeleton and a bicyclohexane-based skeleton are linked, and in the case where one of the skeletons is included, the same properties as those in the case where the biphenyl-based skeleton is included are easily exhibited.

Chemical Formula 30

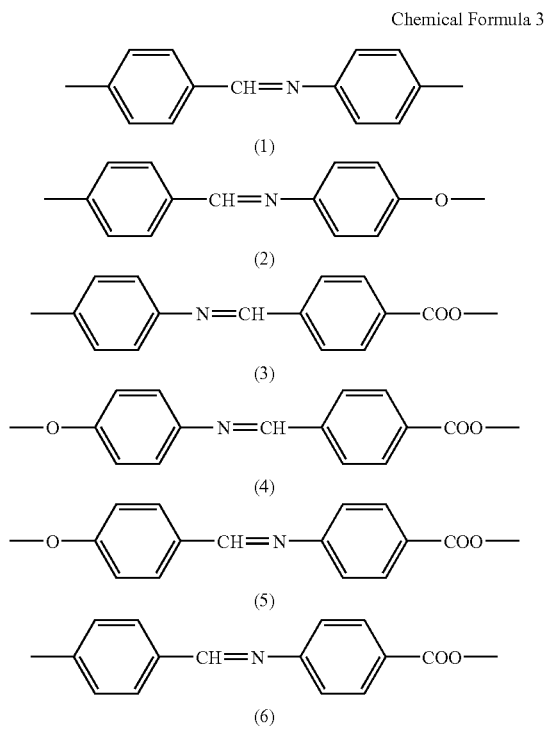

The skeletons represented in Chemical Formula 30 are examples of the Schiff base-based skeleton, and in the case where the Schiff base-based skeleton is included, a nematic liquid crystal phase is easily exhibited, and the viscosity is easily decreased. Thereby, in the case where the Schiff base-based skeleton is used in the liquid crystal display device, the Schiff base-based skeleton contributes to an improvement in response characteristics. As the Schiff base-based skeleton, a phenylmethanimine skeleton may be employed.

Chemical Formula 31

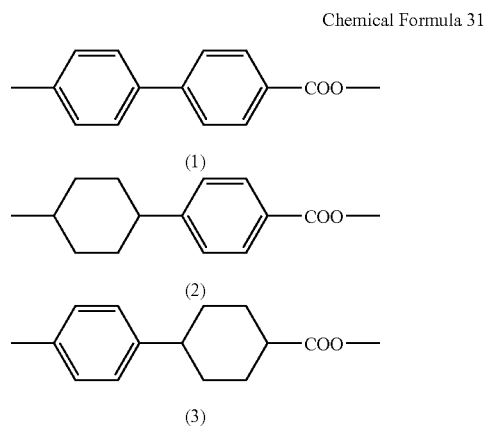

The skeletons represented in Chemical Formula 31 are examples of the biphenyl carboxylate-based skeleton, the cyclohexyl benzoate-based skeleton and the phenylcyclohexane carboxylate-based skeleton, and in the case where one of the skeletons is included, the same properties as those in the case where the biphenyl-based skeleton is included are easily exhibited.

Chemical Formula 32

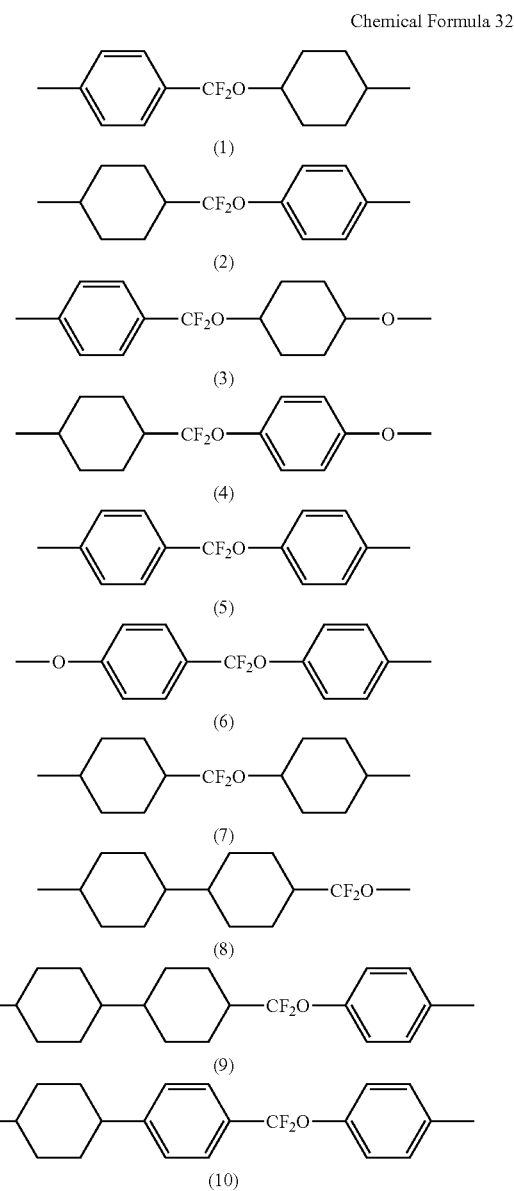

The skeletons represented in Chemical Formula 32 are examples of a skeleton having a difluoromethyleneoxy group, and in the case where the skeleton is included, the same properties as those in the case where the naphthalene-based skeleton is included are easily exhibited.

Moreover, W1 and W2 in Chemical Formula 1 each are preferably a group including a liquid crystal skeleton and one kind selected from the group consisting of an alkyl group, an alkoxyl group, an alkenyl group and an alkenyloxyl group having 1 to 16 carbon atoms, both inclusive, on an end side of the liquid crystal skeleton. It is because the alignment of the liquid crystal molecule is stabilized. The number of carbon atoms in the alkyl group or the like is within the above-described range, because when the number of carbon atoms is 16 or more, viscosity or the phase transition temperature is increased. In particular, the number of carbon atoms in the alkyl group or the like is preferably within a range from 1 to 8 both inclusive.

Examples of W1 and W2 including a liquid crystal skeleton include structures represented by Chemical Formula 33 to Chemical Formula 44. In Chemical Formula 33 to Chemical Formula 44, "n" is an integer of 1 to 16 both inclusive. In addition, Chemical Formula 33 represents a structure including a tolan-based skeleton, Chemical Formula 34 represents structures including a naphthalene-based skeleton, Chemical Formula 35 represents structures including a biphenyl-based skeleton, Chemical Formula 36 represents structures including a phenylcyclohexane-based skeleton, Chemical Formula 37 represents structures including a biphenylcyclohexane-based skeleton, Chemical Formula 38 represents structures including a phenylbicyclohexane-based skeleton, Chemical Formula 39 represents structures including a terphenyl-based skeleton, Chemical Formula 40 represents structures including a bicyclohexyl-based skeleton, Chemical Formula 41 represents structures including a cyclohexylcyclohexene-based skeleton, Chemical Formula 42 represents structures including a cyclohexyl benzoate-based skeleton or a phenyl cyclohexanecarboxylate skeleton, Chemical Formula 43 represents structures including a phenyl benzoate-based skeleton, and Chemical Formula 44 represents structures including a Schiff base-based skeleton.

Chemical Formula 33

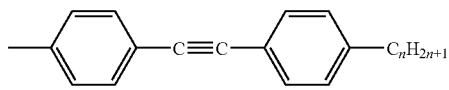

Chemical Formula 34

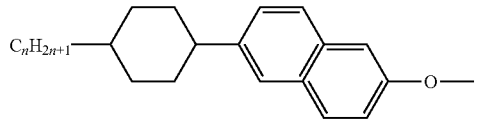

(1)

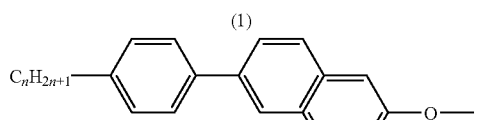

(2)

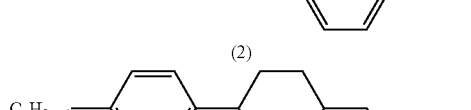

(3)

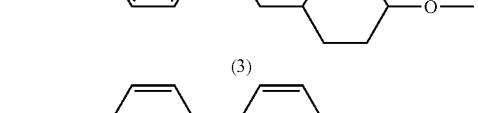

(4)

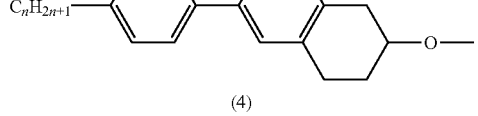

(5)

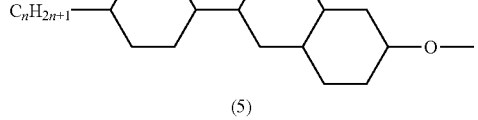

(6)

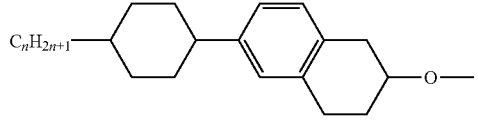

-continued

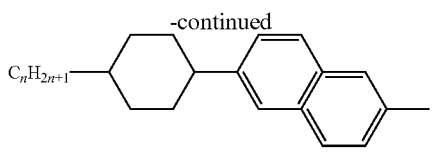

(7)

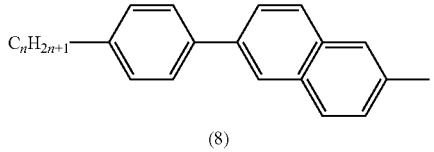

(8)

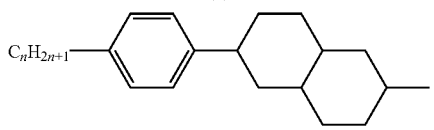

(9)

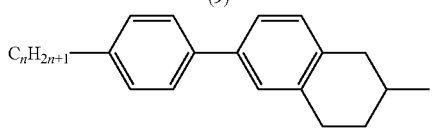

(10)

Chemical Formula 35

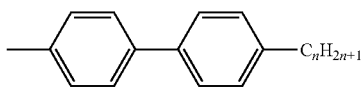

(1)

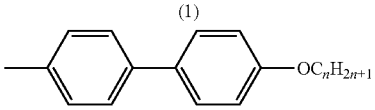

(2)

Chemical Formula 36

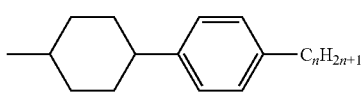

(1)

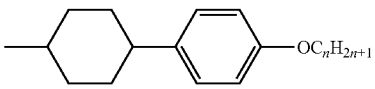

(2)

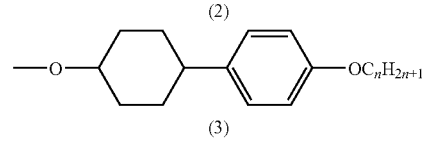

(3)

Chemical Formula 37

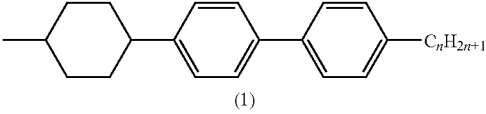

(1)

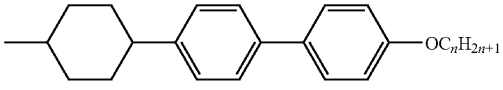

(2)

Chemical Formula 38

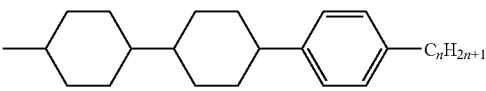

(1)

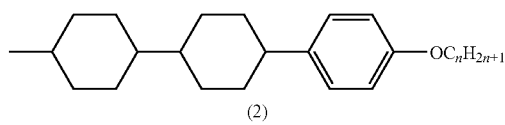

(2)

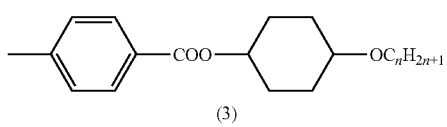

(3)

Chemical Formual 39

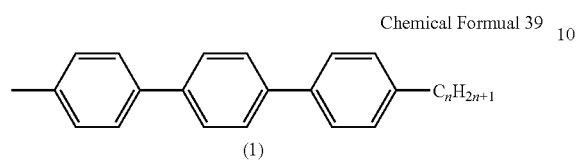

(1)

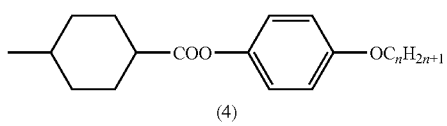

(4)

Chemical Formula 43

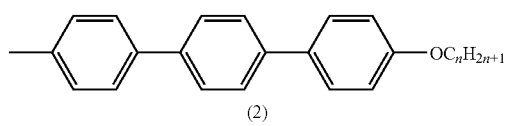

(2)

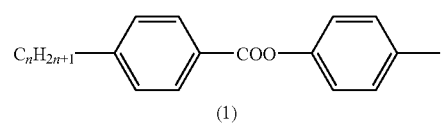

(1)

Chemical Formula 40

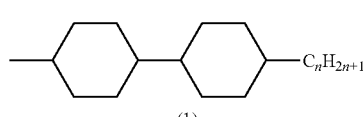

(1)

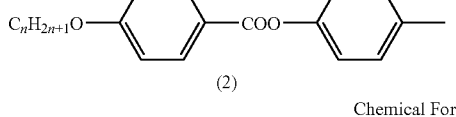

(2)

Chemical Formula 44

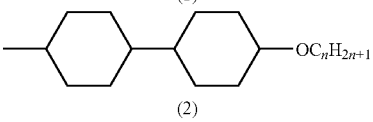

(2)

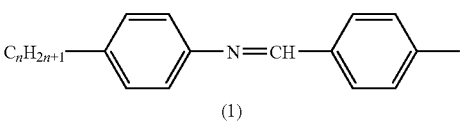

(1)

Chemical Formula 41

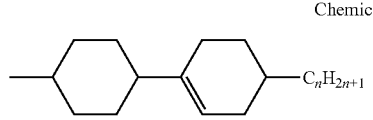

(1)

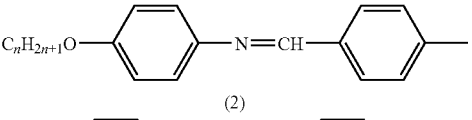

(2)

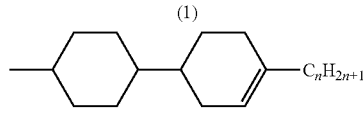

(2)

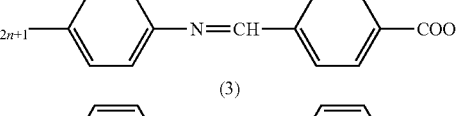

(3)

Chemical Formula 42

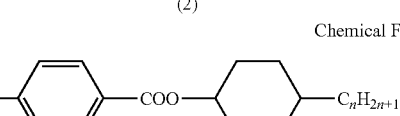

(1)

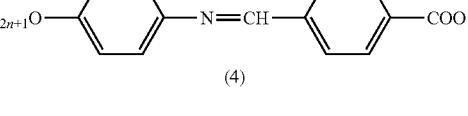

(4)

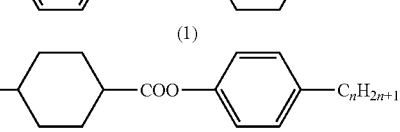

(2)

Examples of the bent-shaped molecule represented by Chemical Formula 1 include compounds represented by Chemical Formula 45 to Chemical Formula 64. Only one kind or a mixture of a plurality of kinds selected from them may be used. The compound represented by Chemical Formula 63(1) is a bent-shaped molecule not exhibiting a liquid crystal phase.

Chemical Formula 45

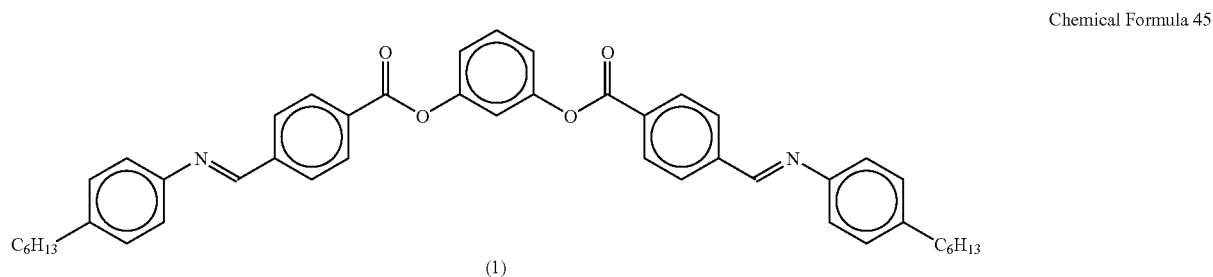

(1)

-continued
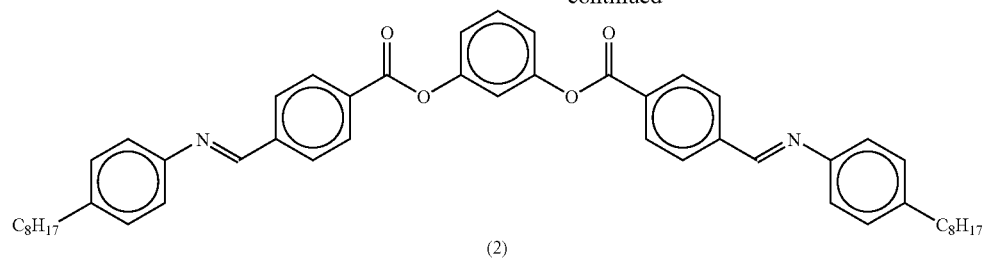
(2)
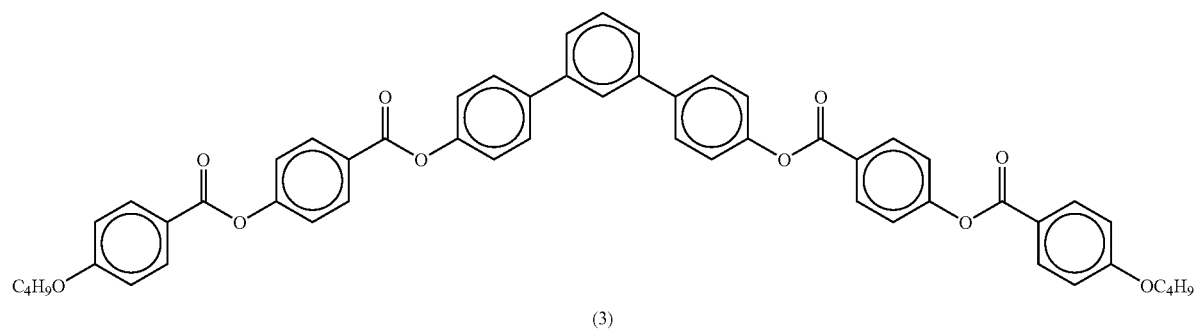
(3)
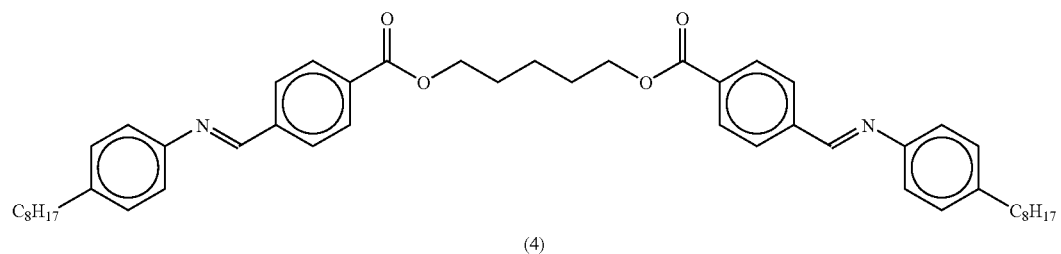
(4)
Chemical Formula 46
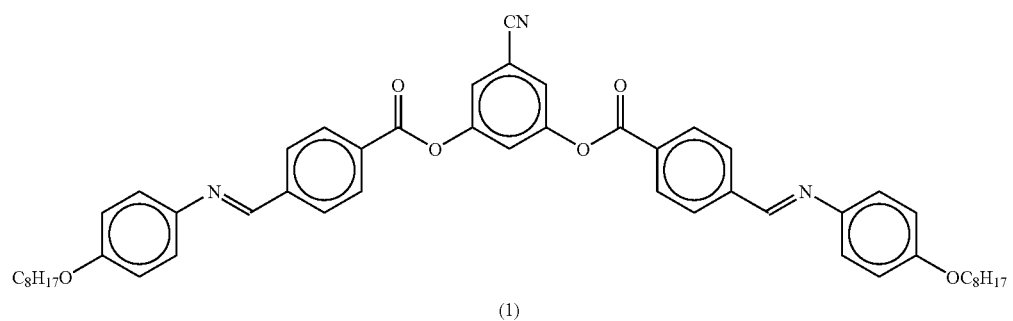
(1)
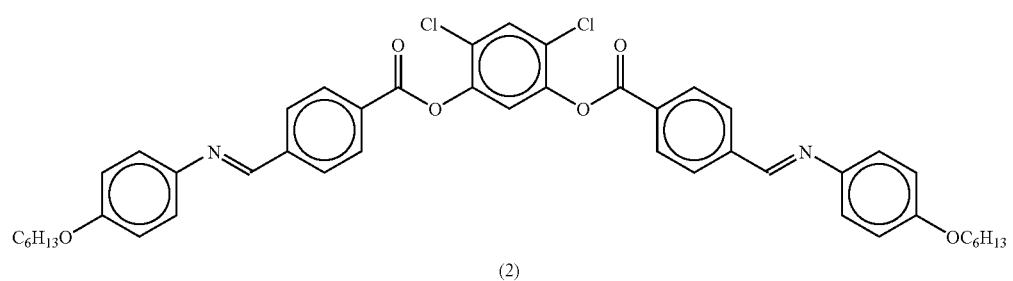
(2)

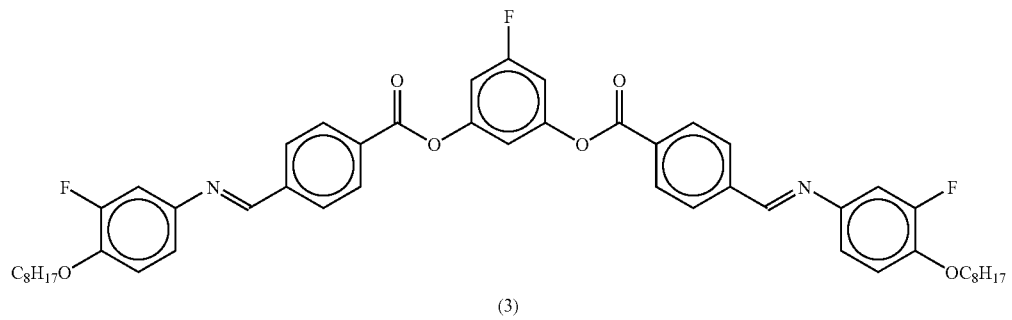
(3)
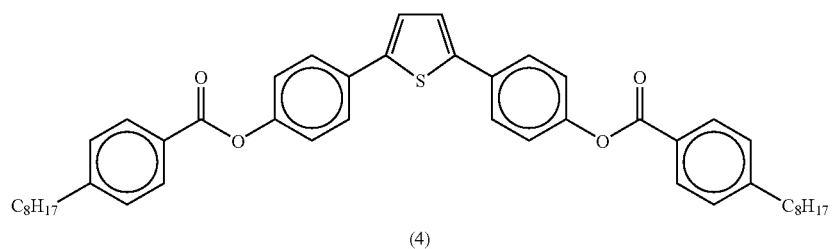
(4)
Chemical Formula 47
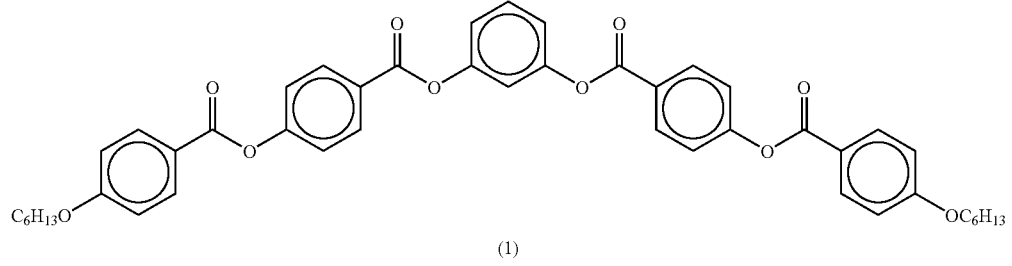
(1)
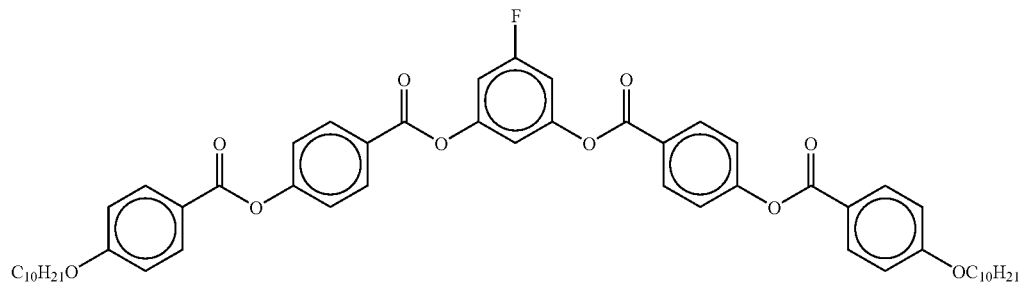
(2)
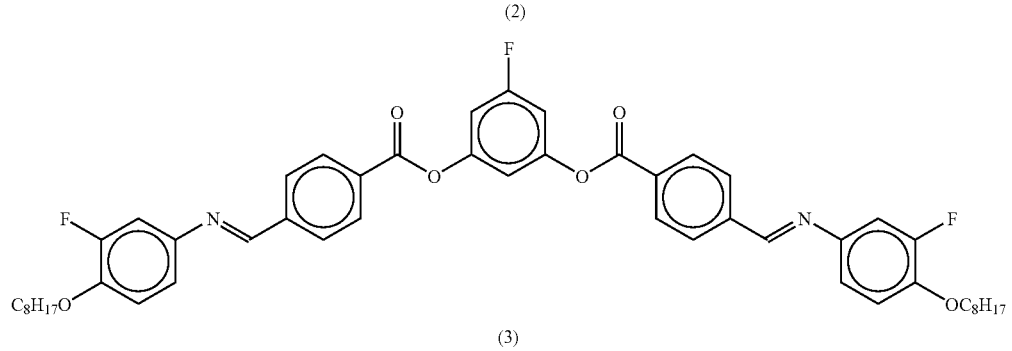
(3)

-continued
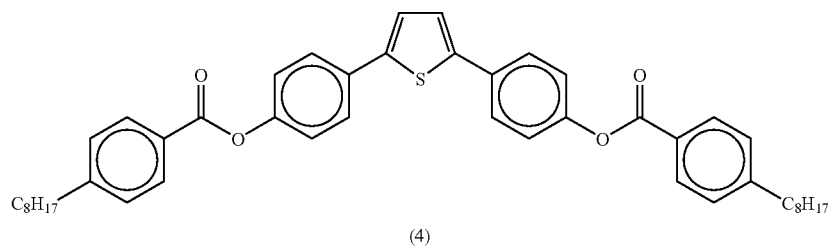
(4)
Chemical Formula 47
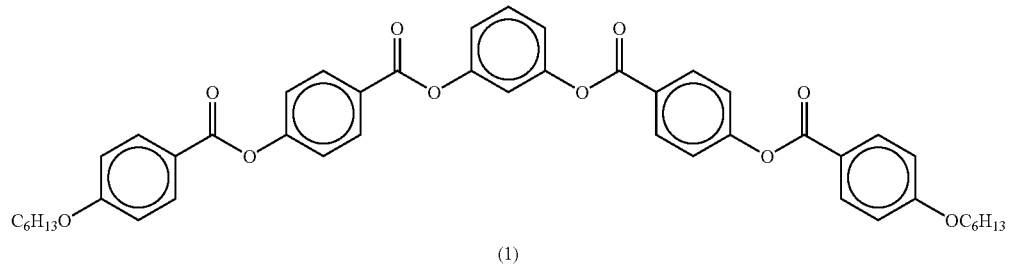
(1)
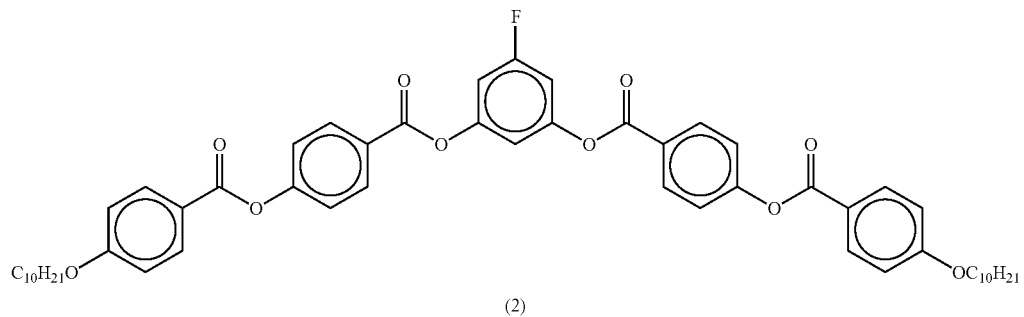
(2)
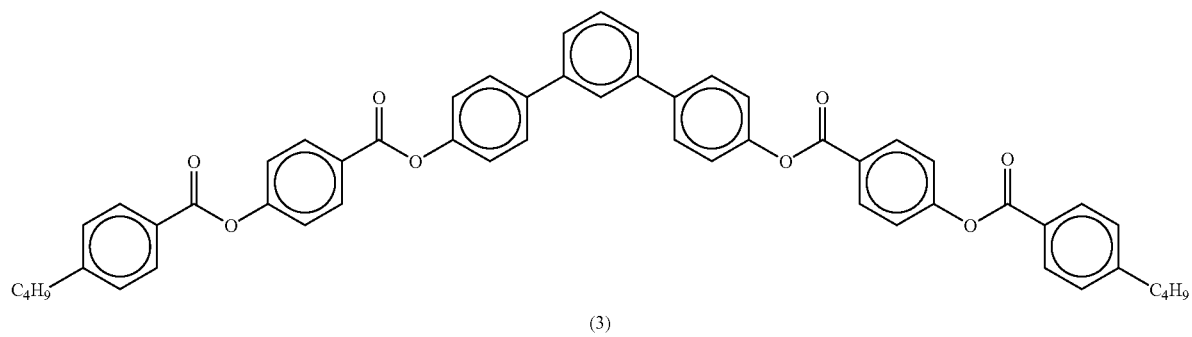
(3)
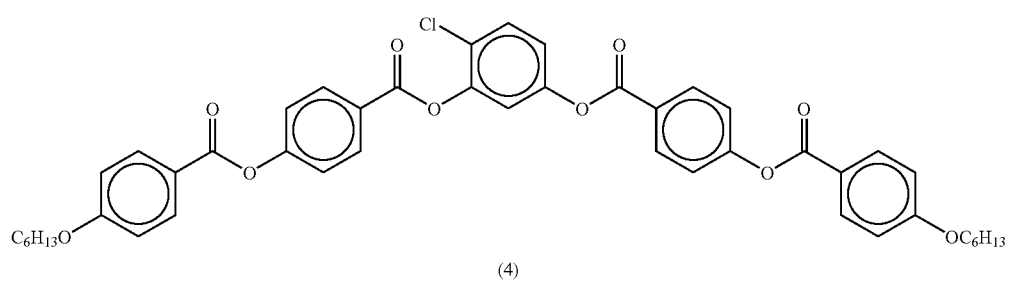
(4)

Chemical Formula 48
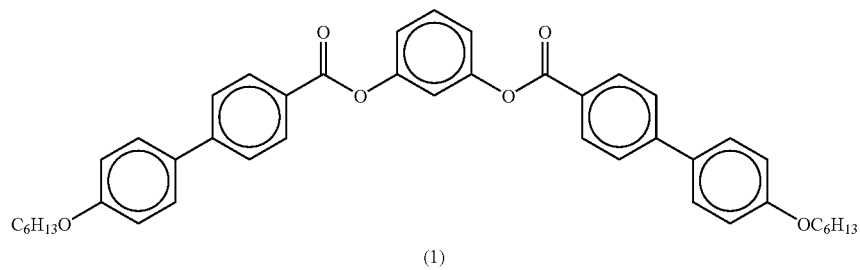
(1)
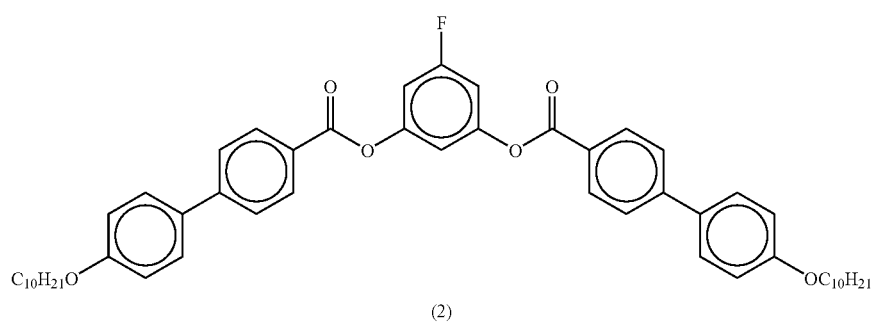
(2)
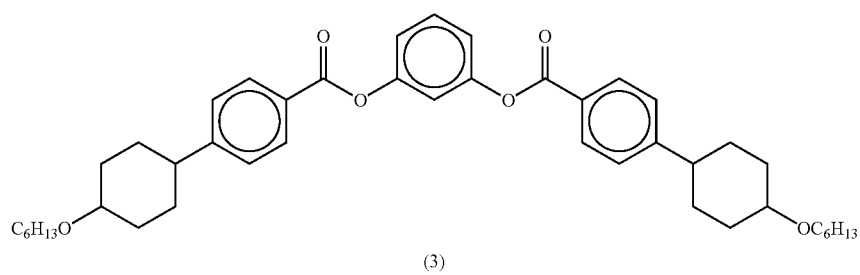
(3)
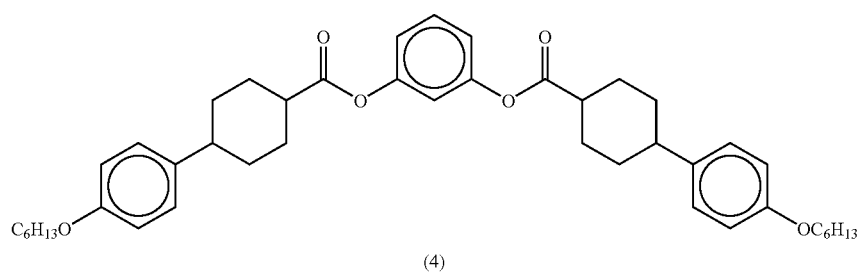
(4)
Chemical Formula 49
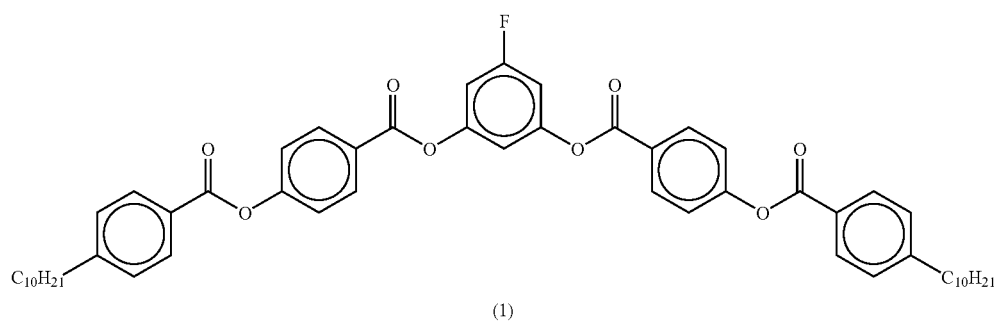
(1)

-continued
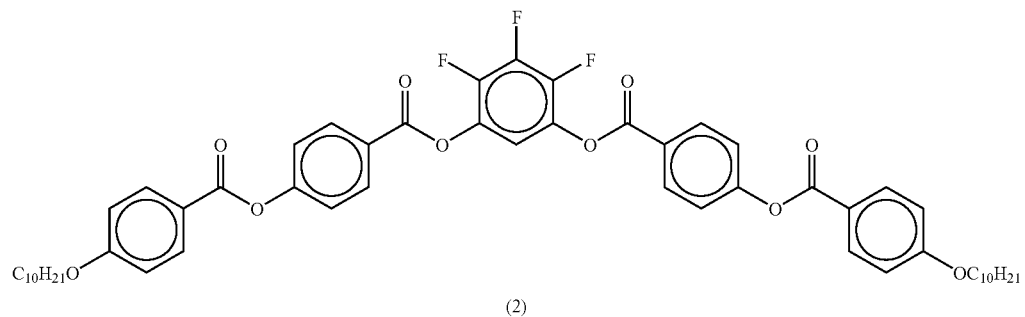
(2)
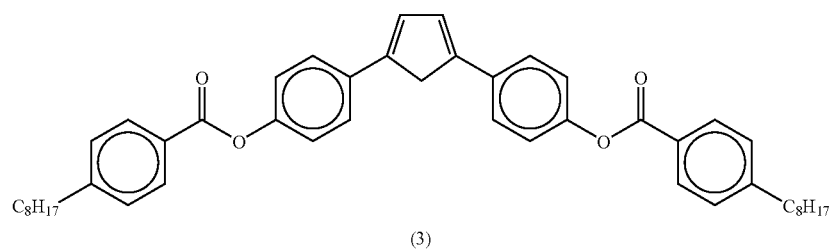
(3)
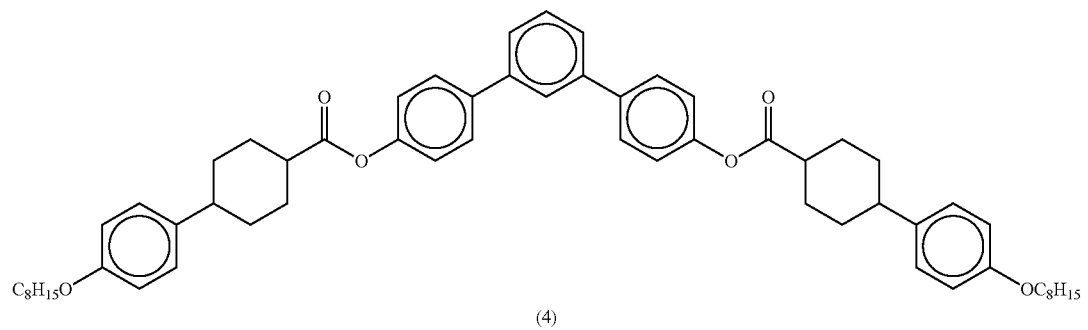
(4)
Chemical Formula 50
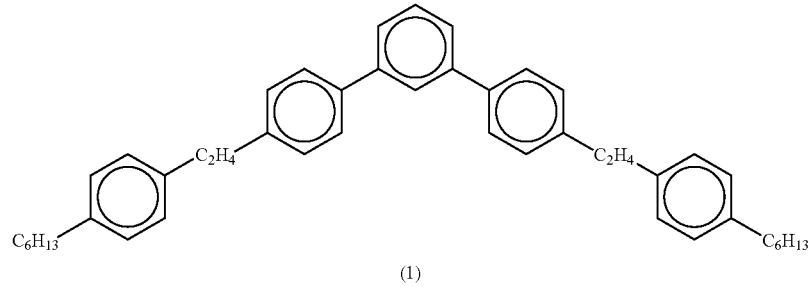
(1)
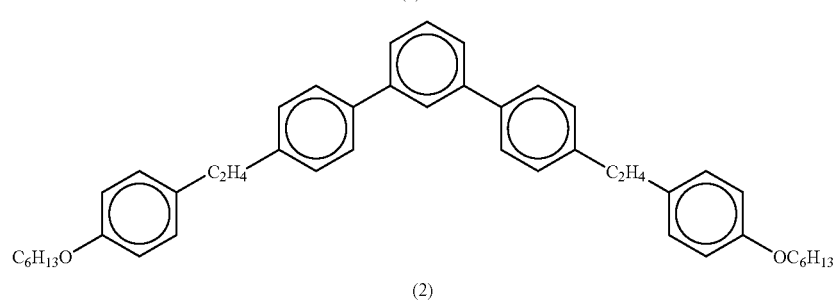
(2)

-continued
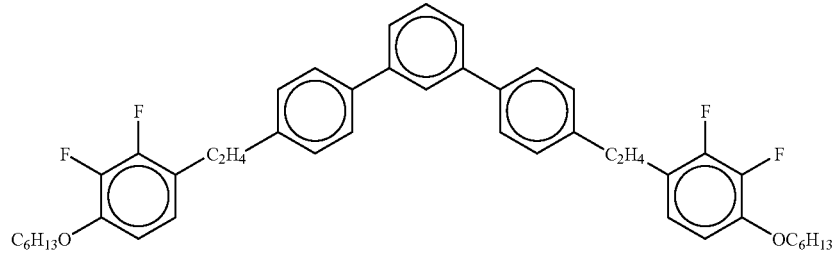
(3)
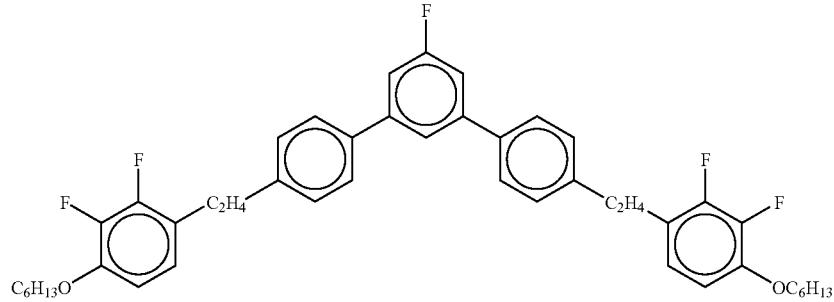
(4)
Chemical Formula 51
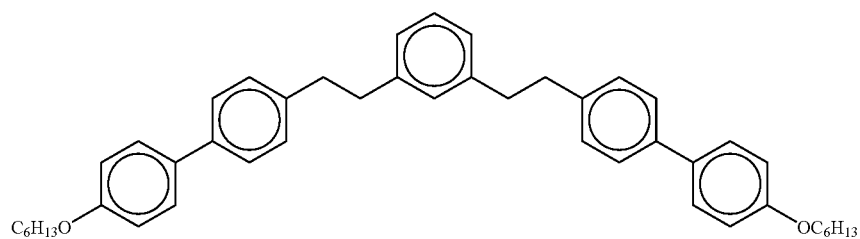
(1)
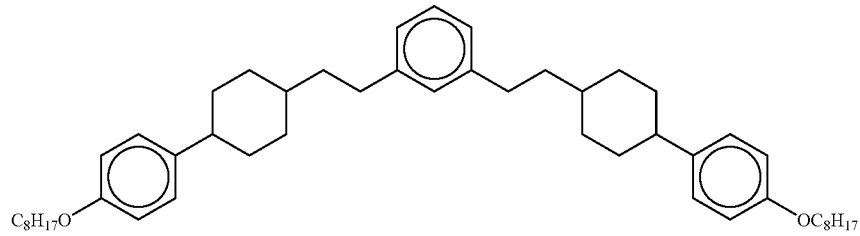
(2)
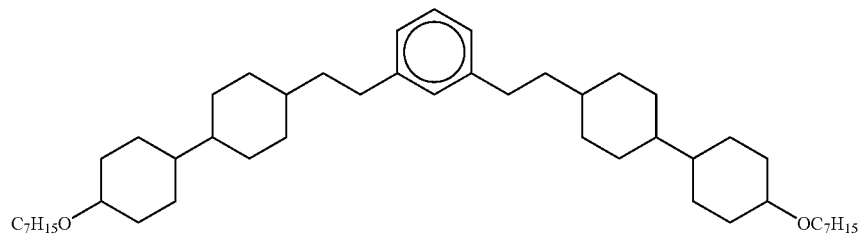
(3)
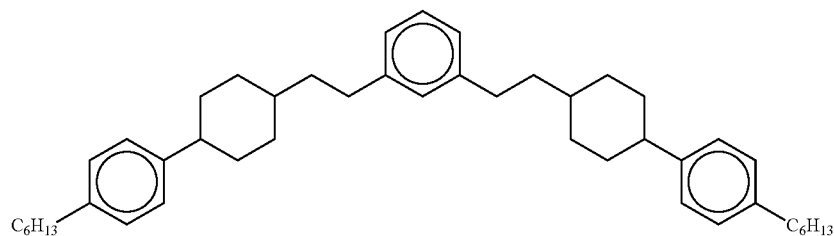
(4)

-continued
Chemical Formula 52
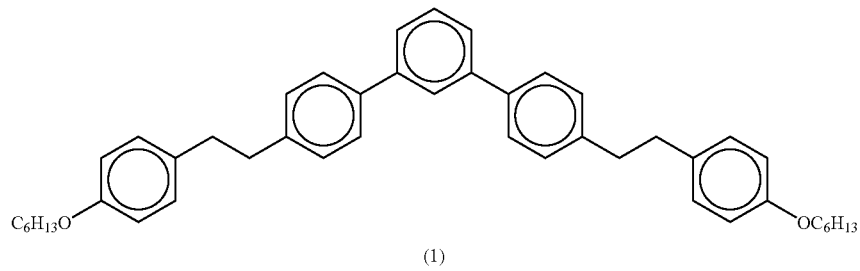
(1)
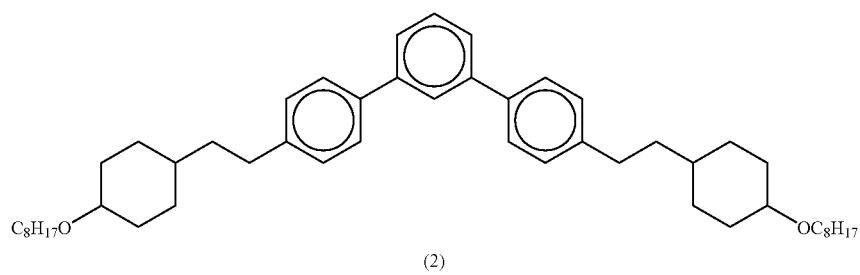
(2)
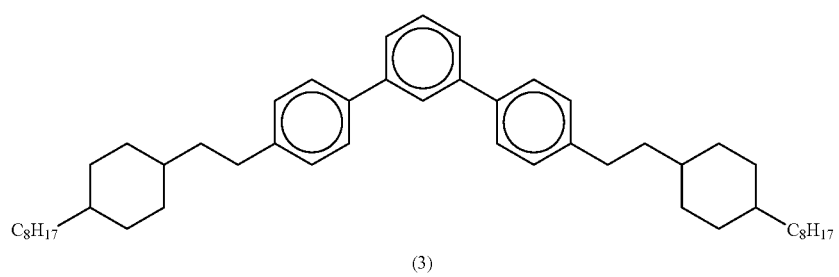
(3)
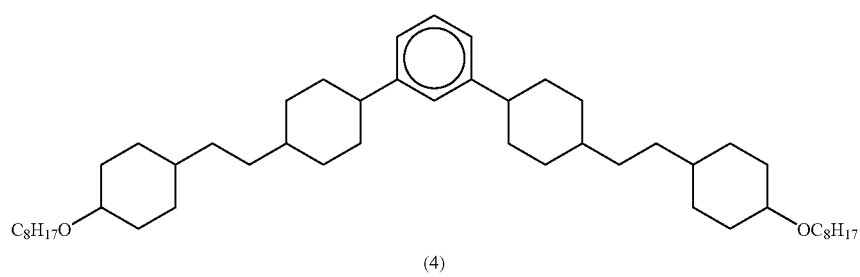
(4)
Chemical Formula 53
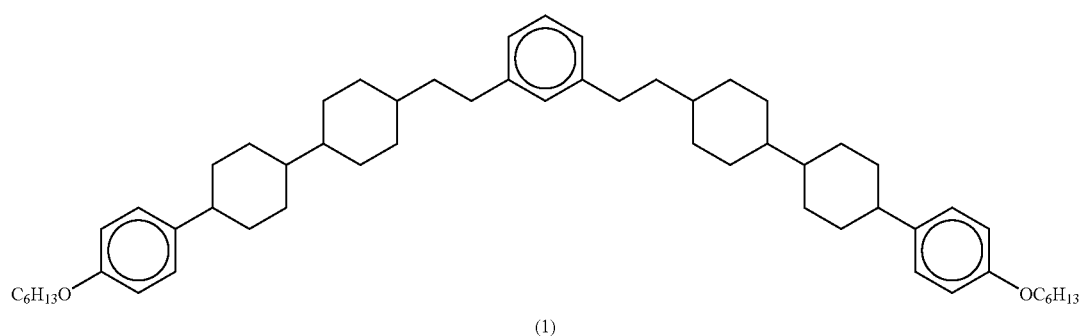
(1)

-continued
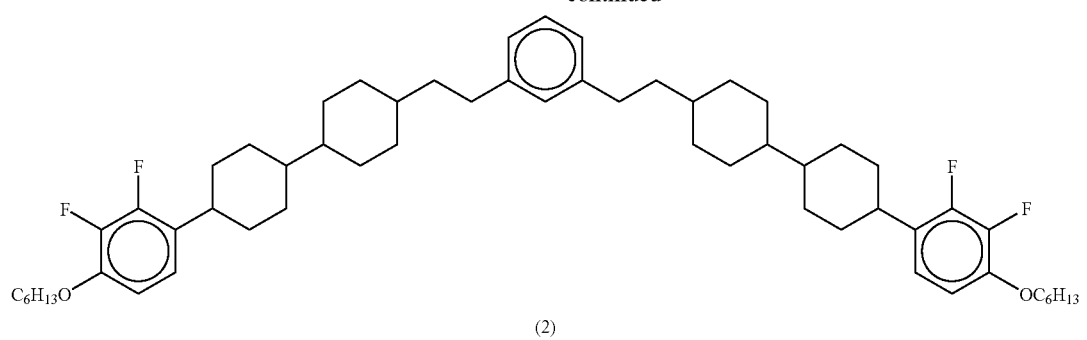
(2)
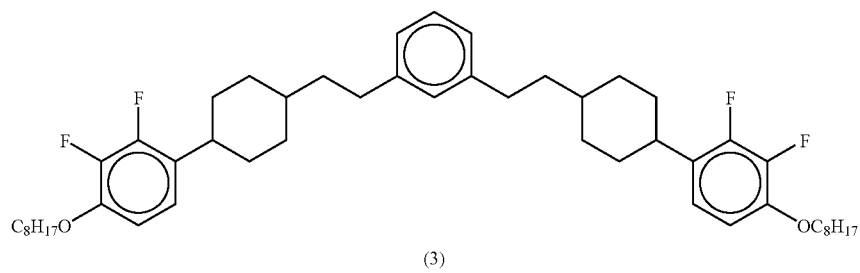
(3)
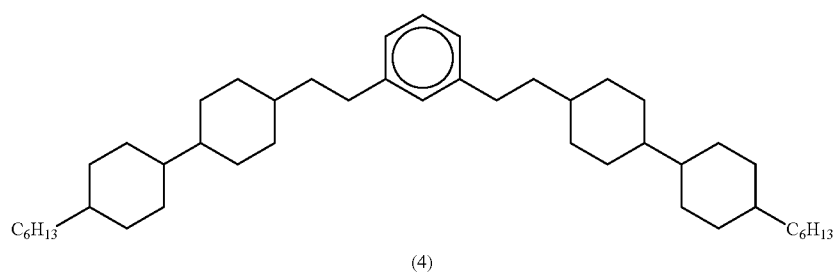
(4)
Chemical Formula 54
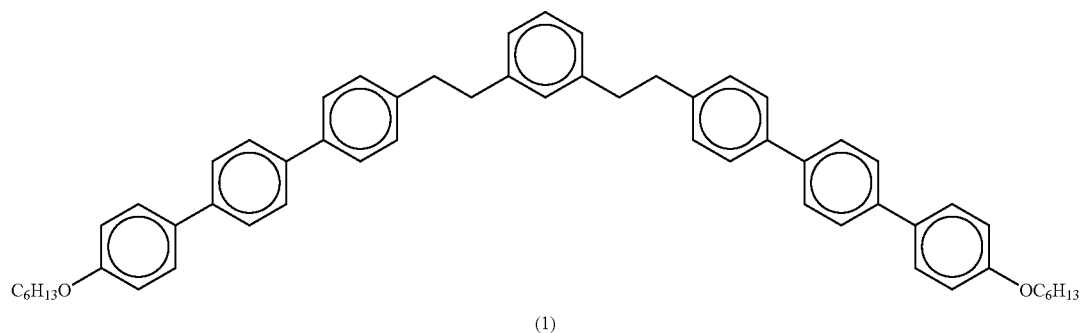
(1)
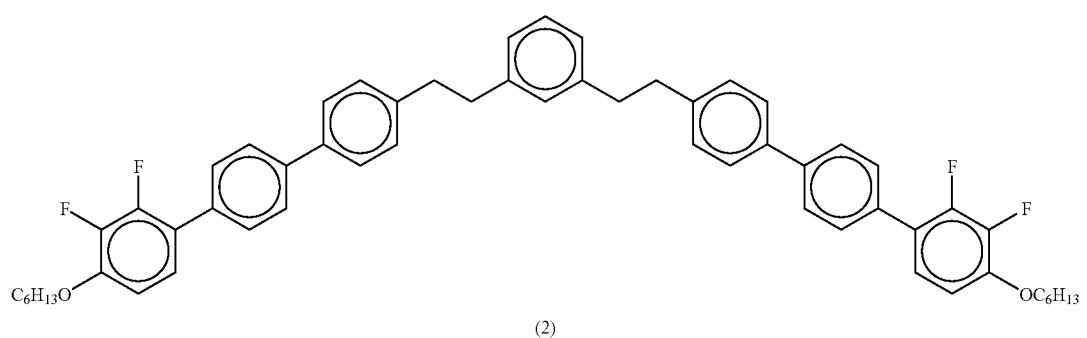
(2)

-continued
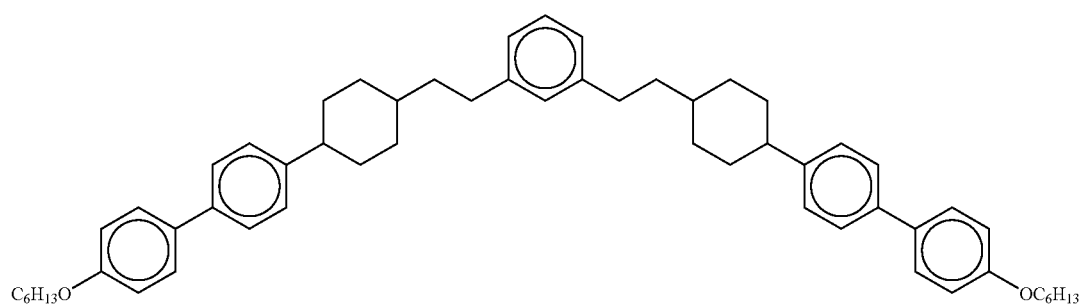
(3)
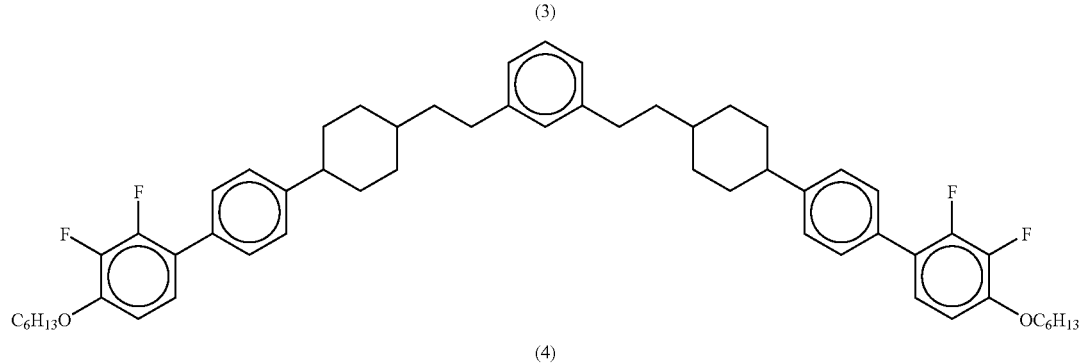
(4)
Chemical Formula 55
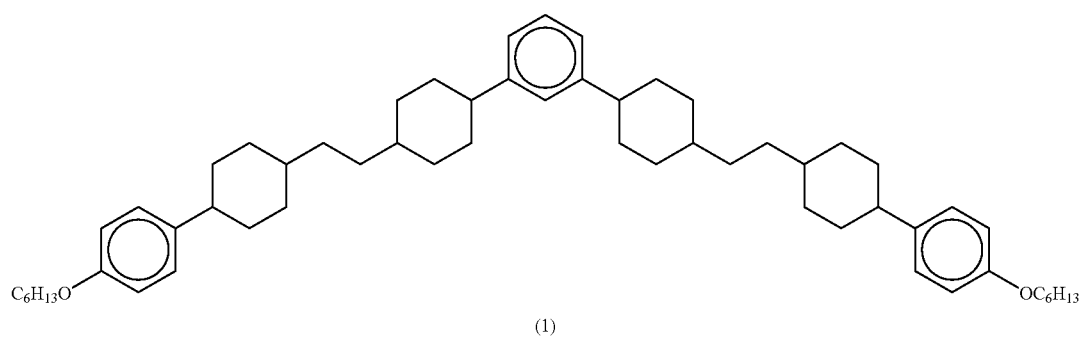
(1)
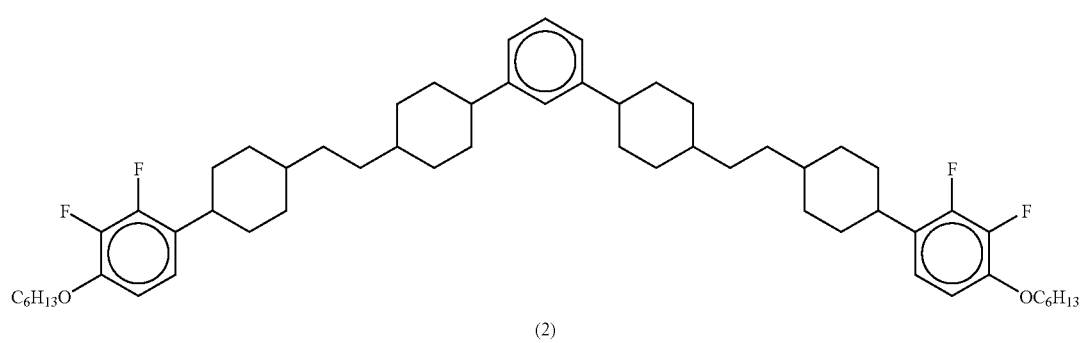
(2)
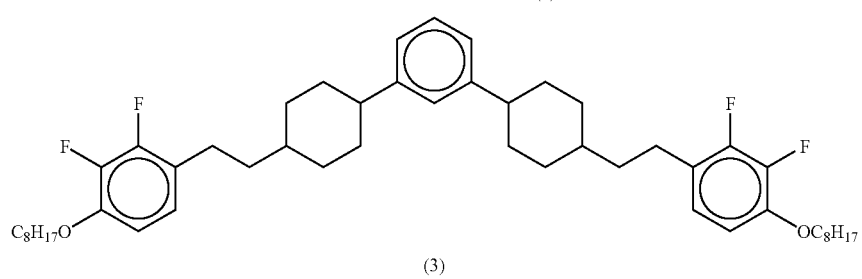
(3)

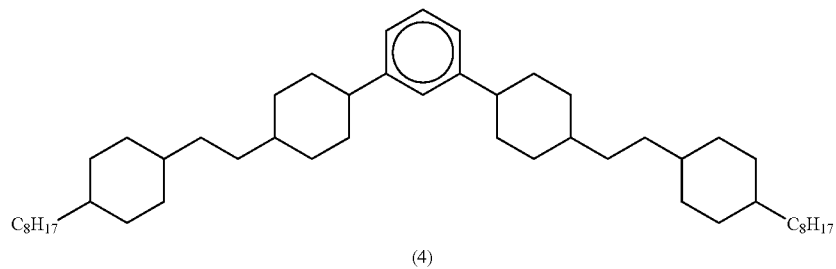
(4)
Chemical Formula 56
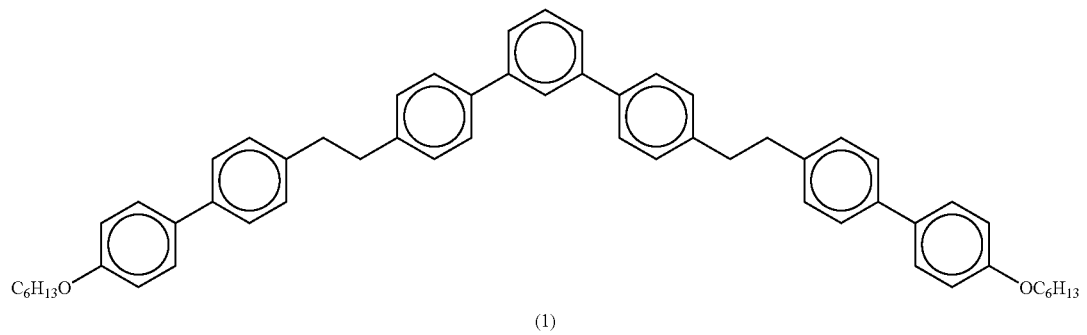
(1)
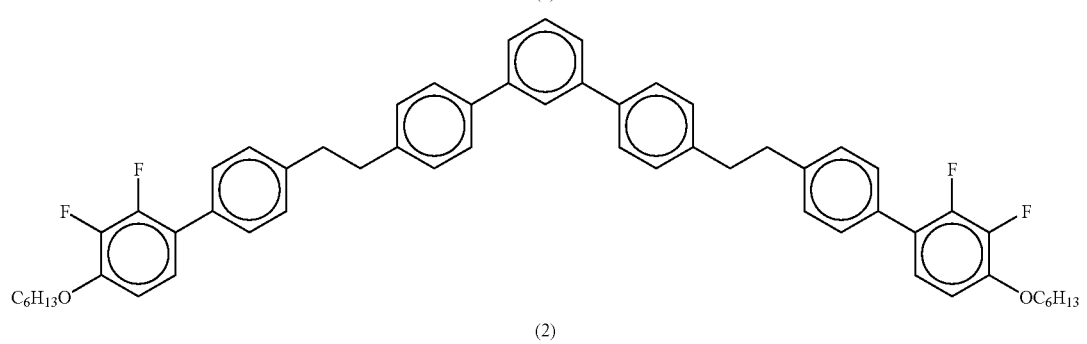
(2)
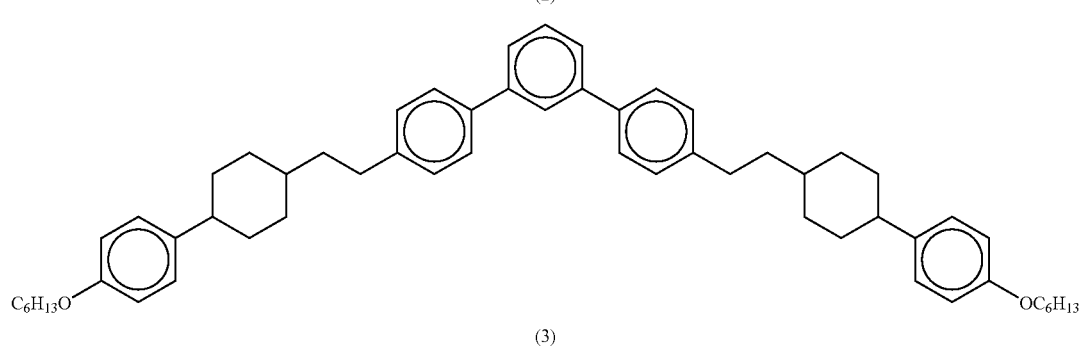
(3)
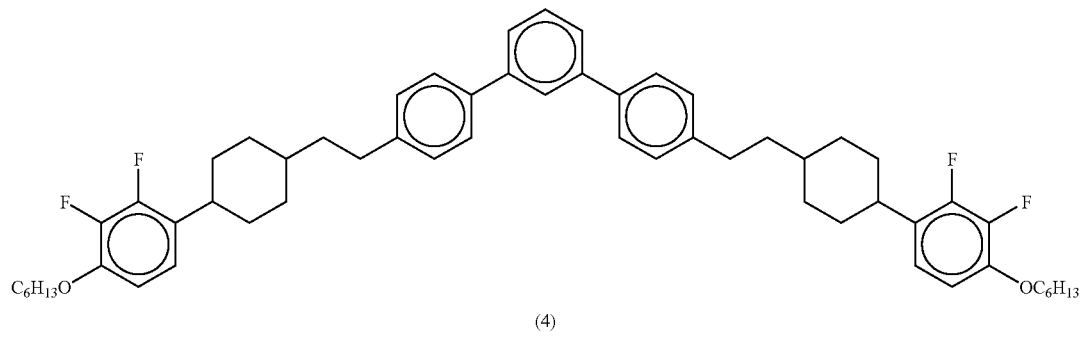
(4)

-continued
Chemical Formula 57
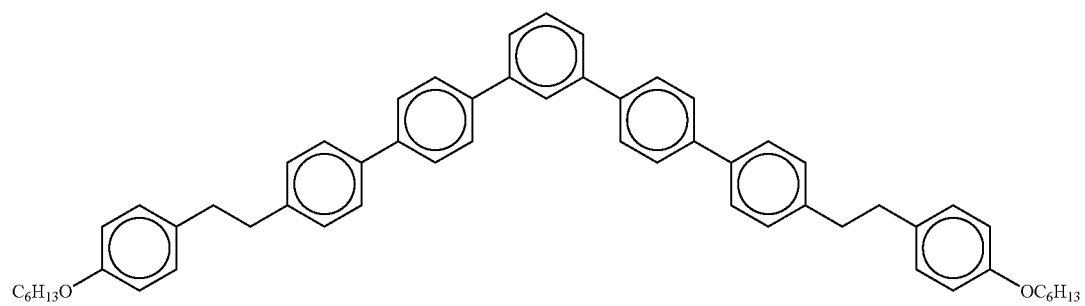
(1)
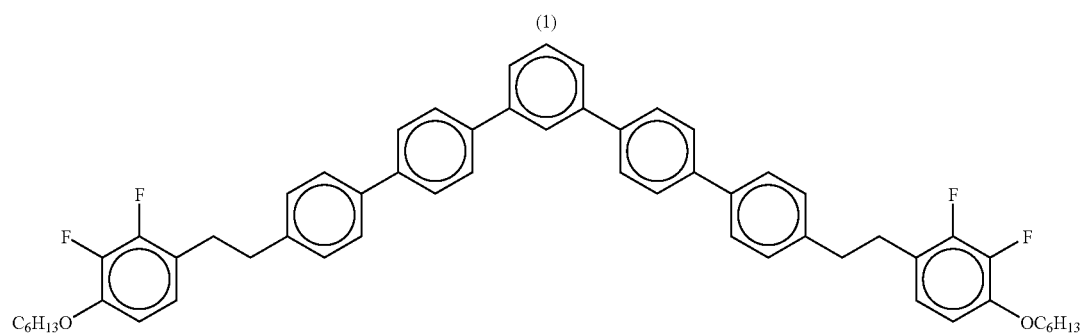
(2)
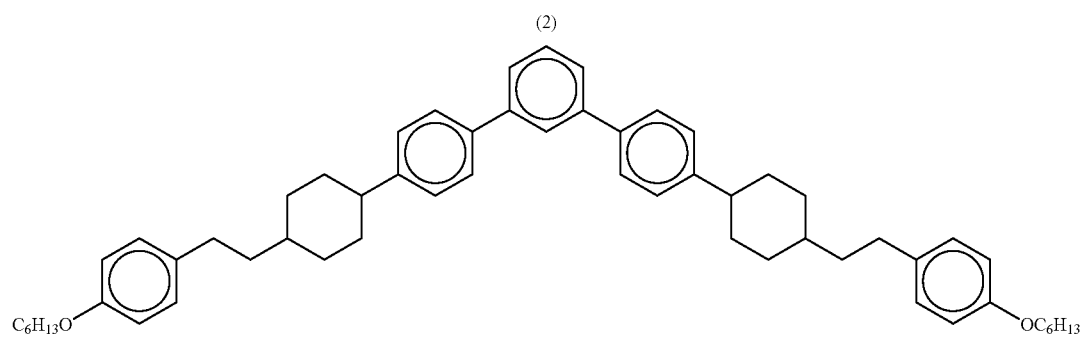
(3)
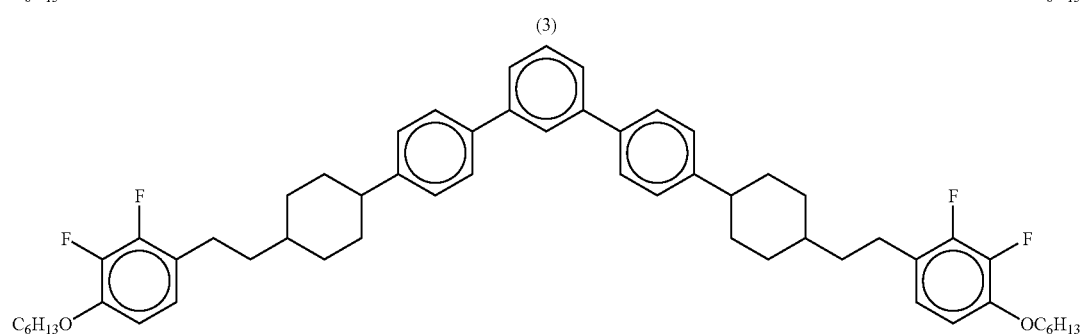
(4)
Chemical Formula 58
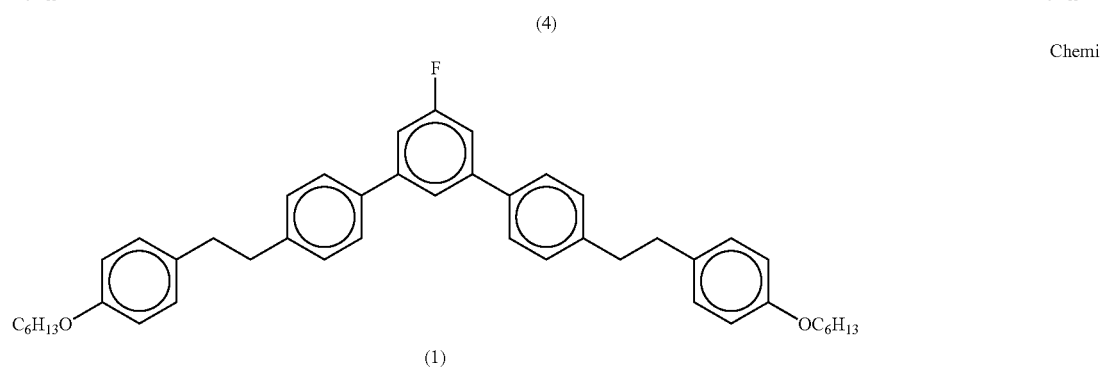
(1)

-continued
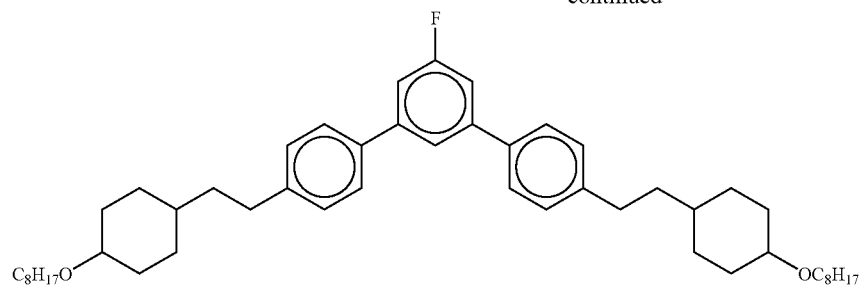
(2)
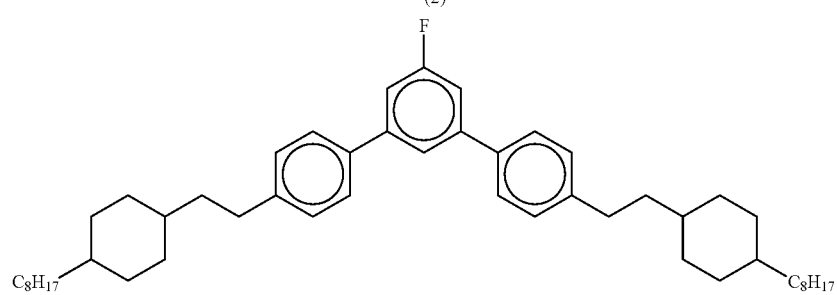
(3)
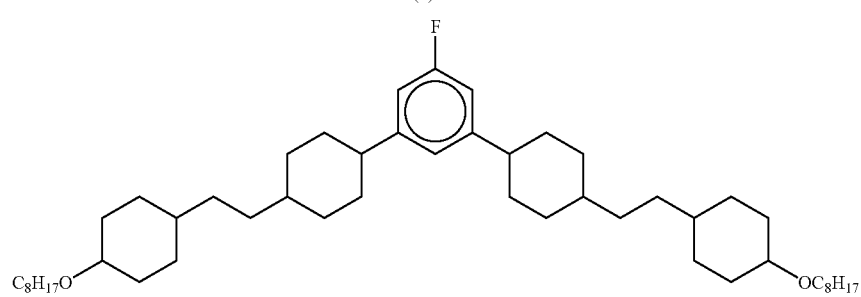
(4)
Chemical Formula 59
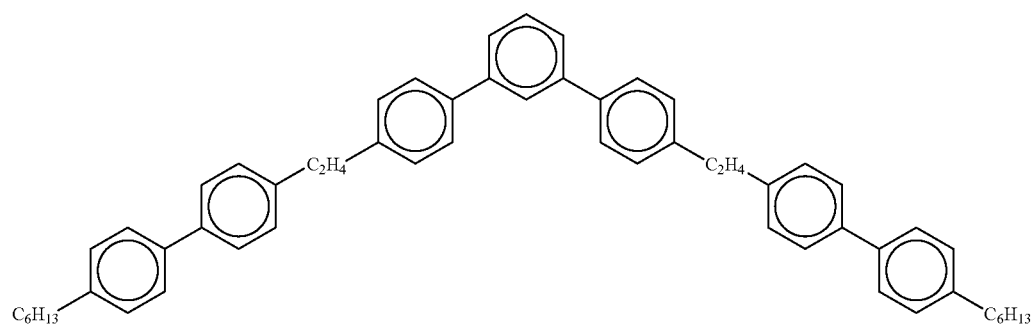
(1)
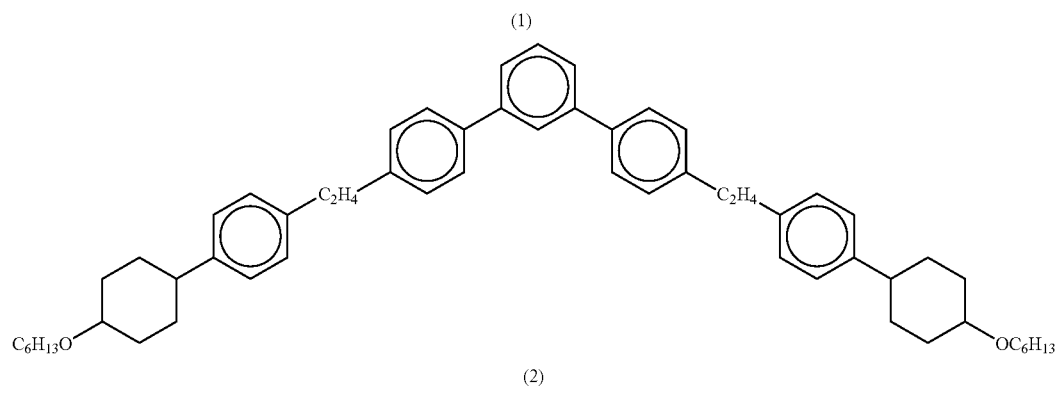
(2)

-continued
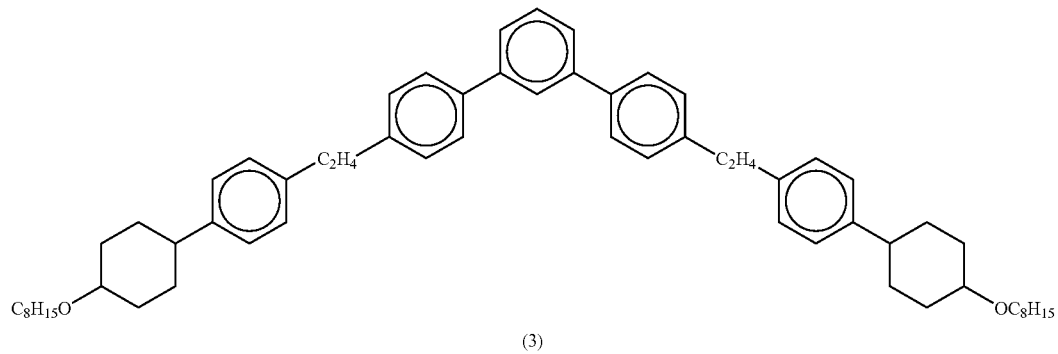
(3)
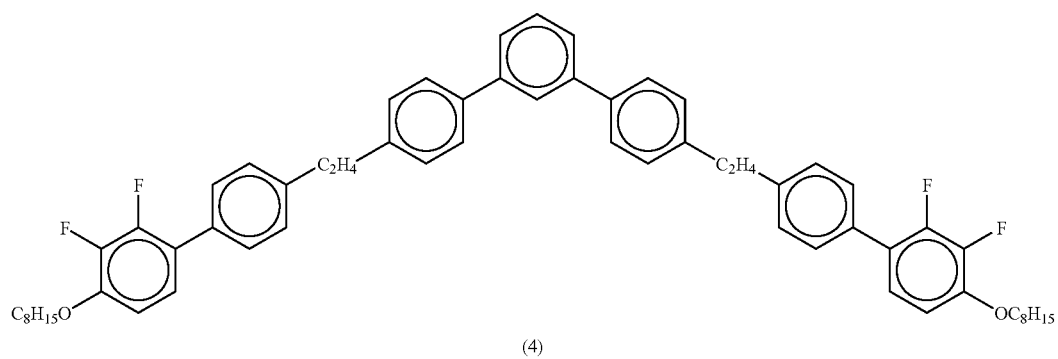
(4)
Chemical Formula 60
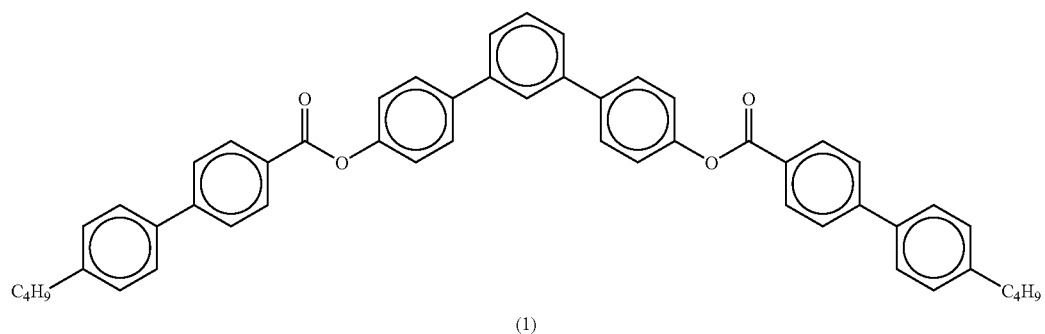
(1)
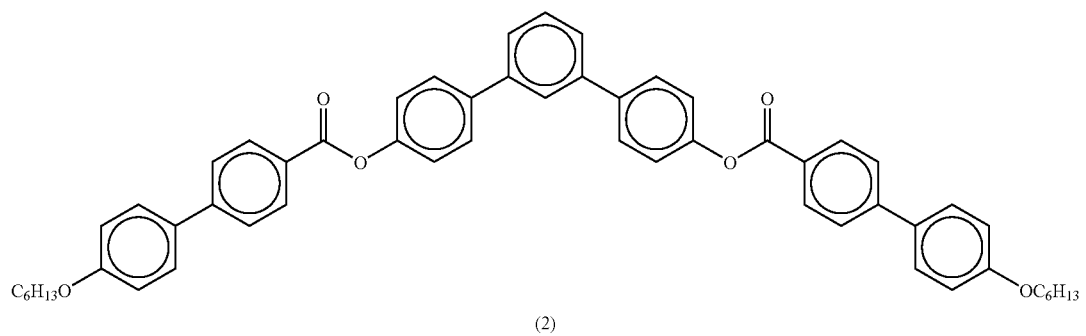
(2)

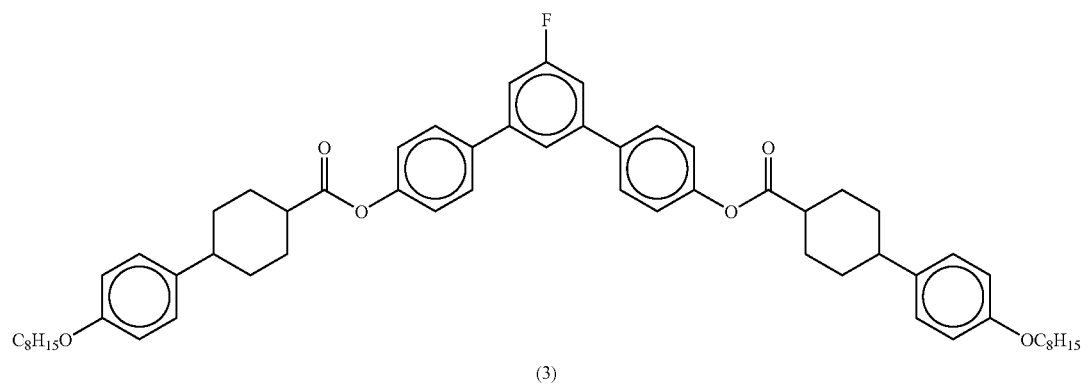
(3)
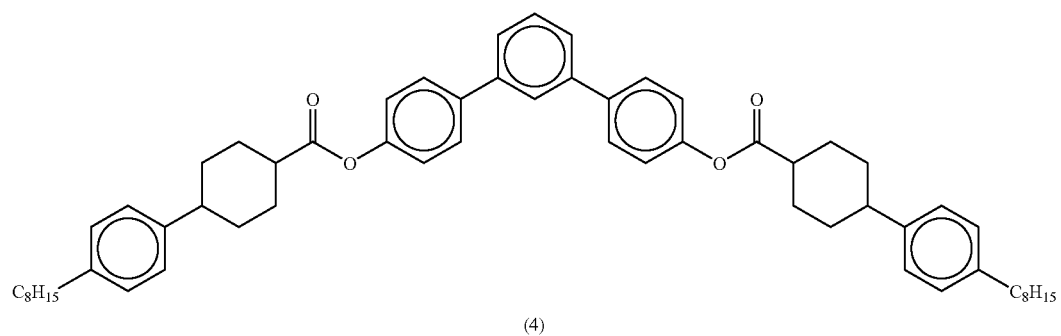
(4)
Chemical Formula 61
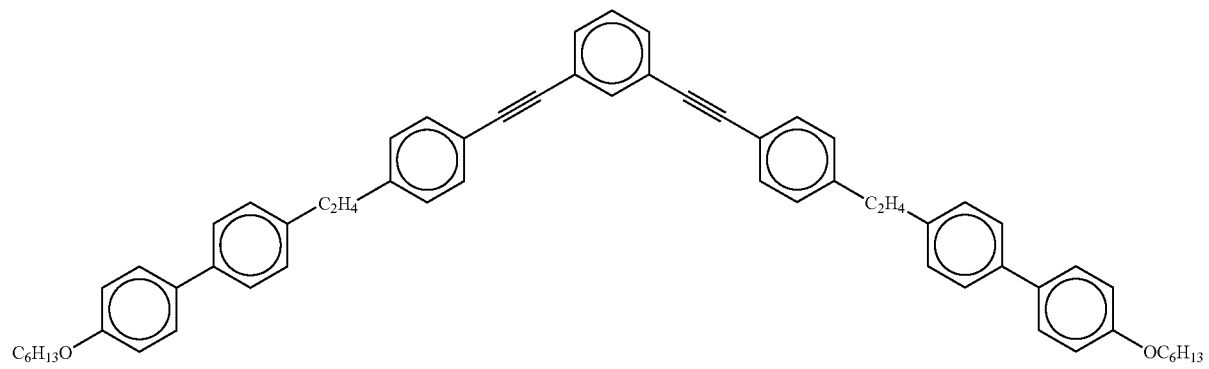
(1)
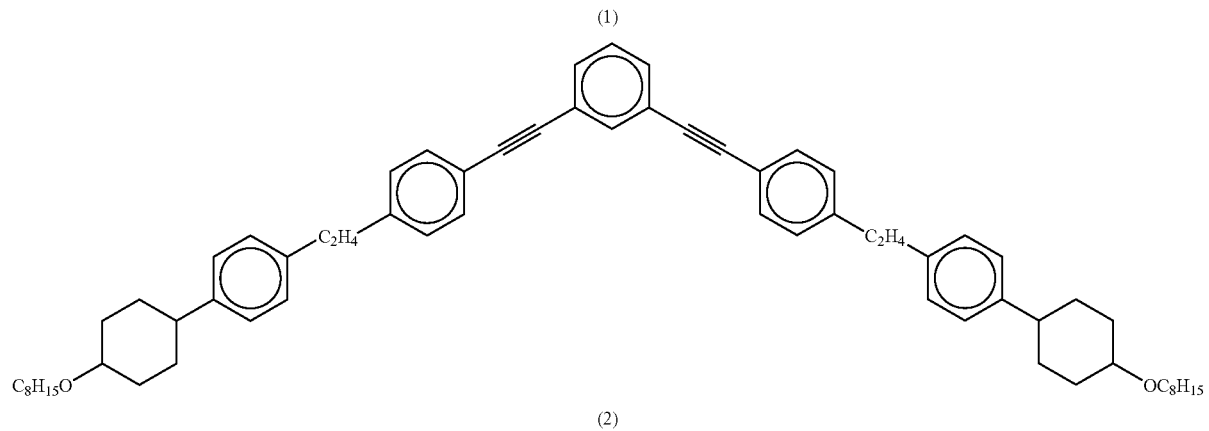
(2)

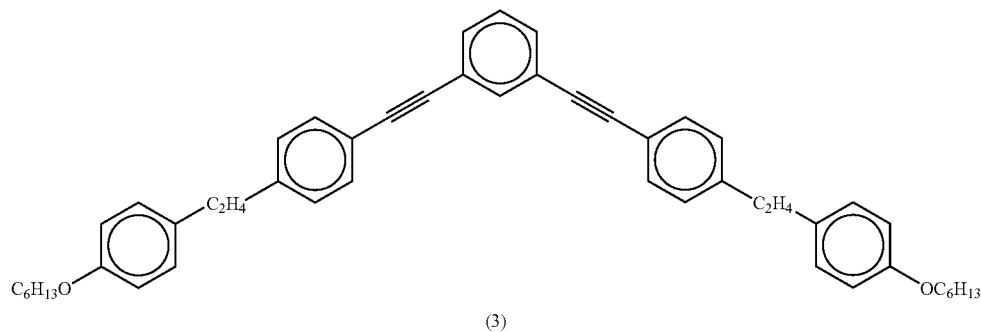
(3)
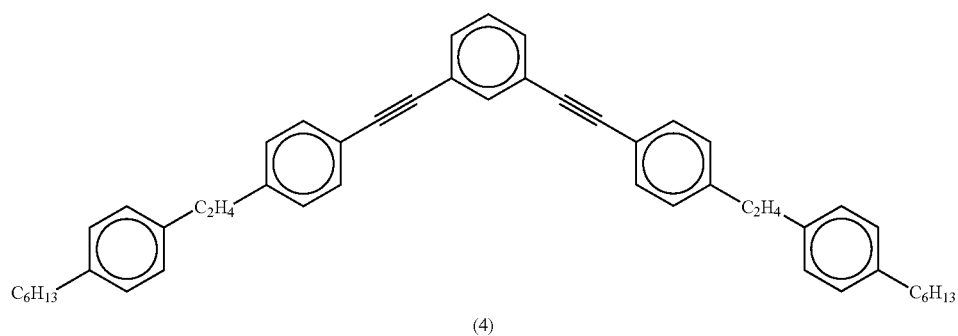
(4)
Chemical Formula 62
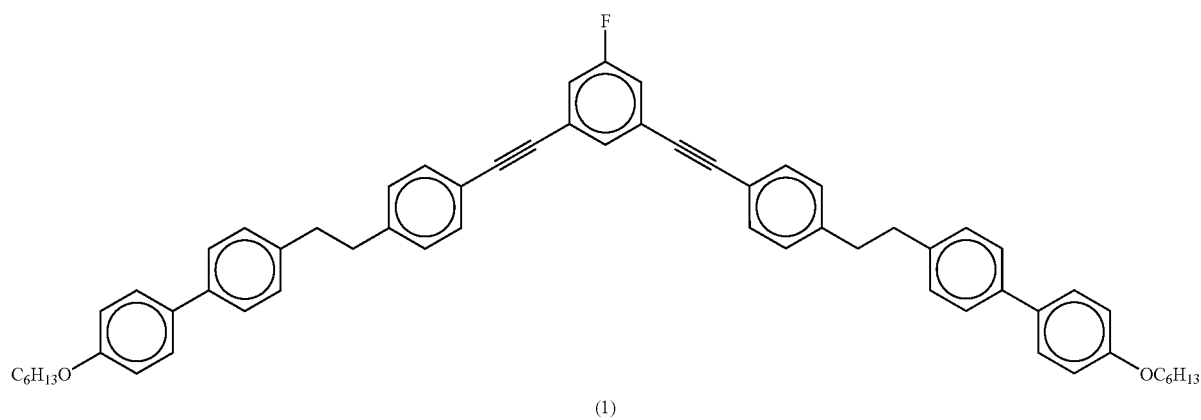
(1)
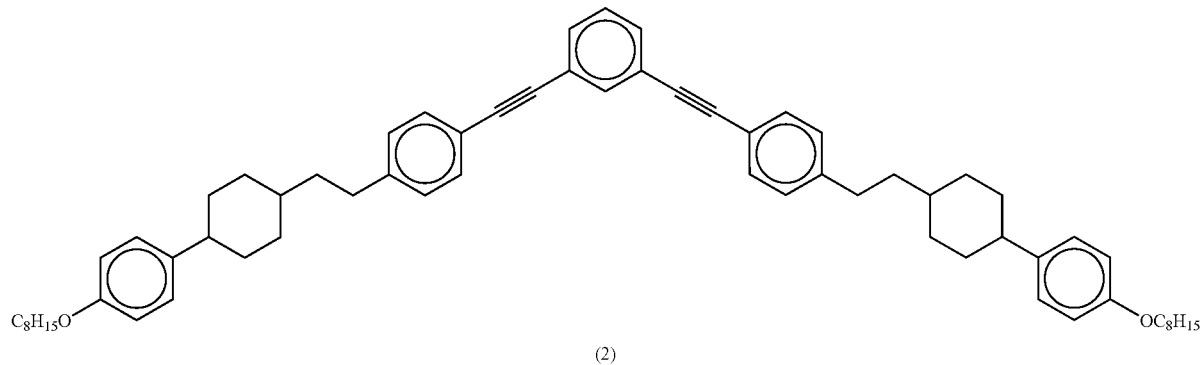
(2)

-continued
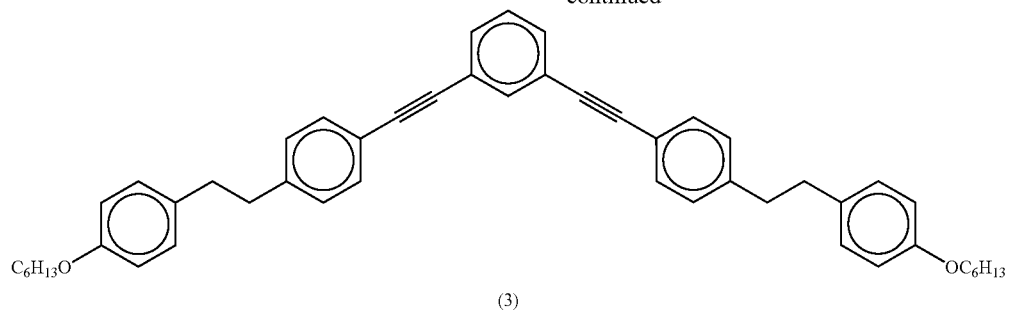
(3)
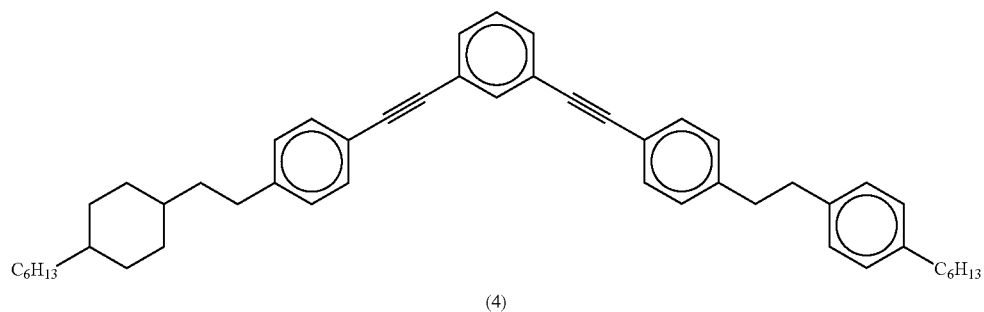
(4)
Chemical Formula 63
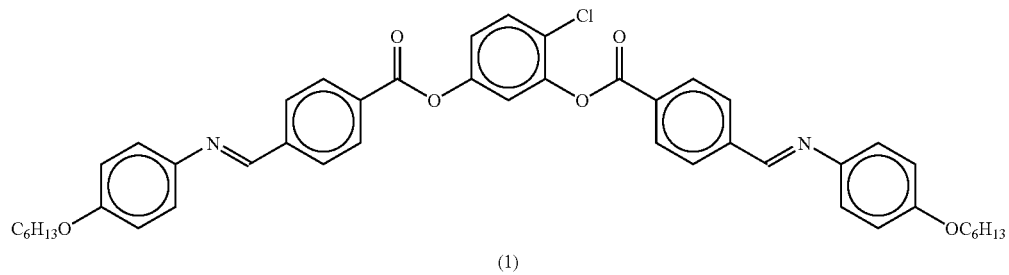
(1)
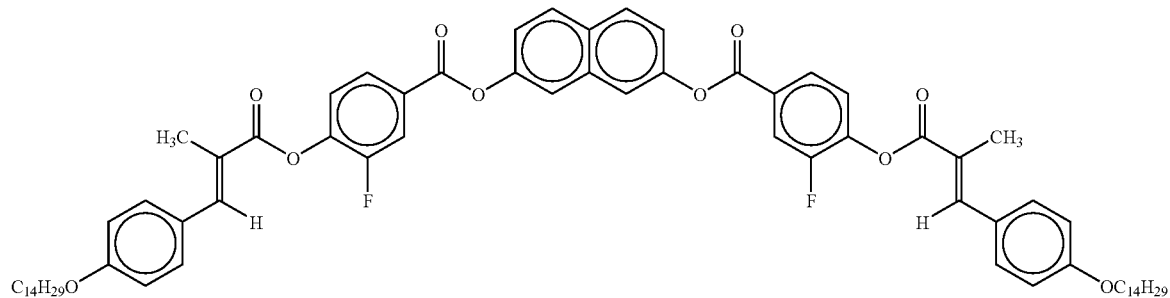
(2)
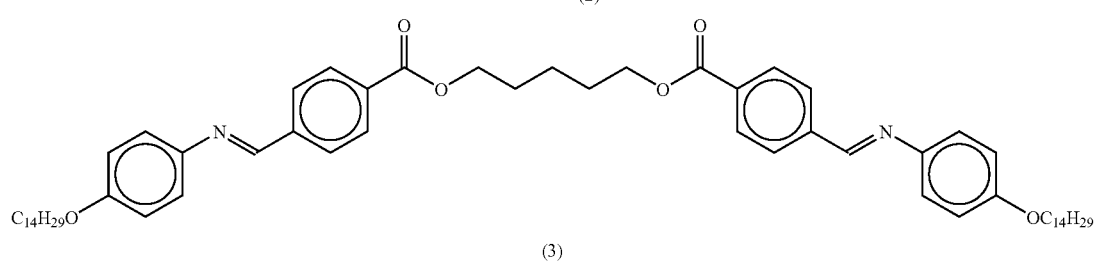
(3)

-continued

Chemical Formula 64

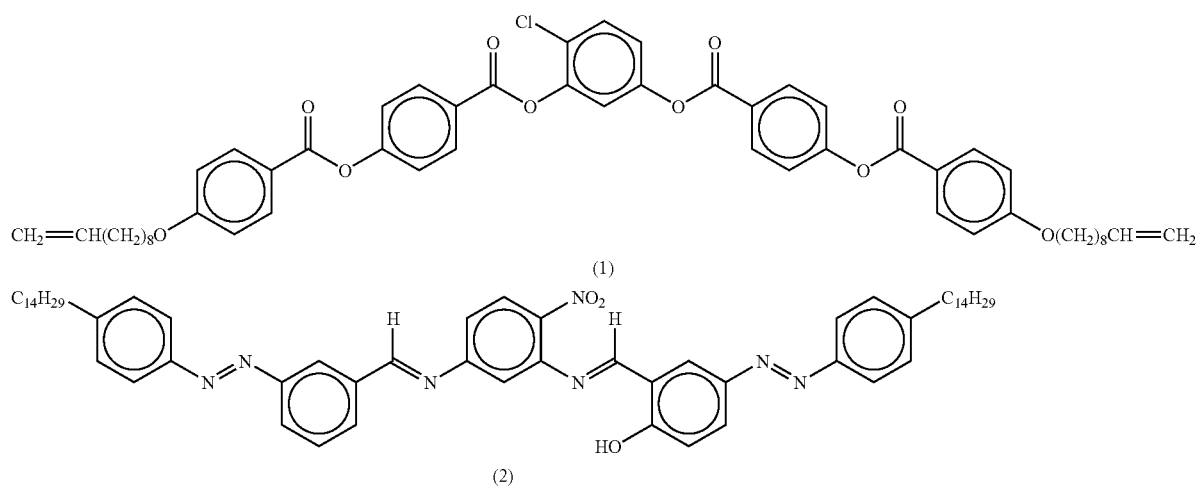

(1)

(2)

It is to be noted that the bent-shaped molecule is not limited to the compounds represented by Chemical Formula 45 to Chemical Formula 64.

Hereinafter, a method of synthesizing the bent-shaped molecule will be described referring to the compound represented by Chemical Formula 45(2) and the compound represented by Chemical Formula 45(4) as examples.

When the compound represented by Chemical Formula 45(2) is synthesized, for example, a compound represented by Chemical Formula 65 as a liquid crystal molecule and 1,3-benzenediol represented by Chemical Formula 66 are ester-linked. Thereby, the compound represented by Chemical Formula 45(2) is synthesized.

Chemical Formula 65

Chemical Formula 66

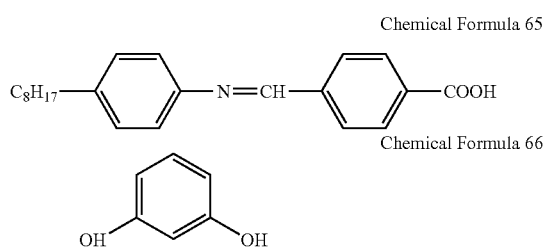

When the compound represented by Chemical Formula 45(4) is synthesized, for example, a compound represented by Chemical Formula 65 and pentane glycol represented by Chemical Formula 67 are ester-linked. Thereby, the compound represented by Chemical Formula 45(4) is synthesized.

Chemical Formula 67

Moreover, in addition to the above-described liquid crystal molecule and the above-described bent-shaped molecule, the liquid crystal material may include, for example, a chain compound exhibiting a liquid crystal phase and including a carbon skeleton as a base, or a compound not having dielectric anisotropy, but exhibiting a liquid crystal phase. The compounds preferably exhibit a liquid crystal phase, but they may be compounds not exhibiting a liquid crystal phase. Further, the liquid crystal material may include a compound reducing viscosity, if necessary. It is because when the viscosity of the liquid crystal material is reduced, superior response characteristics are obtained in the case where the liquid crystal material is used in the liquid crystal display device.

In the liquid crystal material according to the embodiment, when the liquid crystal molecule which is a paraelectric material as a whole and exhibits a nematic liquid crystal phase at room temperature and has a cyclic structure, and the bent-shaped molecule having more cyclic structures than the cyclic structures of the liquid crystal molecule are included, the alignment of the liquid crystal molecule is favorably adjusted without being disturbed. Thereby, in the case where a voltage is applied to the liquid crystal material, in general, when a compound having more cyclic structures than the liquid crystal molecule is included, in spite of the fact that the viscosity of the liquid crystal material is increased, thereby the response to an electric field is supposed to be slow, the liquid crystal material rapidly responds to an electric field in a state in which the alignment of the liquid crystal molecule is favorably maintained. In the embodiment, the liquid crystal material may include only one kind or a plurality of kinds of bent-shaped molecules.

In other words, in the liquid crystal material, compared to the case where the above-described bent-shaped molecule is not included, the alignment of the liquid crystal molecule is able to be stabilized favorably. Thereby, in the case where the liquid crystal material is used in the liquid crystal display device and the liquid crystal display, good display characteristics and good response characteristics are obtained.

In particular, when the number of cyclic structures included in the liquid crystal molecule is equal to or smaller than half the number of cyclic structures in the bent-shaped molecule, or the number of cyclic structures in the liquid crystal molecule is 2 or more and the number of cyclic structures in the bent-shaped molecule is 4 or more, a high effect is obtained.

Moreover, when, as the bent-shaped molecule, the bent-shaped molecule exhibiting a liquid crystal phase, in particular, the bent-shaped molecule exhibiting a nematic liquid crystal phase is used, the compatibility with the liquid crystal molecule is increased, so it is effective to stabilize the alignment of the liquid crystal molecule. In particular, when the liquid crystal molecule and the bent-shaped molecule have dielectric anisotropy with the same sign, the alignment of the liquid crystal molecule is able to be further stabilized. Further, when the content of the bent-shaped molecule in the liquid crystal material is within a range from 0.2 wt % to less than 50 wt %, a higher effect is expected.

Further, when the molecular weight of the bent-shaped molecule is larger than the average molecular weight of the whole liquid crystal material, the alignment of the liquid crystal molecule is adjusted, and a high effect is able to be obtained.

In addition, in P. Kilickiran et al., "Towards Faster LCs at Lower Driving Voltage", Proceedings of The 13th International Display Workshops; IDW'06), p. 23 which is described in "Description of the Related Art", a liquid crystal material including 4-fluorophenyl phenyl ether represented by Chemical Formula 68 as a compound having nonplanarity is disclosed. However, in the case where a liquid crystal molecule having more cyclic structures than 4-fluorophenyl phenyl ether is included, the alignment of the liquid crystal molecule tend to be disturbed. Moreover, when such a liquid crystal material is used in the liquid crystal display device, the response time (the rising response time) when applying a voltage is easily reduced, but the response time (the falling response time) when returning to a state in which a voltage is not applied takes long, so it is difficult to obtain sufficient response characteristics as a whole. However, in the liquid crystal material according to the embodiment of the invention, the bent-shaped molecule having more cyclic structures than liquid crystal molecule is used, so the alignment of the liquid crystal molecule is stabilized without being disturbed, so compared to the above-described case, a high effect is obtained.

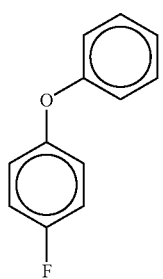

Chemical Formula 68

Moreover, in Japanese Unexamined Patent Application Publication No. 2002-161277, a liquid crystal material including a bent-shaped molecule is disclosed. However, the liquid crystal material disclosed therein is a ferroelectric liquid crystal exhibiting a smectic liquid crystal phase, so it is obvious that the liquid crystal material does not have the same or similar functions and effects as those of the liquid crystal material according to the embodiment of the invention which is a paraelectric material. More specifically, in the case where the liquid crystal material of Japanese Unexamined Patent Application Publication No. 2002-161277 is used in the liquid crystal display device, in the liquid crystal material, by coupling between spontaneous polarization and an electric field, the orientation of spontaneous polarization responds to the electric field so that the liquid crystal molecule is reversed, thereby switching is performed. On the other hand, in the case where the liquid crystal material according to the embodiment of the invention is used, in the liquid crystal material, by coupling between the dielectric-constant anisotropy of the liquid crystal molecule and an electric field, the dielectric anisotropy responds to the electric field so that the liquid crystal molecule is switched. In other words, the liquid crystal material according to the embodiment of the invention and the liquid crystal material of Japanese Unexamined Patent Application Publication No. 2002-161277 have completely different structures, and the structures, functions and effects of the liquid crystal display devices using the liquid crystal materials are clearly different from each other.

Further, also in Japanese Unexamined Patent Application Publication No. H10-161145, the bent-shaped molecule is disclosed, but the liquid crystal material includes the bent-shaped molecule, and is a ferroelectric liquid crystal, so it is obvious that the structure, functions and effects of the liquid crystal material according to the embodiment of the invention are different from those of the liquid crystal material in Japanese Unexamined Patent Application Publication No. H10-161145.

Next, as an application example of the above-described liquid crystal material according to the embodiment of the invention, the case where the liquid crystal material is used in a liquid crystal display device and a liquid crystal display will be described below.

Figure 1B:
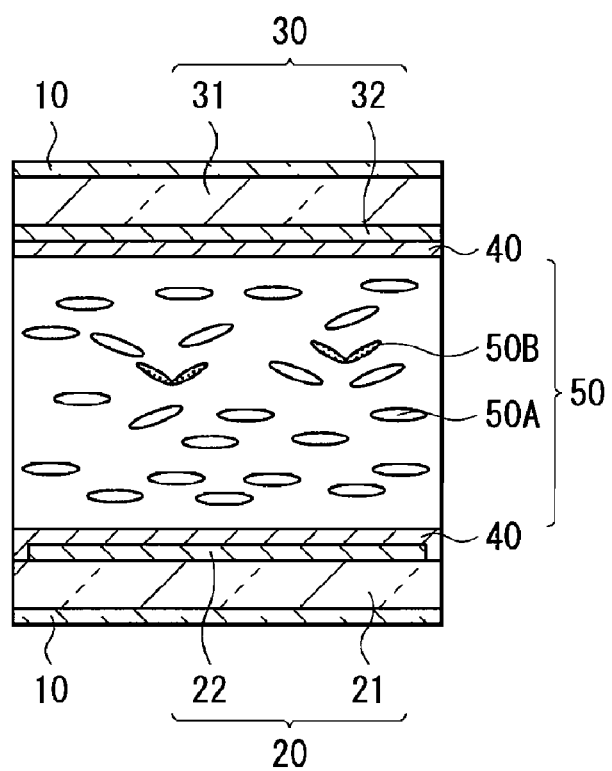
FIG. 1B is a sectional view illustrating a configuration, in a state in which the drive voltage is applied, of the liquid crystal display device using the liquid crystal material according to the embodiment of the invention.

FIGS. 1A and 1B are schematic sectional views of the liquid crystal display device, in which FIG. 1A illustrates a state in which a drive voltage is not applied, and FIG. 1B illustrates a state in which the drive voltage is applied. The display mode of the liquid crystal display device is a so-called vertical alignment (VA) mode, and in the state in which the drive voltage is not applied, black is displayed.

For example, as illustrated in FIGS. 1A and 1B, the liquid crystal display device includes a pixel electrode substrate 20 and a transparent electrode substrate 30 which are arranged between a pair of facing polarizing plates 10 so as to face each other, alignment films 40 which are arranged so as to be laid over surfaces facing each other of the pixel electrode substrate 20 and the transparent electrode substrate 30, and a liquid crystal layer 50 sealed between the pixel electrode substrate 20 and the transparent electrode substrate 30 with the alignment films 40 in between. In other words, the liquid crystal display device has a configuration in which the pixel electrode substrate 20 and the transparent electrode substrate 30 are arranged between a pair of polarizing plates 10, and the liquid crystal layer 50 is arranged between the pixel electrode substrate 20 and the transparent electrode substrate 30 so as to be sandwiched between the alignment films 40. The liquid crystal display device is a so-called transmissive liquid crystal display device.

The polarizing plates 10 are optical members having a function of passing a specific polarization component of incident light therethrough, and control the vibration direction of light. Moreover, the polarizing plates 10 may be used with a retardation film, if necessary. Thereby, in the case where the retardation film having negative refractive index anisotropy is used, birefringence by the liquid crystal layer 50 in a state in which a drive voltage is not applied is compensated, and good black display is obtained in an extremely wide visual angle direction.

The pixel electrode substrate 20 has a configuration in which a pixel electrode 22 is arranged on a surface of a transparent substrate 21 on which a drive circuit including a drive element is formed. The transparent substrate 21 is made of, for example, a transparent (light transmissive) material such as glass or plastic.

The pixel electrode 22 is an electrode on one side for applying a voltage to the liquid crystal layer 50. Moreover, for example, a plurality of the pixel electrodes 22 are provided, and the pixel electrodes 22 form a matrix-like arrangement pattern. In other words, a potential is independently supplied to each of the pixel electrodes 22. The pixel electrode 22 is, for example, a transparent electrode having light transmittance, and is made of, for example, a transparent electrode material such as indium tin oxide (ITO).

The transparent electrode substrate 30 has a configuration including a color filter (not illustrated) which includes red (R), green (G) and blue (B) filters arranged in stripes, and a transparent electrode 32 which is arranged almost all over an effective display region.

The transparent substrate 31 is made of, for example, a transparent (light transmissive) material such as glass or plastic. The transparent electrode 32 is an electrode on the other side for applying a voltage to the liquid crystal layer 50, and is made of, for example, a transparent electrode material such as indium tin oxide.

The alignment films 40 align liquid crystal molecules 50A included in the liquid crystal layer 50 in a predetermined alignment state. As described above, inner surfaces of the pixel electrode substrate 20 and the transparent electrode substrate 30, that is, surfaces on a side adjacent to the liquid crystal layer 50 are covered with the alignment films 40. More specifically, in the pixel electrode substrate 20, the pixel electrode 22 and a substrate 11 around the pixel electrode 22 are covered with the alignment film 40, and in the transparent electrode substrate 30, the transparent electrode 32 is covered with the alignment film 40. The alignment films 40 are vertical alignment films which align the liquid crystal molecules 50A in a vertical direction with respect to a substrate surface. As the material of the alignment films 40, a material having vertical orientation may be employed, and, for example, an organic material such as polyimide, lecithin and octadecylethoxysilane may be employed. As the polyimide, for example, JALS-2131-R6 (available from JSR Corporation, located in Tokyo, Japan) or the like may be employed. A process of controlling the alignment direction such as rubbing may be performed on the alignment films 40.

The liquid crystal layer 50 is made of the above-described liquid crystal material according to the embodiment of the invention, and the liquid crystal material in this case includes liquid crystal molecules 50A having negative dielectric anisotropy, and exhibiting a nematic liquid crystal phase, and bent-shaped molecules 50B. In the liquid crystal layer 50, in a state in which a drive voltage is not applied as illustrated in FIG. 1A, the liquid crystal molecules 50A are aligned substantially vertically to the surfaces of the pixel electrode substrate 20 and the transparent electrode substrate 30. However, the bent-shaped molecules 50B having a diagonal component are included, so the alignment of liquid crystal molecules 50A near the bent-shaped molecules 50B is stabilized in a state in which the alignment of the liquid crystal molecules 50A is influenced (for example, the liquid crystal molecules 50A are slightly tilted). Thereby, compared to the case where the bent-shaped molecules are not included, the response time is reduced. Therefore, the response speed is improved, and good response characteristics are obtained.

As described above, the liquid crystal material is a paraelectric material, and does not have spontaneous polarization (has a spontaneous polarization of substantially zero (0)), and hereinafter, the case where the liquid crystal material has spontaneous polarization will be described. When the liquid crystal material has spontaneous polarization, a self-electric field is formed in the liquid crystal layer, and ions existing in the liquid crystal material move in the liquid crystal layer so as to neutralize the self-electric field, thereby an electric charge is accumulated in an insulating layer (an alignment film or the like) existing between the liquid crystal layer and the substrate. When a drive voltage is applied in this state to perform switching, the spontaneous polarization and an electric field are coupled so as to reverse polarization (the polarization direction) with a change in the alignment direction of the liquid crystal material, and the capacity of the electric charge accumulated in the insulating layer is divided into the liquid crystal material and the insulating layer. Therefore, when the state is returned to a state in which a drive voltage is not applied, an electric field in a reverse direction (hereinafter referred to as a reverse electric field) is induced in the liquid crystal layer. The reverse electric field decays with a time constant determined by a parallel circuit of the liquid crystal layer and the insulating layer, and by the reverse electric field, the alignment of the liquid crystal material is disturbed, and switching characteristics easily decline. The reverse electric field is proportional to the magnitude of the spontaneous polarization of the liquid crystal material, so when the spontaneous polarization is zero (0), the alignment of the liquid crystal material is not disturbed by the reverse electric field, so switching characteristics are not impaired.

The liquid crystal molecules 50A in this case have negative dielectric anisotropy, so a high aperture ratio is obtained, and good response characteristics are obtained. The bent-shaped molecules 50B preferably have dielectric anisotropy with the same sign as that of the dielectric anisotropy of the liquid crystal molecules 50A, and in this case, the bent-shaped molecules 50B preferably have negative dielectric anisotropy. It is because when the sign of the dielectric anisotropy of the liquid crystal molecules 50A is the same as that of the bent-shaped molecules 50B, the absolute value of dielectric anisotropy ($\Delta \in$) of the whole liquid crystal layer 50 is increased, so the drive voltage is able to be reduced.

The liquid crystal display device is able to be manufactured by the following steps, for example.

At first, for example, the pixel electrode substrate 20 formed by arranging the pixel electrodes 22 on the transparent substrate 21 and the transparent electrode substrate 30 formed by arranging the transparent electrode 32 on the transparent substrate 31 are prepared. Next, the alignment film 40 is formed on each of the pixel electrode substrate 20 and the transparent electrode substrate 30. Then, subsequently, the pixel electrode substrate 20 and the transparent electrode substrate 30 are located to face each other so that the alignment films 40 face each other, and thereafter, the pixel electrode substrate 20 and the transparent electrode substrate 30 except for an injection opening for the liquid crystal material are sealed with a sealing material so as to have a predetermined space between the pixel electrode substrate 20 and the transparent electrode substrate 30, thereby a cell is formed. Next, water molecules remaining in the cell are removed.

Next, the liquid crystal material is injected into the cell by a vacuum injection method. As the bent-shaped molecules 50B included in the liquid crystal material, bent-shaped molecules having a large molecular weight than the average molecular weight of the whole liquid crystal material is preferably used. It is because a change in the composition of the liquid crystal material, which will occur in the case where bent-shaped molecule having a molecular weight smaller than the average molecular weight of the whole liquid crystal material is used for fabrication thereof does not easily occur, and good response characteristics are easily obtained.

As an apparatus injecting the liquid crystal material into the cell by the vacuum injection method, for example, a liquid crystal injection apparatus including a vacuum chamber in which pressure is able to be reduced or increased, a vacuum pump reducing pressure by exhausting air from the vacuum chamber, an apparatus bringing the vacuum chamber to an atmospheric pressure state or an increased pressure state, and a carrying device for holding the cell so that the liquid crystal injection opening is oriented in a downward direction and being able to carry the cell to upward and downward directions maybe employed. When the liquid crystal material is injected by the liquid crystal injection apparatus, at first, the cell is cooled down to room temperature, and the cell is carried to the vacuum chamber together with the liquid crystal material for injection. Next, the vacuum pump is activated to exhaust air from the vacuum chamber, and then pressure is reduced to a predetermined degree of vacuum (for example, approximately $1 \times 10^{-1}$ Torr), and the reduced pressure state is maintained. At this time, a defoaming process may be performed on the liquid crystal material for injection in a defoaming chamber included in the liquid crystal injection apparatus so as to remove a dissolved gas or the like in the liquid crystal material. In the defoaming process, at first, for example, the liquid crystal material is delivered by drops into a container such as a liquid crystal dish to an extent to which predetermined amount of the liquid crystal material is swelled. Next, while the liquid crystal material is maintained in the reduced pressure state, the liquid crystal injection opening of the cell is contacted to the liquid crystal material without clearing the reduced pressure state of the vacuum chamber, and the state is maintained for a while. Next, the pressure in the vacuum chamber is gradually increased back to atmospheric pressure. Thereby, the liquid crystal material is injected into the cell by a pressure difference between the inside and the outside of the cell and a capillary phenomenon. Finally, the cell is taken out of the vacuum chamber.

Next, the cell into which the liquid crystal material is injected is pressurized by a press or the like with a desired pressure for a desired time, and the liquid crystal material split out of the liquid crystal injection opening is wiped out, and then the liquid crystal injection opening is sealed with, for example, a sealing agent such as an ultraviolet curable resin.

Finally, the polarizing plates 10 are bonded to outer sides of the transparent substrates 21 and 31, that is, positions facing surfaces where the alignment films 40 are formed with the transparent substrate 21 or the transparent substrate 31 in between. Thereby, the liquid crystal display device is completed.

Figure 2:
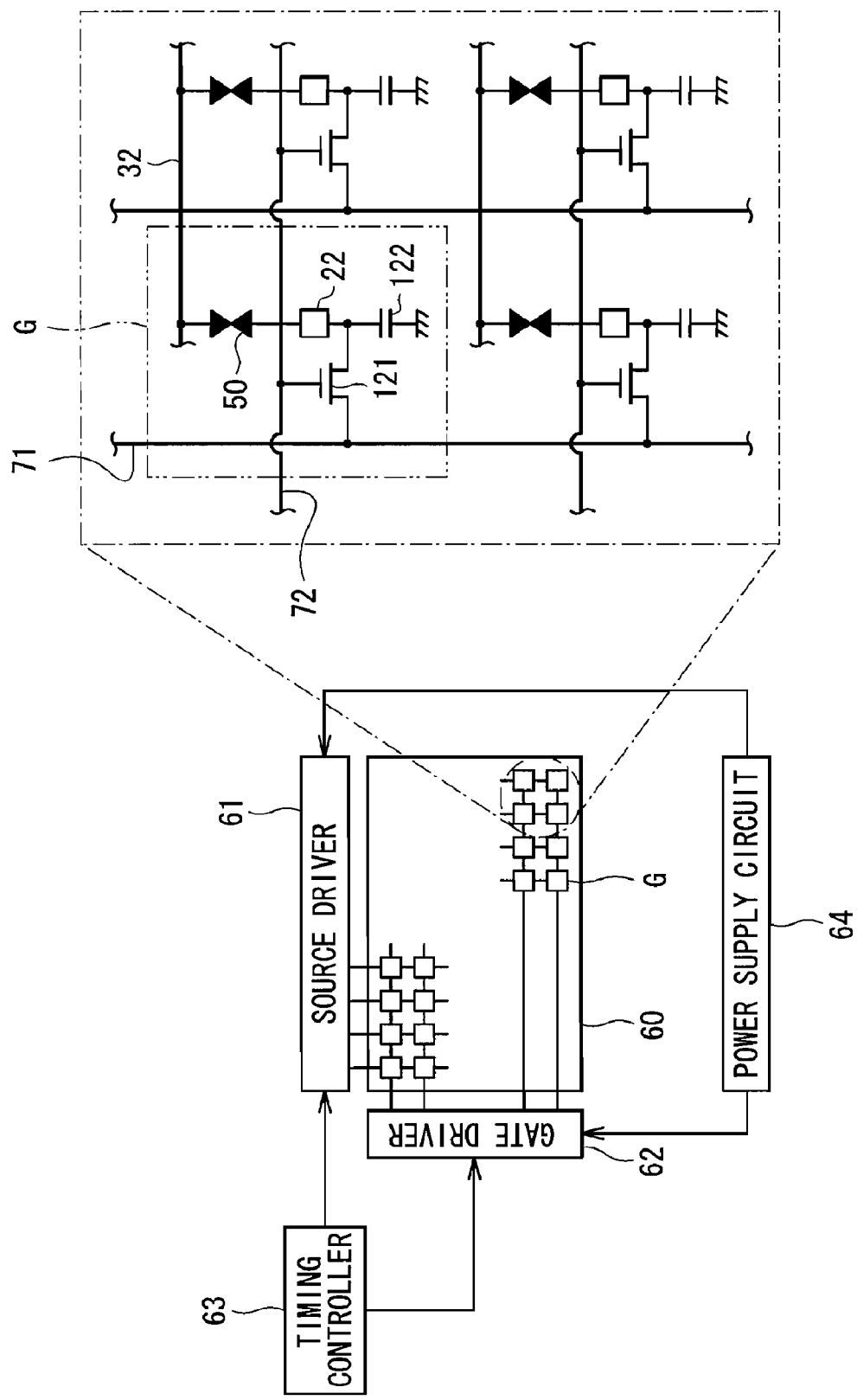
FIG. 2 illustrates a circuit configuration of a liquid crystal display including the liquid crystal display device illustrated in FIGS. 1A and 1B.
Figure 3:
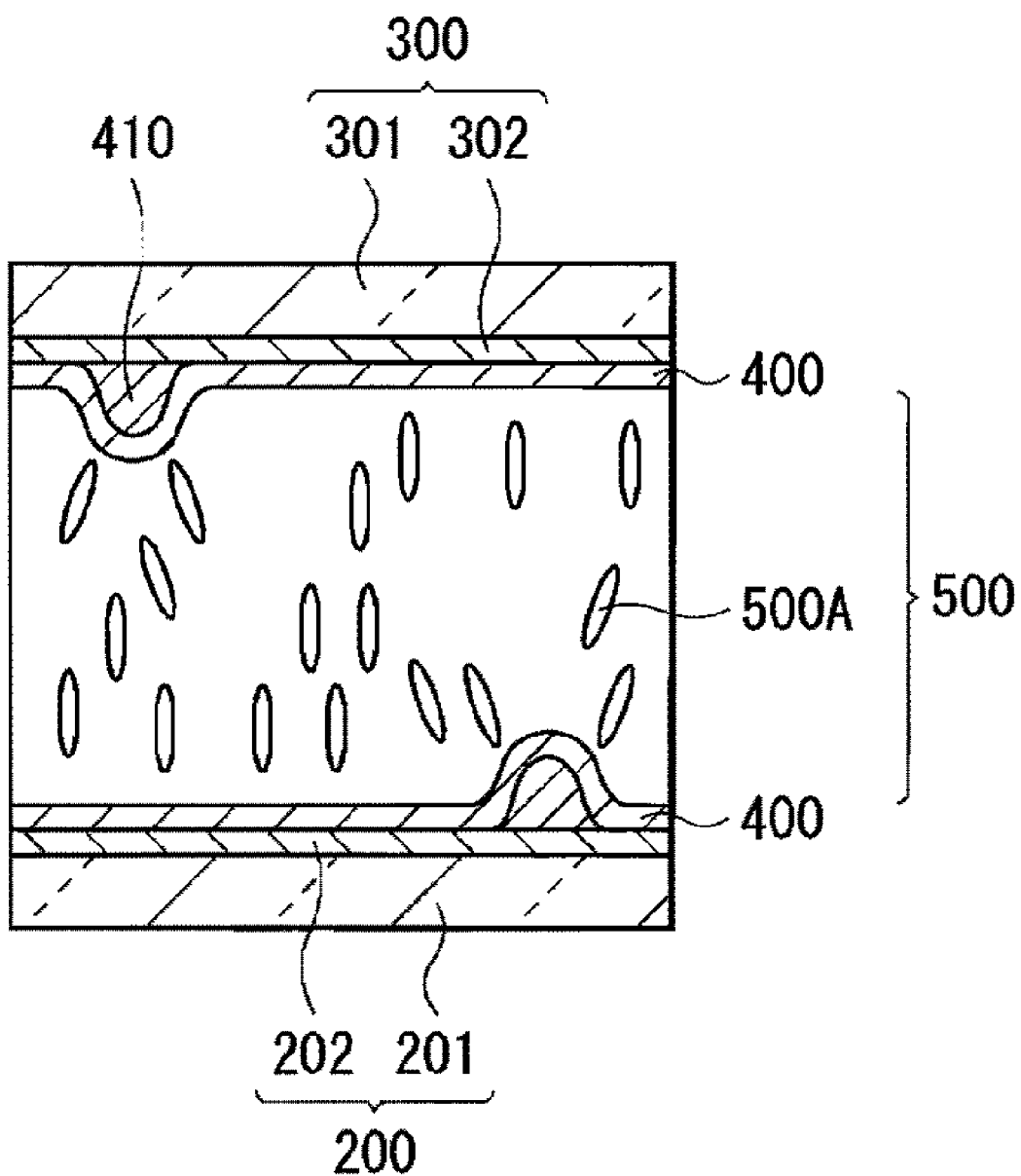
FIG. 3 is a sectional view for describing a liquid crystal display device according to a related art.

Next, referring to FIG. 2, the configuration of the liquid crystal display including the above-described liquid crystal display device will be described below. FIG. 2 illustrates a circuit configuration of the liquid crystal display including the liquid crystal display device illustrated in FIGS. 1A and 1B.

For example, as illustrated in FIG. 2, the liquid crystal display includes a display region 60, a plurality of pixels G arranged in the display region 60, a source driver 61 and a gate driver 62 arranged around the display region 60, a timing controller 63 controlling the source driver 61 and the gate driver 62, and a power supply circuit 64 supplying electric power to the source driver 61 and the gate driver 62. A backlight (not illustrated) including a fluorescent tube or the like is arranged on a back surface of the display region 60.

The display region 60 is a region on which an image is displayed, and is a region capable of displaying the image by arranging the plurality of pixels G in a matrix form. FIG. 2 separately illustrate an enlarged view of a region corresponding to four pixels G in addition to the display region 60 including the plurality of pixels G.

In the display region 60, a plurality of source lines 71 are aligned in a row direction, and a plurality of gate lines 72 are aligned in a column direction, and each of the pixels G are arranged at each of intersection points of the source lines 71 and the gate lines 72. Each pixel G includes a transistor 121 and a capacitor 122 together with the above-described liquid crystal display device according to the embodiment. Note that, in FIG. 2, only the pixel electrode 22, the transparent electrode 32 and the liquid crystal layer 50 in the liquid crystal display device are illustrated, and other components are not illustrated. In each transistor 121, a source electrode is connected to the source line 71, and a gate electrode is connected to the gate line 72, and a drain electrode is connected to the capacitor 122 and the pixel electrode 22. Each source line 71 is connected to the source driver 61 so that an image signal is supplied from the source driver 61, and each gate line 72 is connected to the gate driver 62 so that a scanning signal is sequentially supplied from the gate driver 62.

The source driver 61 and the gate driver 62 select a specific pixel G from the plurality of pixels G.

The timing controller 63 outputs, to the source driver 61, for example, an image signal (for example, each image signal of RGB corresponding to red, green and blue) and a source driver control signal for controlling the operation of the source driver 61. Moreover, the timing controller 63 outputs, to the gate driver 62, for example, a gate driver control signal for controlling the operation of the gate driver 62. Examples of the source driver control signal include a horizontal synchronization signal, a start pulse signal, a clock signal for source driver, and the like. Examples of the gate driver control signal include a vertical synchronization signal, a clock signal for gate driver, and the like.

Next, referring to FIGS. 1A, 1B and 2, the operation of the liquid crystal display will be described below.

In the liquid crystal display, when a drive voltage is applied between the pixel electrode 22 and the transparent electrode 32 in the following manner, an image is displayed. More specifically, when the source driver control signal is inputted from the timing controller 63, the source driver 61 supplies an individual image signal to a predetermined source line 71 on the basis of an image signal outputted from the timing controller 63, and when the gate driver control signal is inputted from the timing controller 63, the gate driver 62 sequentially supplies a scanning signal to the gate line at a predetermined timing. Thereby, a pixel G placed at the intersection point of the source line 71 to which the image signal is supplied and the gate line 72 to which the scanning signal is supplied is selected, and a drive voltage is applied to the selected pixel G.

When the drive voltage is applied to the selected pixel G, the alignment state of the liquid crystal molecules 50A included in the liquid crystal layer 50 is changed from a state illustrated in FIG. 1A to a state illustrated in FIG. 1B according to a potential difference between the pixel electrode 22 and the transparent electrode 32. More specifically, in the liquid crystal layer 50, when the drive voltage is applied, from a state before the application of the drive voltage illustrated in FIG. 1A, the liquid crystal molecules 50A of which the alignment directions are specified by positioning the liquid crystal molecules 50A near the bent-shaped molecules 50B are tilted in their own tilt directions, and the action propagates to other liquid crystal molecules 50A. As a result, as illustrated in FIG. 1B, most of liquid crystal molecules 50A respond so as to be aligned substantially horizontally (parallel) to the pixel electrode substrate 20 and the transparent electrode substrate 30. Thereby, the optical characteristics of the liquid crystal layer 50 are changed, and incident light to the liquid crystal display device is changed to emission light produced by modulating the incident light, and gray scales are expressed on the basis of the emission light to display an image. In addition, in the case where the bent-shaped molecules 50B have negative dielectric anisotropy, as illustrated in FIG. 1B, the bent-shaped molecules 50B spontaneously take a stance of extending along the surfaces of the pixel electrode substrate 20 and the transparent electrode substrate 30. However, even in the case where the bent-shaped molecules 50B have dielectric anisotropy, with a change in the positions of the liquid crystal molecules 50A, the bent-shaped molecules 50B take a stance of extending along the surfaces of the pixel electrode substrate 20 and the transparent electrode substrate 30.

According to the liquid crystal display device and the liquid crystal display of the embodiment of the invention, the liquid crystal layer 50 includes the bent-shaped molecules 50B having more cyclic structures than the liquid crystal molecules 50A, so in a stage before applying the drive voltage, an influence is exerted on the alignment directions of the liquid crystal molecules 50A, and the alignment is favorably stabilized, and while the drive voltage is applied to change the alignment directions, the alignment is stabilized. Thereby, compared to the case where the bent-shaped molecules 50B are not included, the response time (the rising response time) when applying a voltage is reduced, and the response time (the falling response time) when returning to a state where a voltage is not applied is favorably maintained, so good response characteristics are obtained. Moreover, an issue such as a decline in transmittance which may occur in the case where a linear projection is arranged on the surface of an electrode, degradation in the voltage holding property of the liquid crystal material which may occur in the case where a tilt angle is provided by a polymer material obtained by polymerizing monomers and the like does not occur. Therefore, good display characteristics are also able to be maintained. In addition, compared to the case where the linear projection is arranged, or the case where monomers are polymerized in a state in which a voltage is applied, manufacturing steps are able to be simplified.

In particular, when the number of cyclic structures included in the liquid crystal molecule 50A is equal to or smaller than half the number of cyclic structures in the bent-shaped molecule, or when the number of cyclic structures in the liquid crystal molecule 50A is 2 or more and the number of cyclic structure in the bent-shaped molecule 50B is 4 or more, a high effect is able to be obtained. Moreover, when the liquid crystal molecule 50A and the bent-shaped molecule 50B have the dielectric anisotropy with same sign, and in particular, when both of them have negative dielectric anisotropy, a high contrast is exhibited in a wide visual angle direction, and a high aperture ratio is obtained, thereby good display characteristics and superior response characteristics are able to be obtained.

Further, when a bent-shaped molecule exhibiting a liquid crystal phase, in particular a nematic liquid crystal phase is used as the bent-shaped molecule 50B, the compatibility with the liquid crystal molecule 50A is increased, so it is effective to improve the response characteristics and maintain the display characteristics. When the content of the bent-shaped molecule 50B in the liquid crystal material is within a range from 0.2 wt % to less than 50 wt %, a higher effect is expected.

Moreover, when the molecular weight of the bent-shaped molecule 50B is larger than the average molecular weight of the liquid crystal material, a high effect is able to be obtained.

In addition, in the above-described liquid crystal display device and the above-described liquid crystal display, the VA mode using a liquid crystal molecule having negative dielectric anisotropy as the liquid crystal molecule 50A included in the liquid crystal layer 50 is described. However, even in a liquid crystal display device using a liquid crystal molecule having positive dielectric anisotropy, when the bent-shaped molecule 50B is included in the liquid crystal layer 50, the same functions and effects are obtained.

EXAMPLES

Next, examples of the invention will be described below.

Example 1

A liquid crystal display device (VA mode) illustrated in FIGS. 1A and 1B was formed by the following steps. At first, the pixel electrode substrate 20 in which the pixel electrode 22 made of ITO (Indium Tin Oxide) was arranged on the transparent substrate 21 made of glass and the transparent electrode substrate 30 in which the transparent electrode 32 made of ITO was arranged on the transparent substrate 31 made of glass were prepared. Next, the alignment films 40 were formed on the pixel electrode substrate 20 and the transparent electrode substrate 30. Then, the pixel electrode substrate 20 and the transparent electrode substrate 30 were located to face each other so that the alignment films 40 face each other, and thereafter, the pixel electrode substrate 20 and the transparent electrode substrate 30 were sealed with a sealing material with plastic beads in between so that a cell gap between the pixel electrode substrate 20 and the transparent electrode substrate 30 became 4 μm.

Next, MJ-961213 (available from Merck Ltd., located in Tokyo, Japan; with an average molecular weight of approximately 320) as the liquid crystal molecule 50A having negative dielectric anisotropy, and the compound (with a molecular weight of 692) represented by Chemical Formula 45(1) which was a bent-shaped molecule represented by Chemical Formula 1 and exhibited a smectic liquid crystal phase as the bent-shaped molecule 50B were used to prepare a liquid crystal material (with an average molecular weight of approximately 320) as a paraelectric material. At that time, the content of the compound represented by Chemical Formula 45(1) in the liquid crystal material was 2 wt %. It is noted that MJ-961213 was configured of a liquid crystal molecule having two or three cyclic structures.

Next, the cell gap was sealed with the prepared liquid crystal material by the vacuum injection method using the liquid crystal injection apparatus. At that time, the degree of vacuum in the vacuum chamber was approximately $1 \times 10^{-1}$ Torr, and the liquid crystal material was injected.

Next, the cell into which the liquid crystal material was injected was pressurized by the press, and the liquid crystal material split out of the liquid crystal injection opening was wiped out, and then the liquid crystal injection opening was sealed with the ultraviolet curable resin as the sealing agent. Thereby, the liquid crystal layer 50 was formed.

Finally, the polarizing plates 10 were bonded to outer sides of the transparent substrates 21 and 31, that is, in positions facing surfaces where the alignment films 40 were formed with the transparent substrate 21 and the transparent substrate 31 in between so that the injection axes of the polarization plates 10 were orthogonal. Thereby, a transmissive liquid crystal display device was formed.

Comparative Example 1

A liquid crystal display device was formed by the same steps as those in Example 1, except that the compound represented by Chemical Formula 45(1) was not included in the liquid crystal material.

Comparative Example 2

A liquid crystal display device was formed by the same steps as those in Example 1, except that instead of the compound represented by Chemical Formula 45(1), 4-fluorophenyl phenyl ether (with a molecular weight of 188) represented by Chemical Formula 68 was used, and except that the liquid crystal material was injected in air by a capillary phenomenon. At that time, the average molecular weight of the injected liquid crystal material was approximately 310.

When the response characteristics of the liquid crystal display devices of Example 1 and Comparative Examples 1 and 2 were determined, results represented in Table 1 were obtained. When the response characteristics were determined, a time (a rising response time) from a state in which a drive voltage was not applied to a state in which liquid crystal molecules finished being tilted at the time of applying a drive voltage of a threshold value or over, and a time (a falling response time) from a state in which a drive voltage was applied to returning to the state in which the drive voltage was not applied were measured at room temperature.

TABLE 1

| | RESPONSE TIME (msec) | |
|---|---|---|
| | RISING | FALLING |
| EXAMPLE 1 | 40 | 10 |
| COMPARATIVE EXAMPLE 1 | 45 | 10 |
| COMPARATIVE EXAMPLE 2 | 41 | 11 |

As represented in Table 1, in Example 1 in which the compound represented by Chemical Formula 45(1) was included, the rising response time was reduced, compared to Comparative Example 1 in which the bent-shaped molecule was not included, and the falling response time was substantially equal to that in Comparative Example 1. Moreover, in Example 1, the rising and falling response times were reduced, compared to Comparative Example 2 in which the compound represented by Chemical Formula 68 was included. The results indicated that the bent-shaped molecule 50B stabilized the alignment of the liquid crystal molecule 50A at the time of not applying the drive voltage and the time of applying the drive voltage. On the other hand, in Comparative Example 2, the falling response time was increased, so it was indicated that even though the compound represented by Chemical Formula 68 had an effect of reducing the viscosity of the liquid crystal material, the alignment of the liquid crystal molecules 50A was disturbed by the compound.

Therefore, it was confirmed that in the liquid crystal display device using the liquid crystal material including the bent-shaped molecule 50B according to the embodiment of the invention, good response characteristics were obtained. Moreover, it was confirmed that the compound represented by Chemical Formula 45(1) exhibited a liquid crystal phase and exhibited a smectic liquid crystal phase, so as the bent-shaped molecule, the bent-shaped molecule exhibiting a liquid crystal phase was preferable, and in the light of compatibility with the liquid crystal molecule 50A, the bent-shaped molecule exhibiting a nematic liquid crystal phase was also preferable. In addition, in the above-described liquid crystal material, the spontaneous polarization was 0. Moreover, the valent angle corresponding to the valent angle of W1-A-W2 represented by Chemical Formula 1 of the compound represented by Chemical Formula 45(1) was approximately 120 degrees, that is, within a range from 90 degrees to less than 180 degrees, more specifically within a range from 115 degrees to 160 degrees both inclusive, so it was confirmed that the range of the above-described valent angle was appropriate.

Although the present invention is described referring to the embodiment and the example, the invention is not limited to the embodiment and the example, and may be variously modified. For example, in the above-described embodiment and the above-described example, the case where the liquid crystal material of the invention is used in a VA mode liquid crystal display device is described. However, the invention is not limited thereto, and even in a TN mode, a FFS mode, an IPS mode and the like, the same effects as those in the above-described embodiment and the example may be obtained.

Moreover, in the above-described embodiment and the above-described example, the liquid crystal display device and the liquid crystal display are applied to the transmissive liquid crystal display device and the transmissive liquid crystal display, respectively. However, the invention is not limited thereto, and they are also applicable to, for example, a reflective liquid crystal display device and a reflective liquid crystal display, respectively. In the reflective liquid crystal display device and the reflective liquid crystal display, a pixel electrode is made of an electrode material having light reflectivity such as aluminum. Even in this case, the same effects as those in the above-described embodiment and the above-described example are able to be obtained.

Therefore, the liquid crystal material, the liquid crystal display device, and the liquid crystal display according to the embodiment of the invention at least have the following advantages.

In the liquid crystal material according to the embodiment of the invention, when the bent-shaped molecule has more cyclic structures than the liquid crystal molecule exhibiting a nematic liquid crystal phase at room temperature, the alignment of the liquid crystal molecule is favorably adjusted. Thereby, when a voltage is applied to the liquid crystal material, the liquid crystal molecule rapidly responds to an electric field in a state in which the alignment is favorably maintained.

In the liquid crystal display device and the liquid crystal display according to the embodiment of the invention, the liquid crystal layer is made of the above-described liquid crystal material, so the alignment of the liquid crystal molecule in the liquid crystal layer is favorably adjusted, and in the case where a voltage is applied to the electrode and in the case where the state is returned to a state in which a voltage is not applied, the liquid crystal molecule rapidly responds without impairing the transmittance and the voltage holding property of the liquid crystal molecule.

In the liquid crystal material according to the embodiment of the invention, the liquid crystal material is a paraelectric material as a whole, and includes a liquid crystal molecule exhibiting a nematic liquid crystal phase at room temperature and having a cyclic structure and a bent-shaped molecule having more cyclic structures than the liquid crystal molecule, so favorably stabilized alignment of the liquid crystal molecule are able to be obtained. Thereby, in the liquid crystal display device and the liquid crystal display using the liquid crystal material according to the embodiment of the invention, good display characteristics and good response characteristics are able to be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal material, the liquid crystal material comprising:
a liquid crystal molecule exhibiting a nematic liquid crystal phase at room temperature and including one or more cyclic structures; and
a bent-shaped molecule including a number of cyclic structures which are greater than a number of cyclic structures included in the liquid crystal molecule,
wherein,
the liquid crystal material is a paraelectric material.

2. The liquid crystal material according to claim 1, wherein the number of the cyclic structures included in the liquid crystal molecule is equal to or smaller than half the number of the cyclic structures included in the bent-shaped molecule.

3. The liquid crystal material according to claim 1, wherein
the number of the cyclic structures included in the liquid crystal molecule is 2 or more, and
the number of the cyclic structures included in the bent-shaped molecule is 4 or more.

4. The liquid crystal material according to claim 1, wherein the bent-shaped molecule exhibits a liquid crystal phase.

5. The liquid crystal material according to claim 1, wherein the bent-shaped molecule is a compound represented by Chemical Formula 1:

Chemical Formula 1 where A represents a divalent group, W1 and W2 each represent a univalent group having at least one of the cyclic structures, and a valence angle of W1-A-W2 is less than 180 degrees.

6. The liquid crystal material according to claim 5, wherein the number of the cyclic structures in W1 in Chemical Formula 1 is equal to the number of the structures in W2.

7. The liquid crystal material according to claim 5, wherein W1 and W2 in Chemical Formula 1 each have two or more cyclic structures.

8. The liquid crystal material according to claim 5, wherein the valence angle of W1-A-W2 represented in Chemical Formula 1 is 90 degrees or over.

9. The liquid crystal material according to claim 5, wherein the valence angle of W1-A-W2 represented in Chemical Formula 1 is within a range from 115 degrees to 160 degrees both inclusive.

10. The liquid crystal material according to claim 5, wherein at least one of W1 and W2 represented in Chemical Formula 1 is a group represented by Chemical Formula 2:

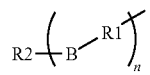

Chemical Formula 2 where B represents a divalent group having at least one of the cyclic structures, R1 represents a divalent group including an element selected from a group consisting of carbon (C), hydrogen (H), oxygen (O), nitrogen (N) and halogens, n is an integer of 1 or more, R2 represents an alkyl group, an alkenyl group, an alkoxyl group or an alkenyloxyl group having 1 to 20 carbon atoms, both inclusive.

11. The liquid crystal material according to claim 1, wherein a content of the bent-shaped molecule is within a range from 0.2 wt % inclusive to less than 50 wt %.

12. The liquid crystal material according to claim 1, wherein a molecular weight of the bent-shaped molecule is larger than a whole average molecular weight of the liquid crystal material.

13. The liquid crystal material according to claim 1, wherein the liquid crystal molecule has negative dielectric anisotropy.

14. The liquid crystal material according to claim 1, wherein the liquid crystal molecule is an achiral compound.

15. The liquid crystal material according to claim 1, wherein the bent-shaped molecule is an achiral compound.

16. A liquid crystal display device comprising:
a pair of substrates facing each other; and
an electrode and a liquid crystal layer arranged between the pair of the substrates, the liquid crystal layer being formed of a liquid crystal material which is a paraelectric material,
wherein the liquid crystal material includes:
a liquid crystal molecule exhibiting a nematic liquid crystal phase at room temperature and including one or more cyclic structures; and
a bent-shaped molecule including a greater number of cyclic structures than a number of cyclic structures included in the liquid crystal molecule.

* * * * *